(12) United States Patent
Katsuta et al.

(10) Patent No.: US 9,063,261 B2
(45) Date of Patent: Jun. 23, 2015

(54) LIGHT-CONTROLLING ELEMENT, DISPLAY DEVICE AND ILLUMINATION DEVICE

(75) Inventors: Shohei Katsuta, Osaka (JP); Tsuyoshi Kamada, Osaka (JP); Satoshi Shibata, Osaka (JP); Tsuyoshi Maeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 343 days.

(21) Appl. No.: 13/814,560

(22) PCT Filed: Jul. 25, 2011

(86) PCT No.: PCT/JP2011/066830
§ 371 (c)(1),
(2), (4) Date: Feb. 15, 2013

(87) PCT Pub. No.: WO2012/020636
PCT Pub. Date: Feb. 16, 2012

(65) Prior Publication Data
US 2013/0141937 A1    Jun. 6, 2013

(30) Foreign Application Priority Data
Aug. 10, 2010    (JP) ................................. 2010-179528

(51) Int. Cl.
*F21V 8/00*    (2006.01)
(52) U.S. Cl.
CPC .............. *G02B 6/0035* (2013.01); *G02B 6/005* (2013.01); *G02B 6/002* (2013.01); *G02B 6/003* (2013.01); *G02B 6/0038* (2013.01); *G02B 6/0068* (2013.01); *G02B 6/0078* (2013.01)
(58) Field of Classification Search
CPC ..................................................... G02B 6/0035
See application file for complete search history.

(56) References Cited

FOREIGN PATENT DOCUMENTS

| JP | 2002-296591 A | 10/2002 |
|----|---------------|---------|
| JP | 2009-134204 A | 6/2009  |
| JP | 2009-265576 A | 11/2009 |
| JP | 2010-139567 A | 6/2010  |
| JP | 2010-153103 A | 7/2010  |
| WO | 2010/050489 A1 | 5/2010 |

OTHER PUBLICATIONS

Official Communication issued in International Patent Application No. PCT/JP2011/066830, mailed on Oct. 25, 2011.

*Primary Examiner* — Elmito Breval
(74) *Attorney, Agent, or Firm* — Keating & Bennett, LLP

(57) ABSTRACT

A light-controlling element includes an illumination unit capable of controlling an amount of emitted light, and a light guide body on which the light emitted from the illumination unit is incident. The light guide body has a function of propagating the light while totally reflecting the light inside the light guide body, and the light guide body has a function of propagating the light emitted from the illumination unit at a plurality of different propagation angles inside the light guide body. The light guide body includes a plurality of light extraction regions having a function of extracting the light to the outside. At least two of the plurality of light extraction regions have different incidence angle ranges in which the light is capable of being extracted to the outside.

24 Claims, 26 Drawing Sheets

LIGHT-CONTROLLING ELEMENT, DISPLAY DEVICE AND ILLUMINATION DEVICE

Priority is claimed on Japanese Patent Application No. 2010-179528, filed Aug. 10, 2010, the content of which is hereby incorporated herein by reference in its entirety.

TECHNICAL FIELD

The present invention relates to a light-controlling element, a display device and an illumination device.

BACKGROUND ART

As an example of a display device, a transmission type liquid crystal display device that performs display using light emitted from an illumination device is known. This type of liquid crystal display device has a liquid crystal panel, and an illumination device arranged on a back side of the liquid crystal panel. An illumination device of the related art includes a light source such as a light emitting diode (hereinafter referred to as an LED), and a light guide plate. In the illumination device of the related art, generally, light emitted from the light source is propagated inside the light guide plate and emitted uniformly from an entire surface of the light guide plate.

Hereinafter, in this specification, the illumination device provided on the back side of the display panel as described above may be referred to as a backlight.

On the other hand, an illumination device that emits light selectively from a specific region within a surface of a light guide plate has been developed. In a liquid crystal display device including this type of illumination device, for example, there are a region that displays black on a liquid crystal panel, and a region that displays other colors. Whether the light from the illumination device is to be emitted or not is controlled in each region so that the light is not emitted from the illumination device in the region that displays black on a liquid crystal panel and the light is emitted from the illumination device in the region that displays other colors. If the illumination device performs such control, a phenomenon in which a black display portion appears whitish, i.e., a so-called "black floating" phenomenon, is suppressed, thus improving contrast of the display. Further, a function of adjusting an amount of emitted light from each region, i.e., a so-called light-controlling function, as well as controlling lighting/non-lighting in each individual region may be added to the illumination device. In this case, it is possible to expand a contrast range for representation and produce a powerful image by light-controlling the illumination device according to an image displayed by the liquid crystal panel.

For example, as an example of a method for controlling illumination light, a display device having a configuration in which a light control panel having a light control layer, such as polymer dispersed liquid crystal, is closely adhered to a lower surface of a light guide plate that guides the illumination light from a light source is disclosed (refer to Patent Reference 1 noted below). The light control panel provided in this display device has a configuration in which the polymer dispersed liquid crystal is interposed between a light-transmitting glass substrate and another substrate. The light-transmitting glass substrate has a transparent electrode formed on its entire surface. In the other substrate, a lattice-shaped electrode is formed. Also, a voltage is applied to the polymer-dispersed liquid crystal using the transparent electrode and the lattice-shaped electrode to electrically change a light scattering degree of the polymer dispersed liquid crystal, thereby controlling extraction of light from a light guide plate.

Further, as another example of a method of controlling the illumination light, a liquid crystal display device including a liquid crystal panel, a light source for irradiating the illumination light to the liquid crystal panel, a complex type light guide plate, and a polymer-dispersed liquid crystal plate is disclosed (refer to Patent Document 2 noted below). The complex type light guide plate includes a plurality of divided light guide plates provided below the liquid crystal panel. The polymer-dispersed liquid crystal plate includes a plurality of divided areas on which the light from the light source is incident. In this liquid crystal display device, the illumination light from the light source is incident on the complex type light guide plate through the polymer-dispersed liquid crystal plate. In this case, a distribution of a gradation level of a display pixel of the liquid crystal panel in each divided region of the complex type light guide plate is examined, and a judgment result indicating that the distribution is dark or bright as a whole is obtained. Also, light transmittance of the divided area of the polymer dispersed liquid crystal plate corresponding to the divided region of the complex type light guide plate for which the determination result has been obtained is controlled according to the above determination result to perform control of the illumination light.

PRIOR ART DOCUMENTS

Patent Documents

Patent Document 1: Japanese Patent Laid-Open Publication No. 2002-296591
Patent Document 2: Japanese Patent Laid-Open Publication No. 2009-134204

SUMMARY OF INVENTION

Problem to be Solved by the Invention

A light-controlling mechanism of the display device described in Patent Document 1 described above is a combination of the light guide plate and the polymer-dispersed liquid crystal. The light-controlling mechanism of the display device described in Patent Document 1 described above controls an amount of the light extracted from the light guide plate according to whether the polymer-dispersed liquid crystal is to be in a scattering state or to be in a transparent state. In this case, a role of the light guide plate is to propagate the light incident from an end surface to an opposite end surface while totally reflecting the light. The polymer dispersed liquid crystal is responsible for a role of extracting light from one surface of the light guide plate to the outside. However, in the light-controlling mechanism of such a scheme, the amount of the light that can be extracted to the outside is limited and it is difficult to achieve a bright illumination device.

This is because the amount of light that can be extracted to the outside from the light guide plate is highly dependent on performance of the polymer-dispersed liquid crystal. That is, if a scattering capability of the polymer dispersed liquid crystal is low, the amount of the light that can be extracted from the light guide plate to the outside when the polymer-dispersed liquid crystal is in the scattering state becomes smaller. On the other hand, if scattering occurs when the polymer dispersed liquid crystal is in the transparent state, light leaks from portions from which the light is not to be originally extracted, resulting in degraded contrast. In order to prevent this problem, polymer dispersed liquid crystal having a high scattering property for sufficient contrast is required. However, this polymer dispersed liquid crystal is difficult to obtain and is expensive.

Further, since the polymer-dispersed liquid crystal is used even in the light-controlling mechanism of the liquid crystal display device described in Patent Document 2, the above phenomenon occurs. Further, in the light-controlling mechanism of Patent Document 2, the complex type light guide plate having a configuration in which the plurality of light guide plates are combined is used. In this complex type light guide plate, some of the plurality of light guide plates are partially cut out in a thickness direction. Other light guide plates are fitted to the cut portions and a plurality of light guide plates are aligned in a surface direction, resulting in a very complex configuration. Accordingly, manufacture of the light guide plate is difficult. Further, since the plurality of light guide plates are stacked in the thickness direction, it is difficult to obtain a thin illumination device.

An object of an aspect of the present invention is to provide a light-controlling element capable of obtaining a sufficient amount of light by efficiently extracting, from a light guide body, light from a light source, such that the light-controlling element has a simple structure and is inexpensive. Another object is to provide a display device capable of bright and high-contrast display using the above light-controlling element.

Means for Solving the Problem

In order to achieve the above object, a light-controlling element in an aspect of the present invention includes an illumination unit capable of controlling an amount of emitted light; and a light guide body on which the light emitted from the illumination unit is incident, the light guide body is configured to propagate the light while totally reflecting the light inside the light guide body, the light guide body is configured to propagate the light emitted from the illumination unit at a plurality of different propagation angles inside the light guide body, the light guide body includes a plurality of light extraction regions configured to extract the light to the outside, and at least two of the plurality of light extraction regions have different incidence angle ranges in which the light is capable of being extracted to the outside.

In the light-controlling element in an aspect of the present invention, the plurality of light extraction regions may be arranged in a propagation direction of the light inside the light guide body, the plurality of light extraction regions may be arranged in order from the light extraction region whose incidence angle range in which light can be extracted to the outside is relatively narrower to the light extraction region whose incidence angle range is relatively wider, and the light extraction region whose incidence angle range in which light can be extracted to the outside is relatively narrower may be arranged to be closer to the illumination unit than the light extraction region whose incidence angle range is relatively wider.

In the light-controlling element in an aspect of the present invention, a first low refractive index body having a refractive index lower than a refractive index of the light guide body may be provided in at least one of the plurality of light extraction regions.

In the light-controlling element in an aspect of the present invention, at least second and third low refractive index bodies may be provided in at least two of the plurality of light extraction regions respectively, a refractive index of the second low refractive index body may be relatively lower than a refractive index of the third low refractive index body, and the second and third low refractive index bodies may be arranged so that the second low refractive index body is closer to the illumination unit than the third low refractive index body, along the propagation direction of the light incident on the light guide body.

In the light-controlling element in an aspect of the present invention, the first low refractive index body may include a plurality of fourth low refractive index bodies arranged to be spaced from each other in the light extraction region.

In the light-controlling element in an aspect of the present invention, at least fifth and sixth low refractive index bodies may be provided in at least two of the plurality of light extraction regions respectively, the fifth low refractive index body may include a plurality of seventh low refractive index bodies arranged to be spaced from each other in the light extraction region, the sixth low refractive index body may include a plurality of eighth low refractive index bodies arranged to be spaced from each other in the light extraction region, an interval between the plurality of seventh low refractive index bodies may sequentially decrease along the propagation direction of the light incident on the light guide body, an interval between the plurality of eighth low refractive index bodies may sequentially decrease along the propagation direction of the light incident on the light guide body, the fifth and sixth low refractive index bodies may be arranged so that the fifth low refractive index body is closer to the illumination unit than the sixth low refractive index body, along the propagation direction of the light incident on the light guide body, and the plurality of seventh and eighth low refractive index bodies may be arranged so that a difference in interval between the plurality of eighth low refractive index bodies is smaller than a difference in interval between the plurality of seventh low refractive index bodies.

In the light-controlling element in an aspect of the present invention, the light guide body may include a propagation angle changing unit that changes a propagation angle of the light so that an angle of incidence of light on one of the plurality of light extraction regions is smaller than an angle of incidence of light on the light extraction region closer to the illumination unit than the one light extraction region.

In the light-controlling element in an aspect of the present invention, the propagation angle changing unit may include an inclined surface obtained by inclining at least one of a first surface having the plurality of light extraction regions of the light guide body provided therein and a second surface opposing the first surface, and the inclined surface may have a slope to approach the first or second surface along the propagation direction of the light.

In the light-controlling element in an aspect of the present invention, the propagation angle changing unit may include one inclined surface.

In the light-controlling element in an aspect of the present invention, the propagation angle changing unit may include a prism structure body in which a plurality of prisms having the inclined surface are arranged to be adjacent.

The light-controlling element in an aspect of the present invention may satisfy Expressions (1), (2), and (3):

$$(t/\tan \phi) \times 2 \leq d1 \tag{1}$$

$$0 \leq d2 \leq t/\tan(\phi + 2\epsilon) \tag{2}$$

$$t/\tan(\phi + 2\epsilon) \leq d3 \tag{3}$$

when a thickness of the light guide body is t, a size of the propagation angle changing unit in the propagation direction of the light is d1, a distance from an end close to the illumination unit of the propagation angle changing unit to an end close to the illumination unit of the light extraction region directly next to the propagation angle changing unit is d2, a distance from an end far from the illumination unit of the propagation angle changing unit to an end far from the illumination unit of the light extraction region directly next to the propagation angle changing unit is d3, an inclination angle of the inclined surface is $\epsilon$, and a propagation angle of the light is $\phi$.

In the light-controlling element in an aspect of the present invention, a first light scattering body that scatters light emitted from the first low refractive index body may be provided on the light emitting side of the first low refractive index body.

In the light-controlling element in an aspect of the present invention, the first light scattering body may include a plurality of second light scattering bodies arranged to be spaced from each other in the light extraction region.

In the light-controlling element in an aspect of the present invention, at least third and fourth light scattering bodies may be provided in at least two of the plurality of light extraction regions respectively, the third light scattering body may include a plurality of fifth light scattering bodies arranged to be spaced from each other in the light extraction region, the fourth light scattering body may include a plurality of sixth light scattering bodies arranged to be spaced from each other in the light extraction region, an interval between the plurality of fifth light scattering bodies may sequentially decrease along the propagation direction of the light incident on the light guide body, an interval between the plurality of sixth light scattering bodies may sequentially decrease along the propagation direction of the light incident on the light guide body, the third and fourth light scattering bodies may be arranged so that the third light scattering body is closer to the illumination unit than the fourth light scattering body, along the propagation direction of the light incident on the light guide body, and the plurality of fifth and sixth light scattering bodies may be arranged so that a difference in interval between the plurality of sixth light scattering bodies is smaller than a difference in interval between the plurality of fifth light scattering bodies.

In the light-controlling element in an aspect of the present invention, the low refractive index body may include a light scattering material that scatters the incident light.

In the light-controlling element in an aspect of the present invention, a light emitting surface of the low refractive index body may include a light scattering surface.

In the light-controlling element in an aspect of the present invention, the illumination unit may include a plurality of light sources each capable of controlling an amount of emitted light, and each of the plurality of light sources may be arranged in a different direction with respect to the light extraction region so that the emitted light is incident on the light extraction region at a different incidence angle.

In the light-controlling element in an aspect of the present invention, an end surface of the light guide plate may include a plurality of inclined surfaces whose angles with respect to the surface having the light extraction region provided therein differ from one another, and the plurality of light sources may be fixed to the plurality of inclined surfaces, respectively.

In the light-controlling element in an aspect of the present invention, the illumination unit may include a plurality of light sources provided in an end surface of the light guide body and each capable of controlling an amount of emitted light; and a plurality of reflecting surfaces provided in an end surface opposing the end surface of the light guide body having the plurality of light sources provided therein and reflecting lights emitted from the plurality of light sources respectively, and the plurality of reflecting surfaces may be arranged in a different direction with respect to the light extraction region so that lights reflected by the plurality of respective reflecting surfaces are incident on the light extraction region at different incidence angles.

In the light-controlling element in an aspect of the present invention, the end surface opposing the end surface of the light guide body having the plurality of light sources provided therein may have a plurality of inclined surfaces whose angles with respect to the surface having the light extraction region provided therein differ from each other, and the plurality of reflecting surfaces may be formed in the plurality of inclined surfaces, respectively.

In the light-controlling element in an aspect of the present invention, the illumination unit may include a light source capable of controlling an amount of emitted light, and a propagation angle changing element configured to change a propagation angle of the light inside the light guide body in terms of time, and the propagation angle changing element may cause the light to be incident on the light extraction region at a different incidence angle by changing the propagation angle of the light in terms of time.

In the light-controlling element in an aspect of the present invention, the propagation angle changing element may have a function of reflecting light emitted from the light source, and may include a reflection element capable of changing a travel direction of the reflected light.

In the light-controlling element in an aspect of the present invention, the reflection element may be a polygon mirror.

In the light-controlling element in an aspect of the present invention, the propagation angle changing element may have a function of refracting light emitted from the light source when transmitting the light, and may include a refraction element capable of changing a travel direction of the transmitted light.

In the light-controlling element in an aspect of the present invention, the refraction element may be a liquid lens or a liquid crystal lens.

A display device in an aspect of the present invention includes a light-controlling element, and a display element that performs display using light emitted from the light-controlling element, the light-controlling element includes an illumination unit capable of controlling an amount of emitted light; and a light guide body on which the light emitted from the illumination unit is incident, the light guide body is configured to propagate the light while totally reflecting the light inside the light guide body, the light guide body is configured to propagate the light emitted from the illumination unit at a plurality of different propagation angles inside the light guide body, the light guide body includes a plurality of light extraction regions configured to extract the light to the outside, and at least two of the plurality of light extraction regions have different incidence angle ranges in which the light is capable of being extracted to the outside.

An illumination device in an aspect of the present invention includes a light-controlling element, and the light-controlling element includes: an illumination unit capable of controlling an amount of emitted light; and a light guide body on which the light emitted from the illumination unit is incident, the light guide body is configured to propagate the light while totally reflecting the light inside the light guide body, the light guide body is configured to propagate the light emitted from the illumination unit at a plurality of different propagation angles inside the light guide body, the light guide body includes a plurality of light extraction regions configured to extract the light to the outside, and at least two of the plurality of light extraction regions have different incidence angle ranges in which the light is capable of being extracted to the outside.

Effect of Invention

According to the light-controlling element in an aspect of the present invention, it is possible to realize a light-controlling element capable of obtaining a sufficient amount of light by efficiently extracting, from the light guide body, light emitted from the illumination unit, such that the light-controlling element has a simple structure and is inexpensive. It is also possible to realize a display device capable of bright and high-contrast display using the above light-controlling element.

DESCRIPTION OF EMBODIMENTS

First Embodiment

Hereinafter, a first embodiment that is an aspect of the present invention will be described using FIGS. 1 to 3.

In the present embodiment, a liquid crystal display device using a liquid crystal panel in a display element is illustrated.

Figure 1:
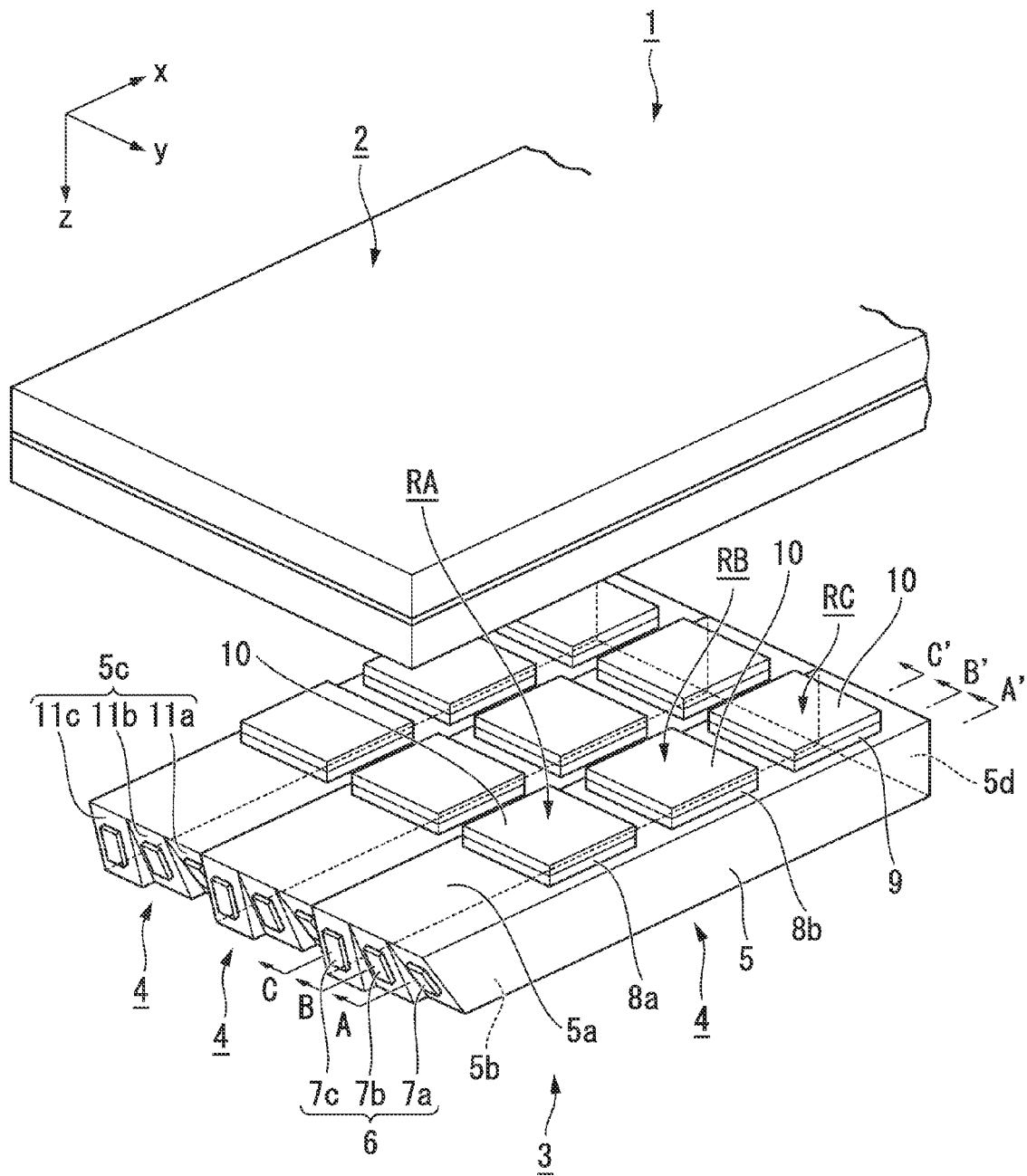
FIG. 1 is a perspective view illustrating a liquid crystal display device and a backlight of a first embodiment.
Figure 2A:
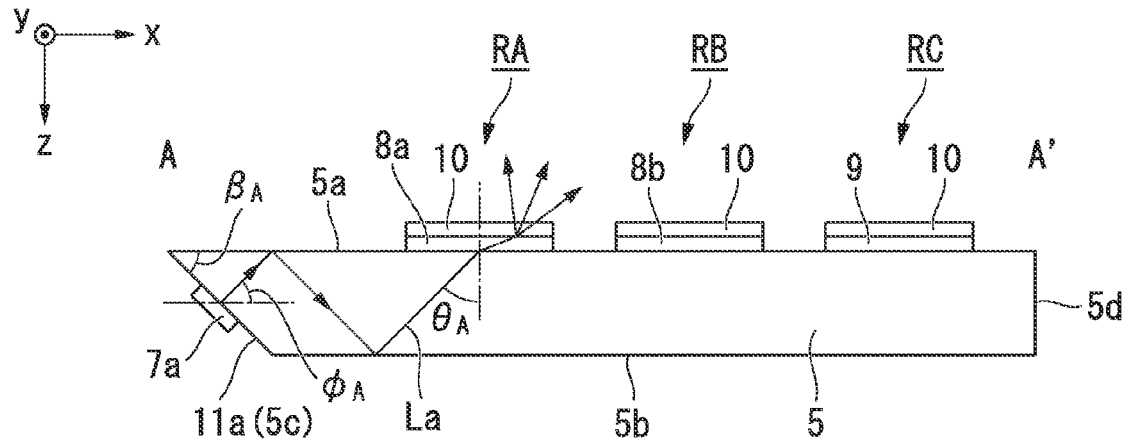
FIG. 2A is a view for explaining a principle of emitting light from each light extraction region in the backlight of the first embodiment.
Figure 2B:
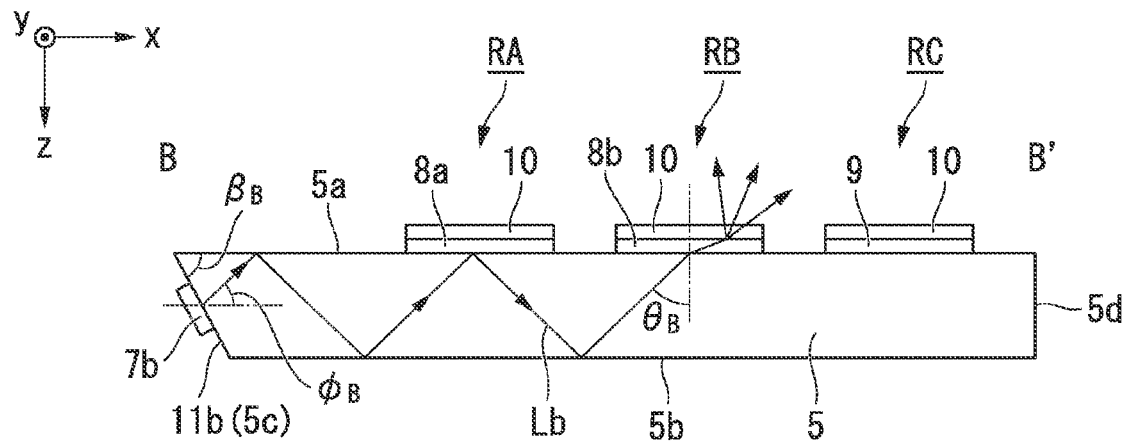
FIG. 2B is a view for explaining the principle of emitting light from each light extraction region in the backlight of the first embodiment of the first embodiment.
Figure 2C:
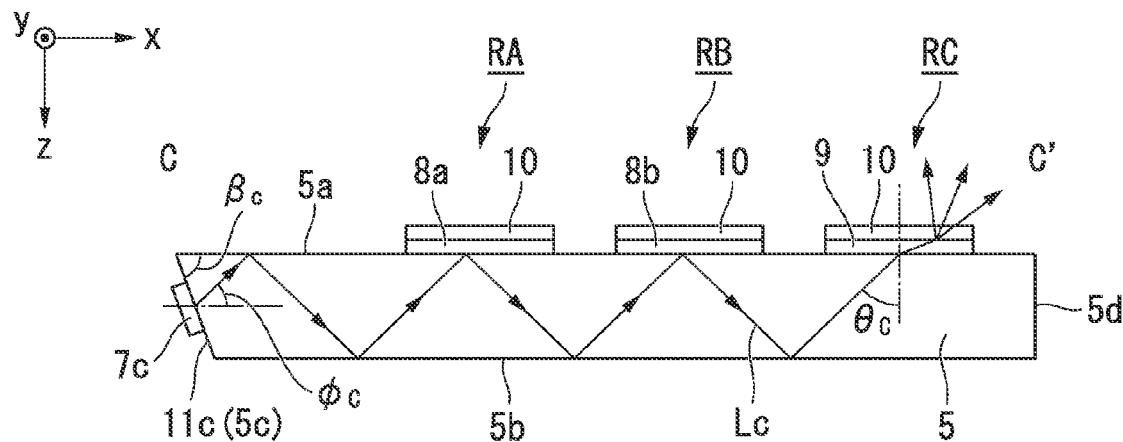
FIG. 2C is a view for explaining the principle of emitting light from each light extraction region in the backlight of the first embodiment of the first embodiment.

FIG. 1 is a perspective view illustrating a liquid crystal display device and a backlight of the present embodiment. FIGS. 2A to 2C are views for explaining a principle of emitting light from each light extraction region in the backlight of the present embodiment. FIG. 2A illustrates a case in which light is emitted from a first light extraction region RA, FIG. 2B illustrates a case in which light is emitted from a second light extraction region RB, and FIG. 2C illustrates a case in which light is emitted from a third light extraction region RC. FIG. 3 is a graph illustrating a simulation result to demonstrate effects of the backlight of the present embodiment.

Further, some components may be shown with a different scale of a size so that each component is easily viewed in each of the following drawings.

A liquid crystal display device (a display device) 1 of the present embodiment includes a liquid crystal panel 2 (a display element), and a backlight 3 (a light-controlling element) arranged on the back side of the liquid crystal panel 2, as illustrated in FIG. 1. The liquid crystal panel 2 is a transmission type liquid crystal panel that performs display using light emitted from the backlight 3. A user is able to visually recognize display from an opposite side of the backlight 3, i.e., from an upper side of the liquid crystal panel 2 in FIG. 1. In the present embodiment, a configuration of the liquid crystal panel 2 is not particularly limited, and the liquid crystal panel 2 may be an active matrix type liquid crystal panel in which a thin film transistor for switching (hereinafter abbreviated as a TFT) is included in each pixel. Further, the liquid crystal panel 2 may be a simple matrix type liquid crystal panel that does not include TFTs. Further, the liquid crystal panel is not limited to the transmission type liquid crystal panel, and may be a semi-transparent type liquid crystal panel (for both transmission and reflection). A display mode is not particularly limited, and a liquid crystal panel in various display modes, such as a VA (Vertical Alignment) mode, a TN (Twisted Nematic) mode, an STN (Super Twisted Nematic) mode, and an IPS (In-Plane Switching) mode may be used.

In the backlight 3 of the present embodiment, uniform light is not necessarily emitted from an entire surface of a light guide body, which will be described below. The backlight 3 of the present embodiment is adapted to control an amount of emitted light in each of a plurality of (nine in the present embodiment) light extraction regions obtained by dividing the entire surface. That is, in the backlight 3 of the present embodiment, each of the plurality of light extraction regions has a light-controlling function. In the backlight 3 of the present embodiment, only a specific light extraction region may emit light or may not emit light as a whole of the backlight 3. Alternatively, an amount of the light emitted from the specific light extraction region may be changed relative to an emitted light amount from the other light extraction regions.

Next, a configuration of the backlight 3 of the present embodiment will be described.

The backlight 3 of the present embodiment includes three backlight units 4 whose size, shape, and configuration are all the same, as illustrated in FIG. 1. Three backlight units 4 are arranged adjacent to each other in a direction perpendicular to a longitudinal direction of a light guide body 5, which will be described below, i.e., in a direction perpendicular to a direction (a y-axis direction of FIG. 1) in which three light extraction regions RA, RB and RC of the light guide body 5 are aligned. Accordingly, the backlight 3 includes a total of nine light extraction regions RA, RB and RC, three in a horizontal direction and three in a vertical direction in a screen of the liquid crystal display device 1. Each backlight unit 4 includes an illumination unit 6 and the light guide body 5. Further, the illumination unit 6 includes a plurality of (three in the present embodiment) LEDs (light sources) 7a, 7b and 7c. The light guide body 5 is made of, for example, a parallel plate formed of a resin having optical transparency, such as acrylic resin.

Further, while the example in which the backlight 3 includes three backlight units 4 in which the light guide bodies are separate bodies is shown herein, the light guide bodies having a total of nine light extraction regions RA, RB and RC may have a unitary structure. Even in this structure, the light extraction regions RA, RB and RC which emit the light using high-directivity LEDs can be selected.

Three LEDs 7a, 7b and 7c are installed in one end surface of the light guide body 5 in such a manner that light emitting sides of the LEDs are directed to the light guide body 5. The lights emitted from the respective LEDs 7a, 7b and 7c are incident on the light guide body 5, which has a function of propagating the light from the end surface having the LEDs 7a, 7b and 7c installed thereon to an opposite end surface (from a −x direction to a +x direction in FIG. 1) while totally reflecting the light in the light guide body 5, and extracting the light to an external space in the meantime. Further, three LEDs 7a, 7b and 7c have a configuration in which on or off of the LEDs can be individually independently controlled. Further, three LEDs 7a, 7b and 7c have a configuration in which an amount of emitted light can be controlled. Further, although not illustrated in FIG. 1, the backlight 3 includes a printed wiring board having the LEDs 7a, 7b and 7c mounted thereon, and a control unit including a driving IC responsible for driving and controlling of the LEDs 7a, 7b and 7c. In the present embodiment, it is desirable to use the LEDs 7a, 7b and 7c having high directivity. For example, LEDs in which a half width of an intensity distribution with respect to a spread angle of the emitted light while the light is being guided inside the light guide body 5 is about 5° may be used.

The plurality of (three in the present embodiment) light extraction regions RA, RB and RC are provided along the longitudinal direction (the x-axis direction in FIG. 1) of the light guide body 5 in a main surface 5a opposing the liquid crystal panel 2 among two main surfaces of the light guide body 5. In the light extraction region RA, a low refractive index body 8a having a refractive index lower than a refractive index of the light guide body 5, and a light scattering body 10 that scatters light emitted from the low refractive index body 8a are stacked in this order. In RB, a low refractive index body 8b having a refractive index lower than the refractive index of the light guide body 5, and a light scattering body 10 that scatters light emitted from the low refractive index body 8b are stacked in this order. In RC, a refractive index body 9 having a refractive index equal to the refractive index of the light guide body 5, and a light scattering body 10 that scatters light emitted from the refractive index body 9 are stacked in this order. Further, in the following description, for convenience, the respective light extraction regions are referred to as a first light extraction region RA, a second light extraction region RB, and a third light extraction region RC from the side close to the LEDs 7a, 7b and 7c to the side far from the LEDs. Further, the main surface of the light guide body 5 having the light extraction regions RA, RB and RC provided thereon is referred to as a first main surface 5a, the main surface on the opposite side of the first main surface 5a is referred to as a second main surface 5b, the end surface of the light guide body 5 having the LEDs 7a, 7b and 7c provided thereon is referred to as the first end surface 5c, and an end surface on the opposite side of the first end surface 5c is referred to as a second end surface 5d.

As described above, both of the low refractive index bodies 8a and 8b have a lower refractive index than the refractive index of the light guide body 5, and the refractive index body 9 has a refractive index equal to the refractive index of the light guide body 5. The low refractive index bodies 8a and 8b and the refractive index body 9 have different refractive indices. Further, the low refractive index bodies 8a and 8b and the refractive index body 9 are arranged in order from the refractive index body having a relatively lower refractive index to the refractive index body having a relatively higher refractive index along the propagation direction of the lights that are emitted from the respective LEDs 7a, 7b and 7c and incident on the respective light extraction regions RA, RB and RC (from the −x direction to the +x direction in FIG. 1). As an example of the present embodiment, a refractive index nWG of the light guide body 5 is 1.5, while a refractive index nA of the first low refractive index body 8a provided in the first light extraction region RA is set to 1.3, a refractive index nB of the second low refractive index body 8b provided in the second light extraction region RB is set to 1.4, and a refractive index nC of the refractive index body 9 provided in the third light extraction region RC is set to 1.5.

An example of a scheme of forming the low refractive index bodies 8a and 8b and the refractive index body 9 having a different refractive index may include the following two schemes.

A first scheme is intended to form the low refractive index bodies 8a and 8b and the refractive index body 9 using different materials. For example, the low refractive index bodies 8a and 8b and the refractive index body 9 can be realized by using an acrylic resin as a material of the light guide body 5 and selectively applying and curing, on the light guide body 5, each liquid material of an amorphous fluorine resin "AF1600" (registered trademark; refractive index: $n_A$=1.29 to 1.31) manufactured by DuPont Corporation as a material of the first low refractive index body 8a, an ultraviolet-curable resin "OP40" (registered trademark; refractive index: $n_B$=1.403) manufactured by DIC Corporation as a material of the second low refractive index body 8b, and a methacrylic resin "Parapet (optical grade)" (registered trademark; refractive index $n_C$=1.49) manufactured by Kuraray Co., Ltd. as a material of the refractive index body 9.

Further, since the refractive index body 9 has the refractive index equal to that of the light guide body 5, it is unnecessary to form the refractive index body 9 on the light guide body 5. For example, only the light scattering body 10 may be arranged on the light guide body 5.

A second scheme is intended to use a material having a low-refractive index material contained in a predetermined base material to make a concentration of the low refractive index material different in order to adjust a refractive index. For example, a low refractive index material such as mesoporous silica nanopowder (registered trademark; refractive index: 1.27) manufactured by Ardrich Corporation or aerogel (registered trademark; refractive index: 1.27) manufactured by Jason Wells is contained in the methacrylic resin "Parapet (optical grade)" (registered trademark; refractive index $n_C$=1.49) manufactured by Kuraray Co., Ltd. used as the material of the refractive index body 9, and two kinds of liquid materials having different concentrations of the low refractive index material are produced. Then, the refractive index bodies can be realized by selectively applying and curing each liquid material on the light guide body 5.

The light scattering body 10 is stacked on the low refractive index bodies 8a and 8b and the refractive index body 9. The light scattering body 10 has a function of scattering light incident from the low refractive index bodies 8a and 8b and the refractive index body 9 and extracting the light to the external space of the backlight 3. Specifically, a commercially available light scattering film having scattering beads or the like coated on a base film may be used as the light scattering body 10, and the light scattering body 10 may be formed by attaching a light scattering film on the low refractive index bodies 8a and 8b and the refractive index body 9. It is desirable to use a scattering film having high light scattering capability as the light scattering body 10 of the present embodiment.

As illustrated in FIG. 1, in each backlight unit 4, the first end surface 5c of the light guide body 5 is divided into three portions in a transverse direction (a y-axis direction in FIG. 1) of the light guide body 5 and includes three inclined surfaces 11a, 11b and 11c having a different angle with respect to the first main surface 5a. The inclined surfaces 11a, 11b and 11c may be formed, for example, by preparing the light guide body whose end surface forms a right angle with the first main surface 5a and obliquely grinding the end surface to form a different angle with respect to the first main surface 5a in each of three divided regions. Further, the LEDs 7a, 7b and 7c are fixed substantially to centers of the inclined surfaces 11a, 11b and 11c, respectively, via an optical adhesive. Accordingly, three LEDs 7a, 7b and 7c are aligned in the transverse direction of the light guide body 5 over the first end surface 5c.

Further, in the following description, for convenience, the inclined surface (the right of FIG. 1) having the smallest angle with respect to the first main surface 5a among three inclined surfaces 11a, 11b and 11c of the first end surface 5c is referred to as a first incidence end surface 11a. The inclined surface (a center in FIG. 1) having a next smallest angle with respect to the first main surface 5a is referred to as a second incidence end surface 11b. The inclined surface (the left of FIG. 1) having the greatest angle with respect to the first main surface 5a is referred to as a third incidence end surface 11c. Further, the LED provided on the first incidence end surface 11a is referred to as a first LED 7a. The LED provided on the second incidence end surface 11b is referred to as a second LED 7b. The LED provided on the third incidence end surface 11c is referred to as a third LED 7c.

FIG. 2A illustrates a cross-sectional view taken along line A-A' of FIG. 1. FIG. 2B illustrates a cross-sectional view taken along line B-B' of FIG. 1. FIG. 2C illustrates a cross-sectional view taken along line C-C' of FIG. 1. In the case of the present embodiment, as an example, an angle $\beta_A$ formed between the first incidence end surface 11a and the first main surface 5a is set to 55°, as illustrated in FIG. 2A. An angle $\beta_B$ formed between the second incidence end surface 11b and the first main surface 5a is set to 65°, as illustrated in FIG. 2B. An angle $\beta_C$ formed between the third incidence end surface 11c and the first main surface 5a is set to 75°, as illustrated in FIG. 2C. The respective LEDs 7a, 7b and 7c are fixed so that lights La, Lb and Lc are incident perpendicularly to the respective incidence end surfaces 11a, 11b and 11c. The lights La, Lb and Lc emitted from the respective LEDs 7a, 7b and 7c are propagated from the first end surface 5c to the second end surface 5d while being repeatedly totally reflected between the first main surface 5a and the second main surface 5b of the light guide body 5.

Here, if an angle formed by an optical axis with respect to a virtual horizontal plane passing through a center in a thickness direction of the light guide plate is defined as a propagation angle $\phi$, a propagation angle $\phi_A$ of the light La from the first LED 7a is 35°, as illustrated in FIG. 2A. A propagation angle $\phi_B$ of the light Lb from the second LED 7b is 25°, as illustrated in FIG. 2B. A propagation angle $\phi_C$ of the light Lc from the third LED 7c is 15°, as illustrated in FIG. 2C. Thus, the respective lights La, Lb and Lc are incident on the first light extraction region RA, the second light extraction region RB, and the third light extraction region RC in order of the first light extraction region RA, the second light extraction region RB, and the third light extraction region RC while being propagated from the first end surface 5c to the second end surface 5d.

Further, in FIGS. 2A to 2C, a thickness (a size in a z-axis direction) is drawn to be sufficiently large relative to a size (a size in the x-axis direction) in a longitudinal direction of the light guide plate 5 and only central axes of the lights emitted from the LEDs 7a, 7b and 7c are drawn, so that the drawings are easily viewed. Accordingly, it seems that in some cases, the light is not necessarily incident on the respective light extraction regions RA, RB and RC. In fact, the thickness is sufficiently smaller than the size in the longitudinal direction of the light guide plate 5. Further, the lights La, Lb and Lc from the respective LEDs 7a, 7b and 7c have a finite diameter of a light beam. Accordingly, the lights La, Lb and Lc are reliably incident on the respective light extraction regions RA, RB and RC.

That is, the illumination unit 6 of the present embodiment includes three LEDs 7a, 7b and 7c. The lights La, Lb and Lc from the respective LEDs 7a, 7b and 7c are incident on the respective light extraction regions RA, RB and RC at incidence angles, including incidence angles at which the lights La, Lb and Lc can be extracted from the respective light extraction regions RA, RB and RC. Further, the illumination unit 6 has a function of switching the propagation angles φ ($\phi_A=35°$, $\phi_B=25°$ and $\phi_C=15°$) of the light inside the light guide body 5 by switching the LEDs 7a, 7b and 7c to be turned on so that the light is incident on one light extraction region RA, RB or RC at three different incidence angles θ ($\theta_A=55°$, $\theta_B=65°$ and $\theta_C=75°$, as will be described below.

Here, a critical angle when the lights La, Lb and Lc from the respective LEDs 7a, 7b and 7c are incident on interfaces between the light guide plate 5 and the low refractive index bodies 8a and 8b and the refractive index body 9 in the respective light extraction regions RA, RB and RC is considered.

Since the interface between the light guide body 5 and the first low refractive index body 8a in the first light extraction region RA is an interface between the light guide body having a refractive index $n_{WG}=1.5$ and the first low refractive index body 8a having a refractive index $n_A=1.3$, the critical angle $\gamma_A$ is 60.1° based on Snell's law. Accordingly, in the first light extraction region RA, light incident at an incidence angle less than 60.1° is transmitted through the interface and light incident at an incidence angle equal to or more than 60.1° is totally reflected by the interface. Similarly, since the interface between the light guide body 5 and the second low refractive index body 8b in the second light extraction region RB is an interface between the light guide body 5 having a refractive index $n_{WG}=1.5$ and the second low refractive index body 8b having a refractive index $n_B=1.4$, the critical angle $\gamma_B$ is 69.0°. Accordingly, in the second light extraction region RB, light incident at an incidence angle less than 69.0° is transmitted through the interface and light incident at an incidence angle equal to or more than 69.0° is totally reflected by the interface. On the other hand, since the interface between the light guide body 5 and the refractive index body 9 in the third light extraction region RC is an interface between the light guide body having a refractive index $n_{WG}=1.5$ and the refractive index body 9 having a refractive index $n_C=1.5$, the light is transmitted through the interface at all incidence angles.

That is, when the first light extraction region RA, the second light extraction region RB, and the third light extraction region RC are seen alone, an incidence angle range in which light can be extracted to the outside is as follows. The incidence angle range in which light can be extracted to the outside in the first light extraction region RA is less than 60.1°. The incidence angle range in which light can be extracted to the outside in the second light extraction region RB is less than 69.0°. The incidence angle range in which light can be extracted to the outside in the third light extraction region RC is an entire angle range.

Thus, two low refractive index bodies 8a and 8b and the refractive index body 9 provided in three respective light extraction regions RA, RB and RC of the present embodiment are arranged, in order from the refractive index body having a relatively lower refractive index to the refractive index body having a relatively higher refractive index, in the propagation direction of the light incident on the light extraction regions RA, RB and RC. Based on such a difference in refractive index, three light extraction regions RA, RB and RC have different incidence angle ranges in which light can be extracted to the outside. Further, three light extraction regions RA, RB and RC are arranged, in order from the light extraction region having a relatively narrower incidence angle range in which light can be extracted to the light extraction region having a relatively wider incidence angle range in which light can be extracted, in the propagation direction of the incident light. For example, the incidence angle range in which light can be extracted is less than 60.1° in the first light extraction region RA. The incidence angle range in which light can be extracted in the second light extraction region RB is less than 69.0°. The incidence angle range in which light can be extracted in the third light extraction region RC is the entire angle range.

In this case, as illustrated in FIG. 2A, if the first LED 7a fixed to the first incidence end surface 11a is assumed to be turned on, the angle $\beta_A$ formed between the first incidence end surface 11a and the first main surface 5a is 55°. Since the light La from the first LED 7a is incident perpendicularly to the first incidence end surface 11a, the incidence angle $\theta_A$ of the light La from the first LED 7a with respect to the first main surface 5a is 55°. Further, since the light guide plate 5 of the present embodiment is a parallel plate, even when the light La from the first LED 7a is repeatedly totally reflected several times, the incidence angle $\theta_A$ with respect to the first main surface 5a is always 55°. When the light La from the first LED 7a reaches the first light extraction region RA and is incident on the interface between the light guide body 5 and the first low refractive index body 8a at the incidence angle $\theta_A=55°$, since the critical angle $\gamma_A$ herein is 60.1°, the light La is transmitted through the interface between the light guide body 5 and the first low refractive index body 8a, incident on the first low refractive index body 8a, scattered by the light scattering body 10, and then extracted to the outside. By doing so, a substantially whole amount of the light La emitted from the first LED 7a can be extracted from the first light extraction region RA.

Next, as illustrated in FIG. 2B, if it is assumed that the first LED 7a is turned off and the second LED 7b fixed to the second incidence end surface 11b is turned on, the angle $\beta_B$ formed between the second incidence end surface 11b and the first main surface 5a is 65°. Since the light Lb from the second LED 7b is incident perpendicularly to the second incidence end surface 11b, the incidence angle $\theta_B$ of the light Lb from the second LED 7b with respect to the first main surface 5a is 65°. The light Lb from the second LED 7b reaches the first light extraction region RA and is incident on the interface between the light guide body 5 and the first low refractive index body 8a at the incidence angle $\theta_B=65°$. Since the critical angle $\gamma_A$ herein is 60.1°, the light Lb is not transmitted through the interface between the light guide body 5 and the first low refractive index body 8a and is totally reflected. Next, the light Lb from the second LED 7b reaches the second light extraction region RB and is incident on the interface between the light guide body 5 and the second low refractive index body 8b at the incidence angle θB=65°. Since the critical angle $\gamma_B$ herein is 69.0°, the light Lb is transmitted through the interface between the light guide body 5 and the second low refractive index body 8b, incident on the second low refractive index body 8b, and then extracted to the outside from the light scattering body 10. By doing so, a substantially whole amount of the light Lb emitted from the second LED 7b can be extracted from the second light extraction region RB.

If the light La emitted from the first LED 7a is assumed to be incident on the second light extraction region RB, since the condition that the incidence angle is smaller than the critical angle is met even in this case, the light La can be extracted from the second light extraction region RB. However, the substantially whole amount of the light La emitted from the first LED 7a is extracted in the first light extraction region RA before the light La reaches the second light extraction region RB. Accordingly, there is little light reaching the second light extraction region RB. Accordingly, in fact, the light La emitted from the first LED 7a is not extracted from the second light extraction region RB, and the light Lb emitted from the second LED 7b is extracted from the second light extraction region RB. In the backlight 3 of the present embodiment, it is possible to extract, only from a predetermined light extraction region, light emitted from a predetermined LED based on such a principle.

Next, as illustrated in FIG. 2C, if it is assumed that the second LED 7b is turned off and the third LED 7c fixed to the third incidence end surface 11c is turned on, the angle $\beta_C$ formed between the third incidence end surface 11c and the first main surface 5a is 75°. The light Lc from the third LED 7c is incident perpendicularly to the second incidence end surface 11c. The incidence angle $\theta_C$ of the light Lc from the third LED 7c with respect to the first main surface 5a is 75°. The light Lc from the second LED 7c reaches the first light extraction region RA or the second light extraction region RB, and is incident on the interface between the light guide body 5 and the first low refractive index body 8a or the second low refractive index body 8b at an incidence angle $\theta_C$=75°. Since this incidence angle $\theta_C$ is greater than the critical angle $\gamma_A$ and the critical angle $\gamma_B$, the light Lc cannot be transmitted through either interface and is totally reflected. Then, if the light Lc from the third LED 7c reaches the third light extraction region RC, the light Lc is transmitted through the interface between the light guide body 5 and the refractive index body 9, incident on the refractive index body 9, and then extracted to the outside from the scattering body 10.

By doing so, a substantially whole amount of the light Lc emitted from the third LED 7c can be extracted from the third light extraction region RC.

As described above, according to the backlight 3 of the present embodiment, one of three light extraction regions RA, RB and RC from which light is extracted can be appropriately selected according to which of three LEDs 7a, 7b and 7c of each backlight unit 4 is turned on. That is, according to the backlight 3 of the present embodiment, one of the light extraction regions RA, RB and RC to emit the light can be appropriately selected according to which of three LEDs 7a, 7b and 7c of each backlight unit 4 is turned on. Further, an amount of the light extracted from the selected light extraction region RA, RB or RC, i.e., brightness of the selected light extraction region, can be adjusted by controlling the emitted light amount from the respective LEDs 7a, 7b and 7c.

In a backlight of the related art, it was controlled whether light was emitted from each region or not by electrically switching a light scattering degree of the polymer dispersed liquid crystal. Accordingly, if the light scattering property of the polymer dispersed liquid crystal is slightly degraded, the light is not sufficiently extracted or the light is leaked from a region other than a desired region, resulting in degraded contrast. On the other hand, in the backlight 3 of the present embodiment, it can be controlled whether the light is to be emitted from the respective light extraction regions RA, RB and RC or not by merely switching the LEDs 7a, 7b and 7c to be turned on, without using the polymer-dispersed liquid crystal. Thus, the light emitted from the illumination unit 6 is efficiently extracted from the light guide body 5, thereby obtaining a sufficient amount of light and realizing a high-contrast backlight 3. Further, it is possible to achieve a simple and thin structure and realize the backlight 3 at a low cost. Further, according to the present embodiment, with the above-described backlight 3, it is possible to realize the liquid crystal display device 1 capable of bright, high-contrast display.

The present inventors performed a simulation to obtain an emitted luminous flux amount of the light from the respective light extraction regions RA, RB and RC when changing the propagation angle of the light in the light guide plate in order to demonstrate the effects of the backlight of the first embodiment.

Hereinafter, a simulation result will be described using FIG. 3.

Figure 3:
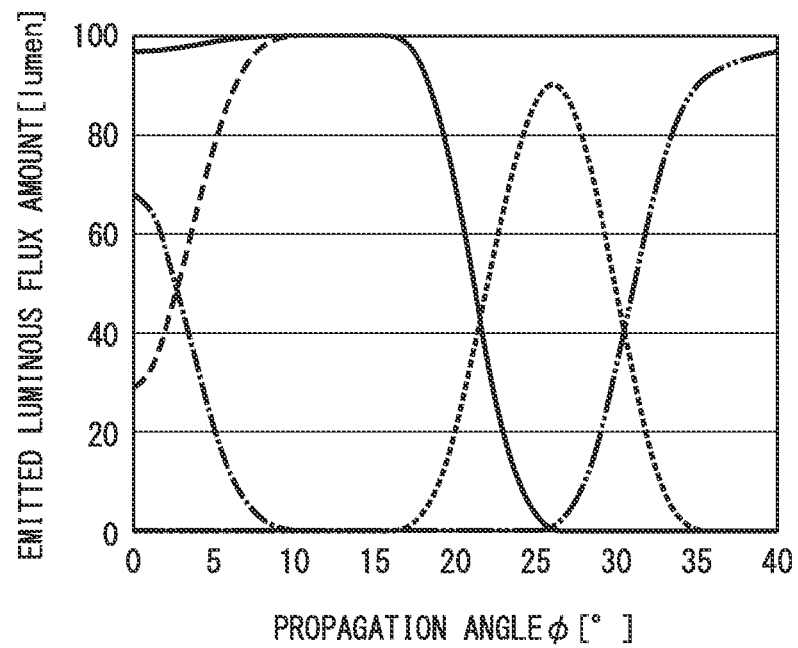
FIG. 3 is a graph illustrating a simulation result to demonstrate effects of the backlight of the embodiment.

FIG. 3 is a graph illustrating a light extraction state in the light guide body 5 having the first, second and third light extraction regions RA, RB and RC illustrated in FIGS. 1 and 2A to 2C. In the graph of FIG. 3, a horizontal axis indicates the propagation angle φ [°] of the light inside the light guide plate, and a vertical axis indicates an emitted luminous flux amount [lumen]. For five graphs, a two-dot chain line indicates the emitted luminous flux amount from the first light extraction region RA, a short-dashed line indicates the emitted luminous flux amount from the second light extraction region RB, a coarse dashed line indicates the emitted luminous flux amount from the third light extraction region RC, a one-dot chain line indicates the emitted luminous flux amount from the second end surface 5d (an end surface opposite to the surface on which LEDs have been installed), and a solid line indicates a sum of the emitted luminous flux amount from the third light extraction region RC and the emitted luminous flux amount from the second end surface 5d.

A basic configuration was the same as that of the backlight of the present embodiment, and the LED was assumed to be fixed to the first end surface of the light guide body by an optical adhesive. Simulation conditions were as follows. A total luminous flux amount emitted from the LED was 100 lumens. Directivity of the light emitted from the LED was set to 5° that is a half width of an intensity distribution while the light was guided inside the light guide body 5. Also, the emitted luminous flux amount directly on the respective light extraction regions RA, RB and RC when the propagation angle φ of the light in the light guide plate was changed from 0° to 40° was obtained. Changing of the propagation angle φ of the light in the light guide body from 0° to 40° corresponds to changing of the angle θ of incidence on the respective light extraction regions RA, RB and RC from 90° to 50°.

As illustrated in FIG. 3, when the propagation angle φ was 35° or more, i.e., the angle θ of incidence on the respective light extraction regions RA, RB and RC was 55° or less, the light was found to be emitted only from the first light extraction region RA. Further, when the propagation angle φ was 26°, i.e., the angle θ of incidence on each light extraction region was 64°, the light was found to be emitted only from the second light extraction region RB. Further, if the propagation angle φ ranged from 10° to 15°, i.e., the angle θ of incidence on each light extraction region ranged from 75° to 80°, the light was found to be emitted only from the third light extraction region RC. It was demonstrated from the simulation result that the light extraction region that will emit light can be selected by changing the propagation angle of the light within the light guide plate, i.e., by changing the incidence angle of the light for the respective light extraction regions RA, RB and RC.

Further, if the propagation angle φ is less than 10°, the light is not incident on the respective light extraction regions RA, RB and RC and is emitted from the second end surface, which is opposite to the first end surface on which the LED has been arranged. In this case, with a configuration such as a seventh embodiment that will be described later, it is possible to extract, from the third light extraction region RC, light emitted from the second end surface, and to extract light having the luminous flux amount shown by the graph of the sum of the emitted luminous flux amount from the third light extraction region RC and the emitted luminous flux amount from the second end surface.

Second Embodiment

Hereinafter, a second embodiment of the present invention will be described using FIG. 4.

A basic configuration of a backlight of the present embodiment is the same as that of the first embodiment, and the present embodiment differs from the first embodiment in a light extraction structure on light extraction regions of a light guide body. Accordingly, in the present embodiment, a description of the basic configuration of the backlight will be omitted and only the above light extraction structure will be described.

Figure 4:
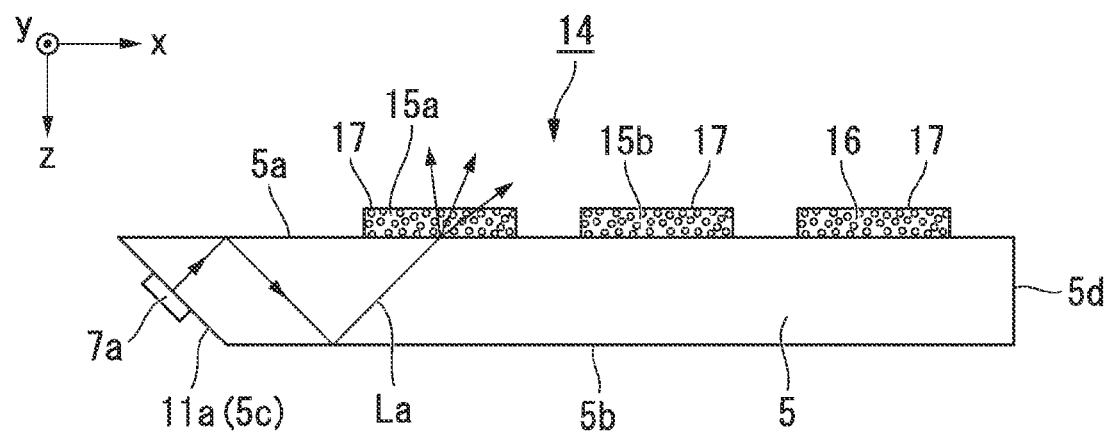
FIG. 4 is a cross-sectional view illustrating a backlight of a second embodiment.

FIG. 4 is a view illustrating a state in which light is emitted from the light extraction regions in the backlight of the present embodiment.

In FIG. 4, components common to the drawings used in the first embodiment are denoted by the same reference numerals, and a detailed description thereof will be omitted.

In the first embodiment, the low refractive index bodies 8a and 8b and the refractive index body 9, and the light scattering bodies 10 are stacked on the respective light extraction regions RA, RB and RC of the light guide body 5. On the other hand, in the backlight 14 of the present embodiment, only low refractive index bodies 15a and 15b and a refractive index body 16 are formed in the respective light extraction regions RA, RB and RC on a first main surface 5a of a light guide body 5, and a light scattering body is not stacked on the low refractive index bodies 15a and 15b and the refractive index body 16, as illustrated in FIG. 4. However, a light scattering material 17 such as scattering beads or a scattering filler that scatters incident light is mixed into the low refractive index bodies 15a and 15b and the refractive index body 16 of the present embodiment. The low refractive index bodies 15a and 15b and the refractive index body 16 themselves have a light scattering function. Accordingly, it is unnecessary to provide the light scattering body 10 as illustrated in the first embodiment, separately from the low refractive index bodies 15a and 15b and the refractive index body 16. Other configurations are the same as those of the first embodiment.

Even in the present embodiment, it is possible to obtain the same effects as the first embodiment, i.e., to obtain a backlight that has high contrast due to an obtained sufficient light amount, whose structure is simple and thin, and that is inexpensive.

Third Embodiment

Hereinafter, a third embodiment of the present invention will be described using FIG. 5.

A basic configuration of a backlight of the present embodiment is the same as that of the first embodiment, and the present embodiment differs from the first embodiment in a light extraction structure on light extraction regions of a light guide body, similar to the second embodiment.

Accordingly, in the present embodiment, a description of a basic configuration of the backlight will be omitted and only the above light extraction structure will be described.

Figure 5:
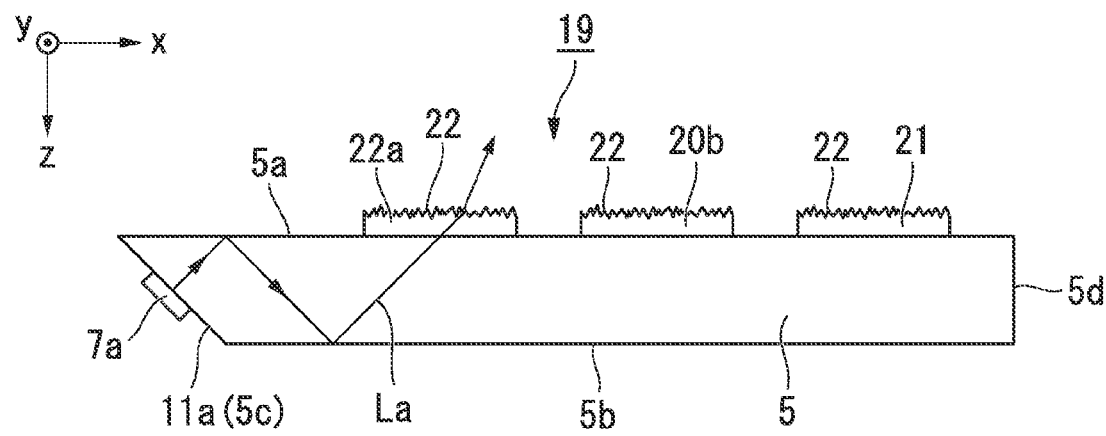
FIG. 5 is a cross-sectional view illustrating a backlight of a third embodiment.

FIG. 5 is a view illustrating a state in which light is emitted from light extraction regions in the backlight of the present embodiment.

In FIG. 5, components common to the drawings used in the first embodiment are denoted by the same reference numerals, and a detailed description thereof will be omitted.

In the first embodiment, the low refractive index bodies 8a and 8b and the refractive index body 9, and the light scattering bodies 10 are stacked on the respective light extraction regions RA, RB and RC of the light guide body 5. On the other hand, in a backlight 19 of the present embodiment, only low refractive index bodies 20a and 20b and a refractive index body 21 are formed in respective light extraction regions RA, RB and RC on a first main surface 5a of a light guide body 5, and a light scattering body is not stacked on the low refractive index bodies 20a and 20b and the refractive index body 21, as illustrated in FIG. 5.

However, a prism structure body 22 that widens an angle distribution of incident light and then emits the light is formed in upper surfaces of the low refractive index bodies 20a and 20b and the refractive index body 21 of the present embodiment, i.e., in surfaces on a light emitting side. Thus, the low refractive index bodies 20a and 20b and the refractive index body 21 themselves have a light diffusing function. Accordingly, it is unnecessary to provide the light scattering body 10 as illustrated in the first embodiment, separately from the low refractive index bodies 20a and 20b and the refractive index body 21. Other configurations are the same as those of the first embodiment.

Further, the prism structure body 22 may be a structure body in a triangular pillar shape having a ridge line in a direction (a y-axis direction) perpendicular to a paper surface of FIG. 5 or may be a structure body in a triangular pyramid shape.

Even in the present embodiment, it is possible to obtain the same effects as the first embodiment, i.e., to obtain a backlight that has high contrast due to an obtained sufficient light amount, whose structure is simple and thin, and that is inexpensive.

Further, in the present embodiment, when the prism structure body in a triangular pillar shape having a ridge line in the direction (the y-axis direction) perpendicular to the paper surface of FIG. 5 is used, the prism structure body has a function of widening an angle distribution of light within the paper surface (an xz plane) of FIG. 5, but does not have the function of widening an angle distribution of the light within the surface (the yz plane) perpendicular to the paper surface of FIG. 5. When such a prism structure body is used, another optical member having the function of widening an angle distribution of the light within the surface (the yz plane) perpendicular to the paper surface of FIG. 5, such as a prism sheet, may be used in combination with the backlight. Alternatively, an LED in which directivity of emitted light is not uniform in all directions, but is high (the angle distribution of the emitted light is narrow) within the paper surface (the xz plane) of FIG. 5 and low (the angle distribution of the emitted light is wide) in the surface (the yz plane) perpendicular to the paper surface may be used in place of the prism sheet.

On the other hand, light scattering in the light scattering body 10 of the first embodiment or the low refractive index bodies 15a and 15b and the refractive index body 16 of the second embodiment having the light scattering function is not due to the prism structure body, but due to a light scattering material, such as the scattering beads or the scattering filler. Accordingly, the light is scattered isotropically either within the paper surface (within the xz plane) of FIGS. 2A to 2C or FIG. 4 or within the surface (within the yz plane) perpendicular to the paper surface. Even in this case, three LEDs are aligned in the direction (the y-axis direction) perpendicular to the paper surface, and if it is considered that only one LED is turned on, a region in which the light is emitted may be considered not to sufficiently spread within the surface (within the yz plane) perpendicular to the paper surface. Accordingly, even in the first and second embodiments, an LED whose directivity is high (the angle distribution of the emitted light is narrow) within the paper surface (the xz plane) of FIGS. 2A to 2C or FIG. 4 and low (the angle distribution of the emitted light is wide) in the surface (the yz plane) perpendicular to the paper surface may be used.

Fourth Embodiment

Hereinafter, a fourth embodiment of the present invention will be described using FIG. 6 and FIGS. 7A to 7C.

A basic configuration of a backlight of the present embodiment is the same as that of the first embodiment. However, a method of varying a propagation direction inside a light guide body of light emitted from each LED differs from that of the first embodiment. Accordingly, in the present embodiment, a description of the basic configuration of the backlight will be omitted.

Figure 6:
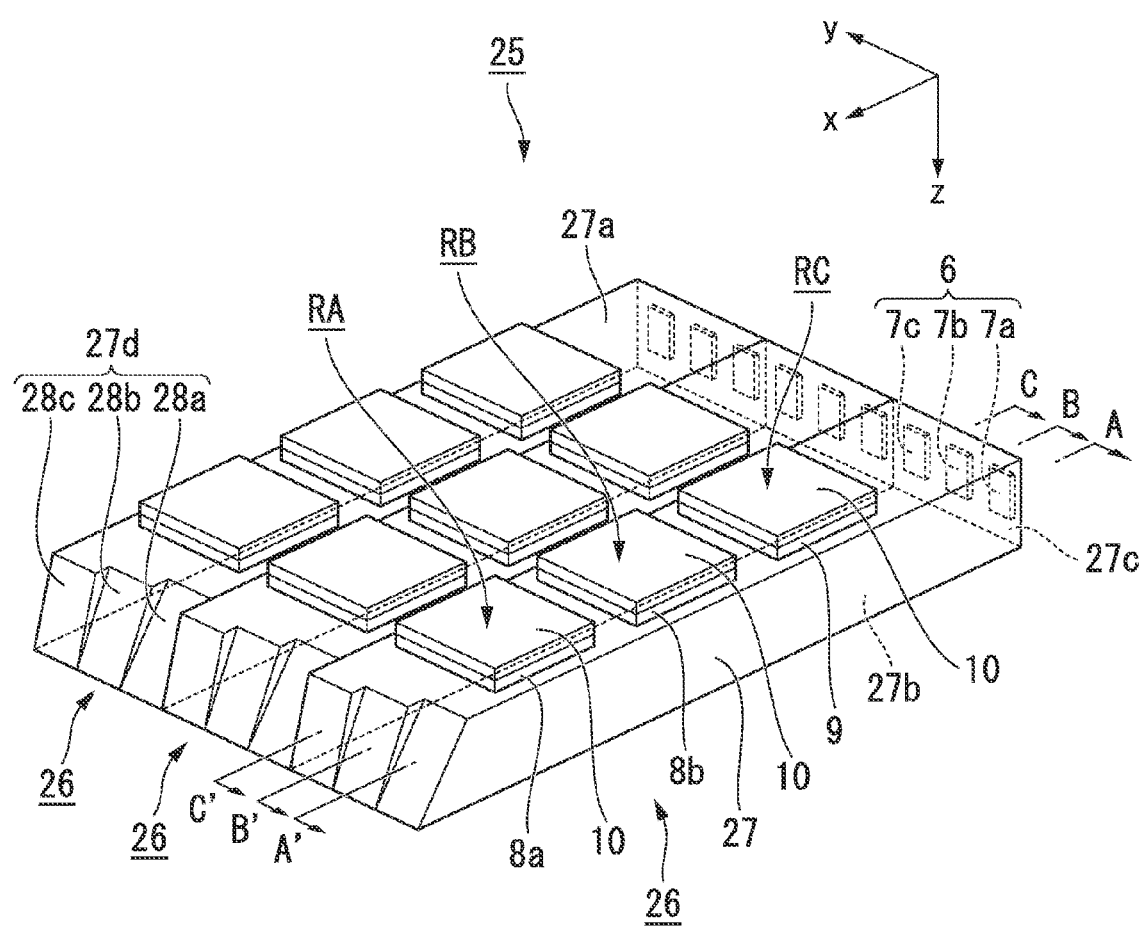
FIG. 6 is a cross-sectional view illustrating a backlight of a fourth embodiment.
Figure 7A:
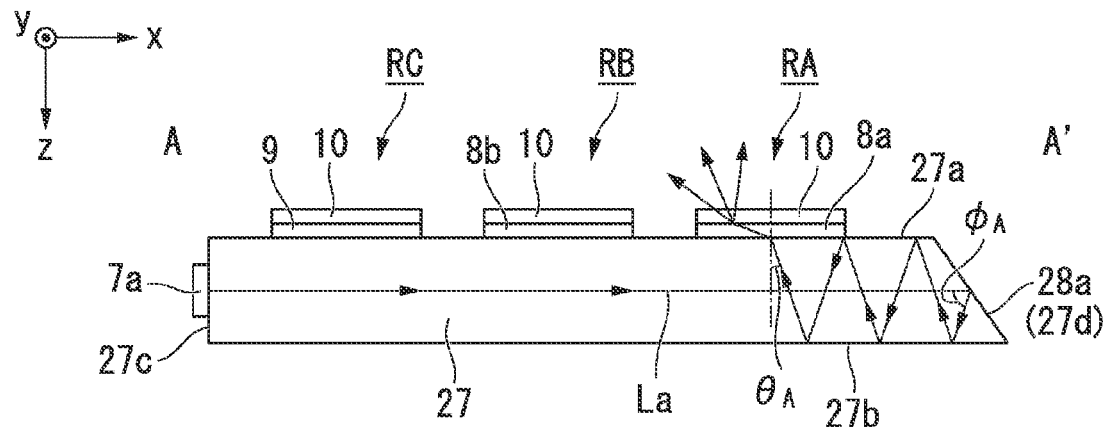
FIG. 7A is a view for explaining a principle of emitting light from each light extraction region in the backlight of the embodiment.
Figure 7B:
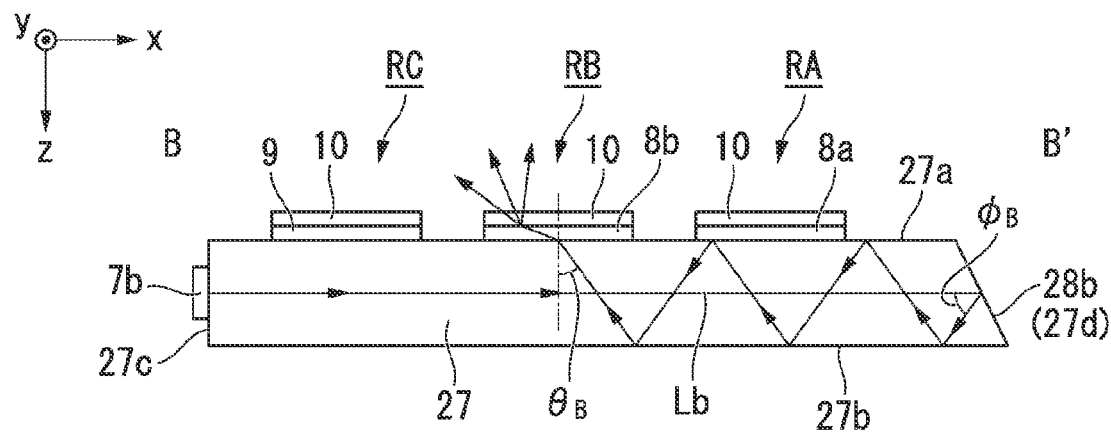
FIG. 7B is a view for explaining a principle of emitting light from each light extraction region in the backlight of the embodiment.
Figure 7C:
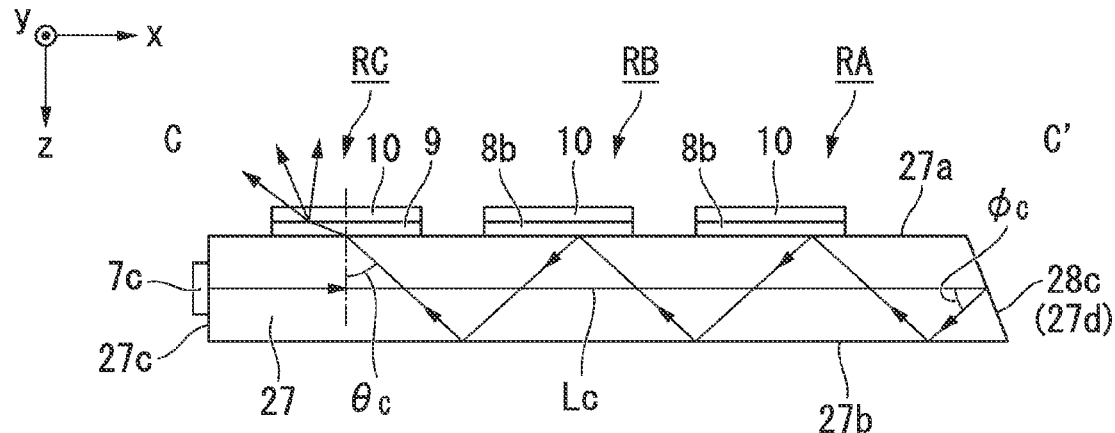
FIG. 7C is a view for explaining a principle of emitting light from each light extraction region in the backlight of the embodiment.

FIG. 6 is a perspective view illustrating the backlight of the present embodiment. FIGS. 7A to 7C are views illustrating a state in which light is emitted from each light extraction region in the backlight of the present embodiment. FIG. 7A illustrates a case in which light is emitted from a first light extraction region RA, FIG. 7B illustrates a case in which light is emitted from a second light extraction region RB, and FIG. 7C illustrates a case in which light is emitted from a third light extraction region RC.

In FIG. 6 and FIGS. 7A to 7C, components common to the drawings used in the first embodiment are denoted by the same reference numerals, and a detailed description thereof will be omitted.

In the backlight 3 of the first embodiment, in each backlight unit 4, the first end surface 5c of the light guide body 5 includes the first to third incidence end surfaces 11a, 11b and 11c having different inclination angles with respect to the first main surface 5a. Further, the LEDs 7a, 7b and 7c are fixed to the respective incidence end surfaces 11a, 11b and 11c. On the other hand, in a backlight 25 of the present embodiment, a first end surface 27c of a light guide body 27 in each backlight unit 26 is a surface perpendicular to a first main surface 27a, and three LEDs 7a, 7b and 7c are fixed to the first end surface 27c to be aligned in a transverse direction (a y-axis direction in FIG. 6) of the light guide body 27, as illustrated in FIG. 6.

On the other hand, a second end surface 27d of the light guide body 27 is divided into three portions in a transverse direction of the light guide body 27. The second end surface 27d of the light guide body 27 includes three inclined surfaces 28a, 28b and 28c having different angles with respect to the first main surface 27a. The inclined surfaces 28a, 28b and 28c may be formed, for example, by preparing a light guide body in which an angle formed between the first main surface 27a and the second end surface is a right angle and obliquely grinding the end surface so that each of three regions forms a different angle with respect to the first main surface 27a. For example, a metal film such as aluminum is formed on three inclined surfaces 28a, 28b and 28c using a sputtering method or a vapor deposition method to form a reflective film, which becomes a reflecting surface that reflects light propagated from the first end surface 27c on which the LEDs 7a, 7b and 7c have been installed.

Further, in the following description, for convenience, among three inclined surfaces 28a, 28b and 28c of the second end surface 27d, the inclined surface (the right of FIG. 6) whose angle with respect to the first main surface 27a is largest is referred to as a first reflecting end surface 28a. The inclined surface (a center of FIG. 6) whose angle with respect to the first main surface 27a is next largest is referred to as a second reflecting end surface 28b. The inclined surface (the left of FIG. 6) whose angle with respect to the first main surface 27a is smallest is referred to as a third reflecting end surface 28c. Further, an LED opposing the first reflecting end surface 28a is referred to as a first LED 7a. An LED opposing the second reflecting end surface 28b is referred to as a second LED 7b. An LED opposing the third reflecting end surface 28c is referred to as a third LED 7c.

Further, in the backlight 3 of the first embodiment, the low refractive index bodies 8a and 8b and the refractive index body 9 are arranged in three light extraction regions RA, RB and RC of the light guide body 5 so that the refractive index sequentially increases from the side close to the LEDs 7a, 7b and 7c to the side far from the LEDs. On the other hand, in the backlight 25 of the present embodiment, the low refractive index bodies 8a and 8b and the refractive index body 9 are arranged in three light extraction regions RA, RB and RC of the light guide body 27 so that the refractive index sequentially increases from the side far from the LEDs 7a, 7b and 7c to the side close to the LEDs, in contrast to the first embodiment. In other words, in the backlight 25 of the present embodiment, the low refractive index bodies 8a and 8b and the refractive index body 9 are arranged in three light extraction regions RA, RB and RC of the light guide body 27 so that the refractive index sequentially increases from the side close to the respective reflecting end surfaces 28a, 28b and 28c to the side far from the respective reflecting end surfaces. Specifically, a refractive index $n_A$ of the first low refractive index body 8a on the first light extraction region RA that is farthest from the respective LEDs 7a, 7b and 7c is set to 1.3, a refractive index $n_B$ of the second low refractive index body 8b on the second light extraction region RB that is next farthest from the respective LEDs 7a, 7b and 7c is set to 1.4, and a refractive index $n_C$ of the refractive index body 9 on the third light extraction region RC closest to the respective LEDs 7a, 7b and 7c is set to 1.5.

In the case of the present embodiment, the first end surface 27c of the light guide body 27 in which the LEDs 7a, 7b and 7c are installed is perpendicular to the first main surface 27a. Since lights La, Lb and Lc emitted from three LEDs 7a, 7b and 7c are all propagated in a horizontal direction (an x-axis direction in FIGS. 7A to 7C) that is a direction parallel to the first main surface 27a and the second main surface 27b as illustrated in FIGS. 7A to 7C, light is not incident on the first main surface 27a and the second main surface 27b. However, the lights La, Lb and Lc emitted from the respective LEDs 7a, 7b and 7c are incident on the respective reflecting end surfaces 28a, 28b and 28c having a different angle with respect to the first main surface 27a on the side of the second end surface 27d. Accordingly, lights reflected by the respective reflecting end surfaces 28a, 28b and 28c are propagated at different propagation angles inside the light guide plate 27 and incident at different incidence angles on the respective light extraction regions RA, RB and RC.

If the first LED 7a is assumed to be turned on, the light La emitted from the first LED 7a is reflected by the first reflecting end surface 28a as illustrated in FIG. 7A. In this case, the first reflecting end surface 28a has a greater angle with respect to the first main surface 27a than two other reflecting end surfaces 28b and 28c. Accordingly, if an angle formed by an axis of the reflected light with respect to a virtual horizontal plane is defined as a propagation angle $\phi$, a propagation angle $\phi_A$ of the light reflected by the first reflecting end surface 28a is greater than propagation angles $\phi_B$ and $\phi_C$ of lights reflected by two other reflecting end surfaces 28b and 28c. Conversely, if the third LED 7c is assumed to be turned on, the light Lc emitted from the third LED 7c is reflected by the third reflecting end surface 28c, as illustrated in FIG. 7C. In this case, the third reflecting end surface 28c has a smaller angle with respect to the first main surface 27a than two other reflecting end surfaces 28a and 28b. Thus, a propagation angle $\phi_C$ of the light reflected by the third reflecting end surface 28c is smaller than propagation angles $\phi_A$ and $\phi_B$ of lights reflected by two other reflecting end surfaces 28a and 28b. Further, as illustrated in FIG. 7B, the propagation angle $\phi_B$ of the light reflected by the second reflecting end surface 28b has a value between the propagation angles $\phi_A$ and $\phi_C$ of the lights reflected by two other reflecting end surfaces 28a and 28c.

Here, the values of the refractive indexes of the low refractive index bodies 8a and 8b and the refractive index body 9 on the respective light extraction regions RA, RB and RC are the same as those of the first embodiment. Accordingly, values of the critical angles of the respective light extraction regions RA, RB and RC are the same as those of the first embodiment. That is, the critical angle $\gamma_A$ in the first light extraction region RA is 60.1°. The critical angle $\gamma_B$ in the second light extraction region RB is 69.0°. The third light extraction region RC does not have a critical angle, and all incident lights are transmitted through an interface between the light guide body 27 and the refractive index body 9. Accordingly, similar to the first embodiment, as illustrated in FIG. 7A, when the light La emitted from the first LED 7a reaches the first light extraction region RA and the light is incident at an incidence angle $\theta_A$ less than 60.1° on the interface between the light guide body 27 and the first low refractive index body 8a, the light is transmitted through the interface between the light guide body 27 and the first low refractive index body 8a and extracted from the light scattering body 10 to the outside since the critical angle $\gamma_A$ herein is 60.1°. By doing so, a substantially whole amount of the light La emitted from the first LED 7a can be extracted from the first light extraction region RA.

Further, as illustrated in FIG. 7B, when the light Lb emitted from the second LED 7b reaches the first light extraction region RA, if the light is incident on the interface between the light guide body 27 and the first low refractive index body 8a at an incidence angle $\theta_B$ equal to or more than 60.1° and less than 69.0°, the light is not transmitted through the interface between the light guide body 27 and the first low refractive index body 8a and is totally reflected since the critical angle $\gamma_A$ herein is 60.1°. Next, when the light from the second LED 7b reaches the second light extraction region RB, the incidence angle $\theta_B$ is equal to or more than 60.1° and less than 69.0°, which is equal to that at a time point at which the light reaches the first light extraction region RA, but the critical angle $\gamma_B$ herein is 69.0°. Accordingly, the light can be transmitted through the interface between the light guide body 27 and the second low refractive index body 8b, and is extracted from the light scattering body 10 to the outside. By doing so, a substantially whole amount of the light emitted from the second LED 7b can be extracted from the second light extraction region RB.

Further, as illustrated in FIG. 7C, when light Lc emitted from the third LED 7c reaches the first light extraction region RA and the light is incident on the interface between the light guide body 27 and the first low refractive index body 8a at the incidence angle $\theta_C$ of 69.0° or more, the light cannot be transmitted through the interface and is totally reflected since the incidence angle $\theta_C$ is greater than the critical angle $\gamma_A$) ($\gamma_A$=60.1°. Further, when the light Lc emitted from the third LED 7c reaches the second light extraction region RB and the light is incident at the incidence angle $\theta_C$ of 69.0° or more on the interface between the light guide body 27 and the second low refractive index body 8b, the light cannot be transmitted through the interface and is totally reflected since this incidence angle $\theta_C$ is greater than the critical angle $\gamma_B$ ($\gamma_B$=69.0°. However, if the light Lc emitted from the third LED 7c reaches the third light extraction region RC, the light is transmitted through the interface between the light guide body 27 and the refractive index body 9 and then extracted from the light scattering body 10 to the outside. By doing so, a substantially whole amount of the light emitted from the third LED 7c can be extracted from the third light extraction region RC.

In terms of a positional relationship with the LEDs 7a, 7b and 7c, two low refractive index bodies 8a and 8b and the refractive index body 9 on three light extraction regions RA, RB and RC of the present embodiment are arranged reversely with the first embodiment. However, when viewed along the propagation direction of the reflected lights reflected by the respective reflecting end surfaces 28a, 28b and 28c and then incident on three light extraction regions RA, RB and RC, the refractive index bodies are arranged in order from the refractive index body having a relatively lower refractive index to the refractive index body having a relatively higher refractive index, similar to the first embodiment.

Further, when viewed along the propagation direction of the reflected lights incident on the light extraction regions RA, RB and RC, three light extraction regions RA, RB and RC are arranged in order from the light extraction region having a relatively narrower incidence angle range in which light can be extracted to the light extraction region having a relatively wider incidence angle range in which light can be extracted. The incidence angle range in which light can be extracted in the first light extraction region RA is less than 60.1°. The incidence angle range in which light can be extracted in the second light extraction region RB is less than 69.0°. The incidence angle range in which light can be extracted in the third light extraction region RC is a whole range.

As described above, even in the backlight 25 of the present embodiment, any of the light extraction regions RA, RB and RC from which the light is to be extracted can be appropriately selected according to which of three LEDs 7a, 7b and 7c of each backlight unit 26 is to be turned on, similar to the first embodiment. Further, the amount of the light extracted from the selected light extraction region RA, RB or RC, i.e., brightness of the selected light extraction region RA, RB or RC, can be adjusted by controlling the amount of the light emitted from the LEDs 7a, 7b and 7c.

Even in the present embodiment, it is possible to obtain the same effects as the first embodiment, i.e., to realize a backlight that has high contrast due to an obtained sufficient light amount, whose structure is simple and thin, and that is inexpensive.

Further, in the case of the present embodiment, since the entirety of the first end surface 27c of the light guide body 27 in which the LEDs 7a, 7b and 7c have been installed is flat, all the LEDs 7a, 7b and 7c are located on the same surface. Accordingly, for example, if it is considered that all the LEDs 7a, 7b and 7c are mounted on the same printed circuit board, a design of a LED mounting structure is facilitated.

Modified Example of Fourth Embodiment

Hereinafter, a modified example of the fourth embodiment will be described using FIG. 8.

Figure 8:
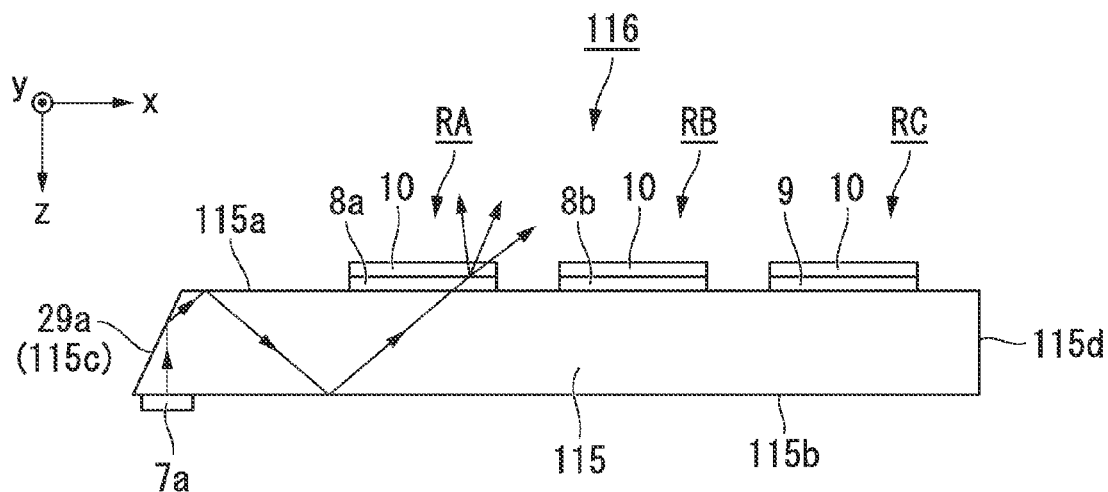
FIG. 8 is a cross-sectional view illustrating a backlight of a modified example of the fourth embodiment.

FIG. 8 is a view illustrating a state in which light is emitted from light extraction regions in a backlight of the present modified example.

In FIG. 8, common components to FIGS. 7A to 7C used in the fourth embodiment are denoted by the same reference numerals and a detailed description thereof will be omitted.

In the fourth embodiment, the LEDs 7a, 7b and 7c are installed in the first end surface 27c of the light guide body 27, and the second end surface 27c includes the reflecting end surfaces 28a, 28b and 28c having a different angle with respect to the first main surface 27a, as illustrated in FIGS. 7A to 7C. On the other hand, in a backlight 116 of the present modified example, an LED 7a is installed in a second main surface 115b of a light guide body 115, as illustrated in FIG. 8. A first end surface 115c includes a plurality of reflecting end surfaces 29a having different angles with respect to a first main surface 115a. Although only one reflecting end surface 29a is illustrated in FIG. 8, in fact, other reflecting end surfaces whose angles with respect to the first main surface 115a are different from that of the reflecting end surface 29a are formed in a depth direction (a y-axis direction in FIG. 8) of a paper surface. For the LEDs, although only one LED 7a is shown, in fact, other LEDs are installed in the depth direction of the paper surface. By this configuration, light emitted in a direction perpendicular to the second main surface 115b from each LED 7a is reflected by each reflecting end surface 29a and then is propagated inside the light guide body 115 at a different propagation angle.

Even in the present modified example, it is possible to obtain the same effects as the above embodiment, i.e., to realize a backlight that has high contrast due to an obtained sufficient light amount, whose structure is simple and thin, and that is inexpensive. Further, since all the LEDs 7a are installed in the second flat main surface 115b, mounting of the LEDs is facilitated.

Fifth Embodiment

Hereinafter, a fifth embodiment of the present invention will be described using FIG. 9.

A basic configuration of a backlight of the present embodiment is the same as that of the first embodiment, and the present embodiment differs from the first embodiment in a stacked structure on a light extraction region of a light guide body. Accordingly, in the present embodiment, a description of the basic configuration of the backlight will be omitted and only the above layered structure will be described.

Figure 9:
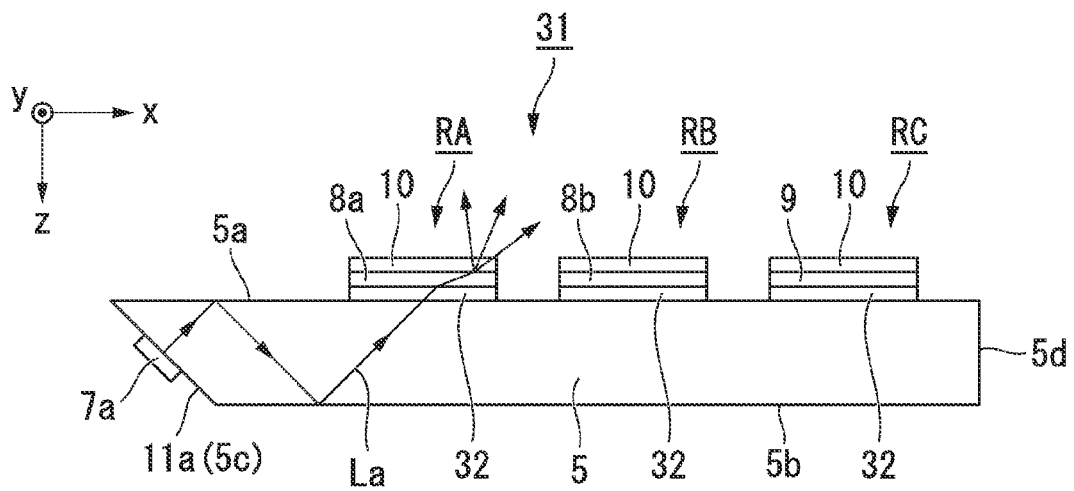
FIG. 9 is a cross-sectional view illustrating a backlight of a fifth embodiment.

FIG. 9 is a view illustrating a state in which light is emitted from light extraction regions in the backlight of the present embodiment.

In FIG. 9, components common to the drawings used in the first embodiment are denoted by the same reference numerals, and a detailed description thereof will be omitted.

In the backlight 3 of the first embodiment, the low refractive index bodies 8a and 8b and the refractive index body 9 are directly formed on the respective light extraction regions RA, RB and RC of the light guide body 5. On the other hand, in the backlight 31 of the present embodiment, an underlying layer 32 is formed on each of light extraction regions RA, RB and RC of a light guide body 5, and low refractive index bodies 8a and 8b or a refractive index body 9 and a light scattering body 10 are sequentially stacked on the underlying layer 32, as illustrated in FIG. 9. The underlying layer 32 is intended to be used, for example, for the purpose of securing wettability of the low refractive index materials with respect to the light guide body 5 and improving adhesiveness of the low refractive index materials to the light guide body 5 when the low refractive index bodies 8a and 8b or the refractive index body 9 are formed on the light guide body 5. A material of the underlying layer 32 may include a resin material of a different type from materials of the low refractive index bodies 8a and 8b and the refractive index body 9. As an example, a material having a higher refractive index than the light guide body 5, such as a fluorene-based acrylate "EA-5003" (registered trademark; refractive index: $n_C$=1.607) manufactured by Osaka Gas Chemicals Co. Ltd., may be used.

In the present embodiment, it is also possible to obtain the same effects as the first embodiment, i.e., to realize a backlight that has high contrast due to an obtained sufficient light amount, whose structure is simple and thin, and that is inexpensive.

Further, in the case of the present embodiment, even when a refractive index of the underlying layer 32 is higher than the refractive index of the light guide body 5, a change in refraction angle is canceled when light emitted from each of the light extraction regions RA, RB and RC is transmitted through two interfaces: an interface between the light guide body 5 and the underlying layer 32 and an interface between the underlying layer 32 and the low refractive index bodies 8a and 8b and the refractive index body 9. Accordingly, optical effects are not changed as compared with the case in which the underlying layer is not provided as in the first embodiment. However, it is possible to improve reliability of the backlight and obtain effects such as improvement of a manufacturing yield by using the underlying layer 32 having the function as described above. Further, the underlying layer 32 may be selectively formed on the light extraction regions RA, RB and RC or may be formed on an entire surface of the light guide body 5.

Sixth Embodiment

Hereinafter, a sixth embodiment of the present invention will be described using FIGS. 10 to 12.

A basic configuration of a backlight of the present embodiment is the same as that of the first embodiment, and the present embodiment differs from the first embodiment in that a structure body that changes a propagation angle of light inside the light guide body is added. Accordingly, in the present embodiment, a description of the basic configuration of the backlight will be omitted, and a structure of the light guide body will be mainly described.

Figure 10:
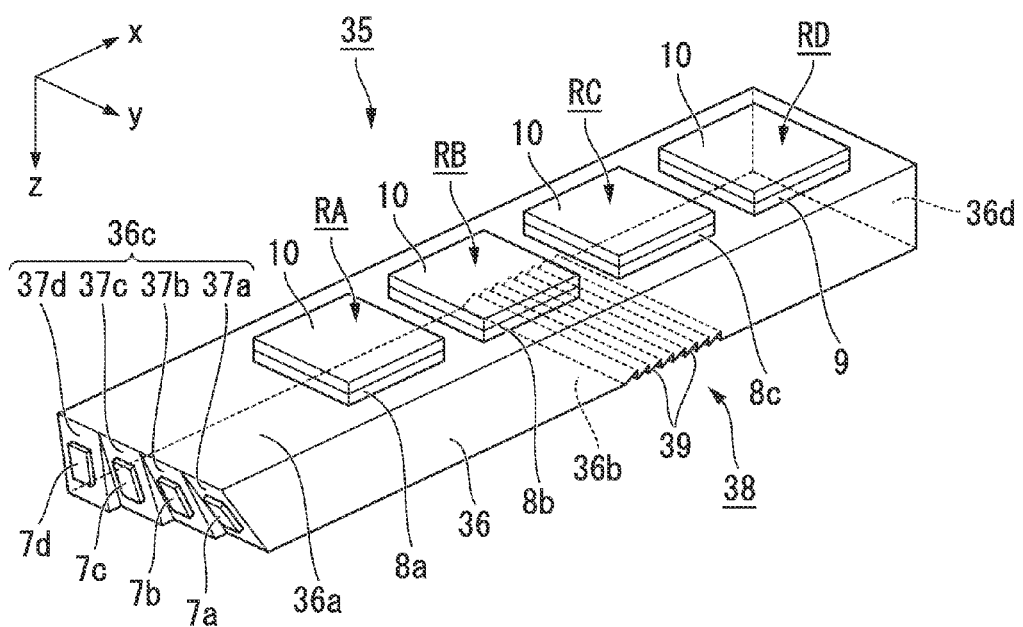
FIG. 10 is a perspective view illustrating a backlight of a sixth embodiment.
Figure 11A:
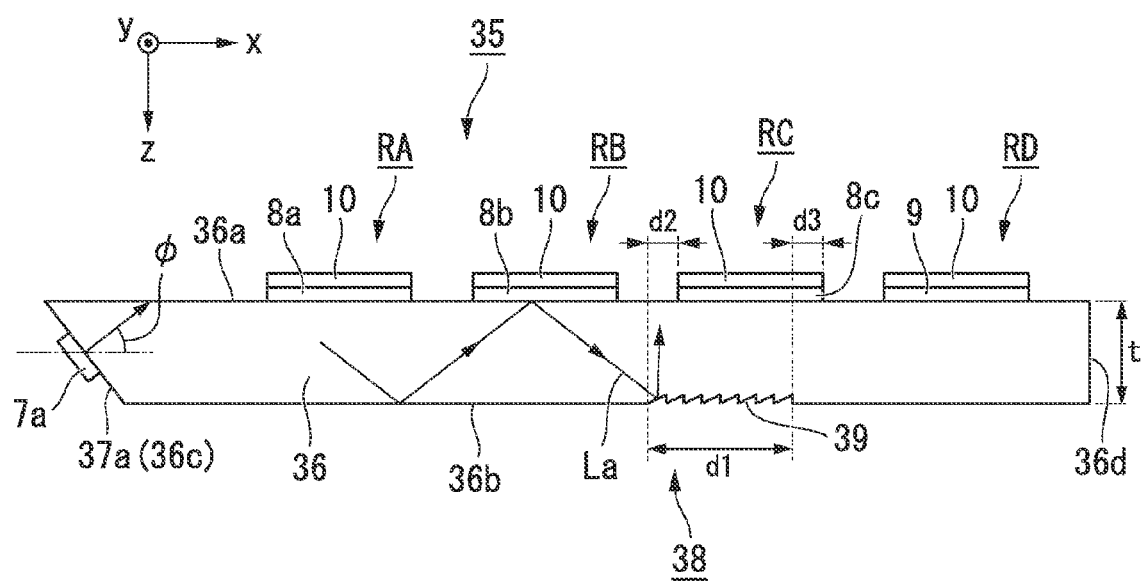
FIG. 11A is a view for explaining the principle of emitting light from each light extraction region in the backlight of the embodiment.
Figure 11B:
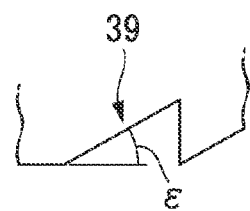
FIG. 11B is a view for explaining a configuration of a prism provided in a light guide body.

FIG. 10 is a perspective view illustrating the backlight unit of the present embodiment. FIG. 11A is a view illustrating a state in which light is emitted from light extraction regions in the backlight of the present embodiment, and FIG. 11B is a view illustrating a prism structure body inside the light guide body. FIG. 12 is a graph illustrating a simulation result to demonstrate effects of the backlight of the present embodiment.

In FIGS. 10, 11A and 11B, components common to the drawings used in the first embodiment are denoted by the same reference numerals, and a detailed description thereof will be omitted.

In a backlight 35 of the present embodiment, four light extraction regions RA, RB, RC and RD are provided in a longitudinal direction (an x-axis direction in FIG. 10) of a light guide body 36, as illustrated in FIG. 10. In the following description, the light extraction regions RA, RB, RC and RD are referred to as a first light extraction region RA, a second light extraction region RB, a third light extraction region RC, and a fourth light extraction region RD from a side close to a first end surface 36c having LEDs 7a, 7b, 7c, and 7d installed thereon to a side far from the first end surface 36c. The present embodiment is similar to the first embodiment in that low refractive index bodies 8a, 8b and 8c and a refractive index body 9, and light scattering bodies 10 are stacked on the respective light extraction regions RA, RB, RC, and RD.

In the case of the first embodiment, the low refractive index bodies 8a and 8b and the refractive index body 9 on the respective light extraction regions RA, RB and RC are arranged so that a refractive index sequentially increases from the side closer to the first end surface 5c to the side far from the first end surface 5c. On the other hand, in the present embodiment, a refractive index $n_A$ of the first low refractive index body 8a on the first light extraction region RA is set to 1.3. A refractive index $n_B$ of the second low refractive index body 8b on the second light extraction region RB is set to 1.4. A refractive index $n_C$ of the third low refractive index body 8c on the third light extraction region RC is set to 1.4. A refractive index $n_A$ of the refractive index body 9 on the fourth light extraction region RD is set to 1.5. That is, the refractive indices of the low refractive index bodies 8a, 8b, and 8c and the refractive index body 9 do not increase sequentially from the side close to the first end surface to the side far from the first end surface, but the refractive index $n_B$ of the second low refractive index body 8b and the refractive index $n_C$ of the third low refractive index body 8c are equal to each other. In other words, for convenience of the description, the second low refractive index body 8b and the third low refractive index body 8c are referred to separately, but the second low refractive index body 8b and the third low refractive index body 8c are formed of the same material.

The first end surface 36c of the light guide body 36 is divided into four portions in a transverse direction (a y-axis direction in FIG. 10) of the light guide body 36 and includes four inclined surfaces 37a, 37b, 37c, and 37d having different angles with respect to the first main surface 36a. For example, the inclined surfaces 37a, 37b, 37c, and 37d may be formed by preparing a light guide body in which an angle formed between the first main surface 36a and its end surface is a right angle and obliquely grinding the end surface to form a different angle with respect to the first main surface 36a in each of four divided regions. Further, LEDs 7a, 7b, 7c, and 7d are fixed substantially to centers of the respective inclined surfaces 37a, 37b, 37c, and 37d via an optical adhesive, respectively. Accordingly, in the first entire end surface 36c, four LEDs 7a, 7b, 7c, and 7d are aligned in the transverse direction of the light guide body 36.

Further, in the following description, for convenience, the inclined surface whose angle with respect to the first main surface 36a is smallest among four inclined surfaces 37a, 37b, 37c, and 37d of the first end surface 36c is referred to as a first incidence end surface 37a. The inclined surface whose angle with respect to the first main surface 36a is next smallest is referred to as a second incidence end surface 37b. The inclined surface whose angle with respect to the first main surface 36a is thirdly smallest is referred to as a third incidence end surface 37c. The inclined surface whose angle with respect to the first main surface 36a is largest is referred to as a fourth incidence end surface 37d. Further, the LED provided on the first incidence end surface 37a is referred to as a first LED 7a. The LED provided on the second incidence end surface 37b is referred to as a second LED 7b. The LED provided on the third incidence end surface 37c is referred to as a third LED 7c. The LED provided on the fourth incidence end surface 37d is referred to as a fourth LED 7d.

As illustrated in FIGS. 10 and 11A, a prism structure body (a propagation angle changing unit) 38 is formed in a region slightly close to the first end surface 36c relative to the third light extraction region RC on the second main surface 36b of the light guide body 36. The prism structure body 38 includes a plurality of prisms 39 whose shapes and sizes are the same, which are arranged to be adjacent in a longitudinal direction (an x-axis direction in FIG. 10) of the light guide body 36. Each prism 39 is a structure body in a triangular prism shape having a ridge line parallel to a transverse direction (a y-axis direction in FIG. 10) of the light guide body 36, and a front end angle (an inclination angle) $\epsilon$ of the prism 39 illustrated in FIG. 11B is, for example, $\epsilon=5°$. The prism structure body 38 is formed by cutting the second main surface 36b of the light guide body 36. Alternatively, the prism structure body 38 is formed simultaneously when the light guide body 36 is injection-molded. Further, the prism structure body 38 does not have to completely oppose the third light extraction region RC. For example, a size in the x-axis direction of the prism structure body 38 may not match a size in the x-axis direction of the third light extraction region RC. A position in the x-axis direction of the prism structure body 38 may be shifted from a position in the x-axis direction of the third light extraction region RC.

In the present embodiment, a behavior of light in the first light extraction region RA and the second light extraction region RB is the same as that of the first embodiment. That is, as described in the first embodiment, the critical angle $\gamma_A$ in the first light extraction region RA is 60.1°. The critical angle $\gamma_B$ in the second light extraction region RB is 69.0°. Accordingly, for example, light incident at the incidence angle of 55° can be extracted from the first light extraction region RA. Further, light incident at the incidence angle of 65° can be extracted from the second light extraction region RB.

On the other hand, a behavior of light when the light is incident on the third light extraction region RC differs from that of the first embodiment. In the case of the present embodiment, the third low refractive index body 8c provided in the third light extraction region RC has the same refractive index as the second low refractive index body 8b ($n_B=n_C=1.4$). Thus, a critical angle $\gamma_C$ in the third light extraction region RC is 69.0°, which is equal to the critical angle $\gamma_B$ in the second light extraction region RB. Accordingly, in the configuration of the first embodiment that does not have the prism structure body, light incident at the incidence angle of 69.0° or more with respect to the first main surface 36a, such as light incident at the incidence angle of 70°, is extracted from neither the second light extraction region RB nor the third light extraction region RC.

However, in the backlight 35 of the present embodiment, the prism structure body 38 is formed in a position slightly close to the first end surface 36c relative to the third light extraction region RC. Accordingly, the light La incident on the prism structure body 38 is reflected by an inclined surface of each prism 39, its propagation angle φ is changed into a greater propagation angle φ than that before the light is incident on the prism structure body 38, and the light is directed to the third light extraction region RC, as illustrated in FIG. 11A. Due to this action of the prism structure body 38, light incident on the second light extraction region RB at an incidence angle of 70° is incident on the third light extraction region RC at an incidence angle less than 70°. Accordingly, when the front end angle ε of the prism 39 is appropriately set so that the light is incident on the third light extraction region RC at a smaller incidence angle than 69.0°, which is the critical angle $\gamma_C$, this light can be extracted from the third light extraction region RC.

A behavior of light in the third light extraction region RC and the fourth light extraction region RD is exactly the same as the behavior of light in the second light extraction region RB and the third light extraction region RC in the first embodiment. That is, the incidence angle at a time point when light is incident on the third light extraction region RC is equal to or greater than 69.0° and the light that could not be extracted from the third light extraction region RC can be extracted from the fourth light extraction region RD.

In the present embodiment, it is also possible to obtain the same effects as the first embodiment, i.e., to realize a backlight that has high contrast due to an obtained sufficient light amount, whose structure is simple and thin, and that is inexpensive.

Further, in the case of the present embodiment, the number of light extraction regions RA, RB, RC and RD is larger by 1 than that of the first embodiment. In the case of the configuration of the first embodiment that does not have the prism structure body 38, it is necessary to increase the kind of the low refractive index body by one more. However, in the present embodiment, a configuration in which the prism structure body 38 is formed in the second main surface 36b of the light guide body 36 to change the propagation angle of the light after the prism structure body 38, thereby changing the incidence angle of the light after the third light extraction region RC is adopted. Accordingly, it is possible to increase the number of light extraction regions without increasing the type of the low refractive index body.

Further, in the present embodiment, while the second low refractive index body 8b and the third low refractive index body 8c are formed of the same material, they may not necessarily be formed of the same material.

The present inventors performed a simulation for obtaining an emitted luminous flux amount of the light from each light extraction region when the propagation angle of light within the light guide plate was changed, in order to demonstrate the effects of the backlight of the present embodiment.

Hereinafter, a simulation result will be described using FIG. 12.

Figure 12:
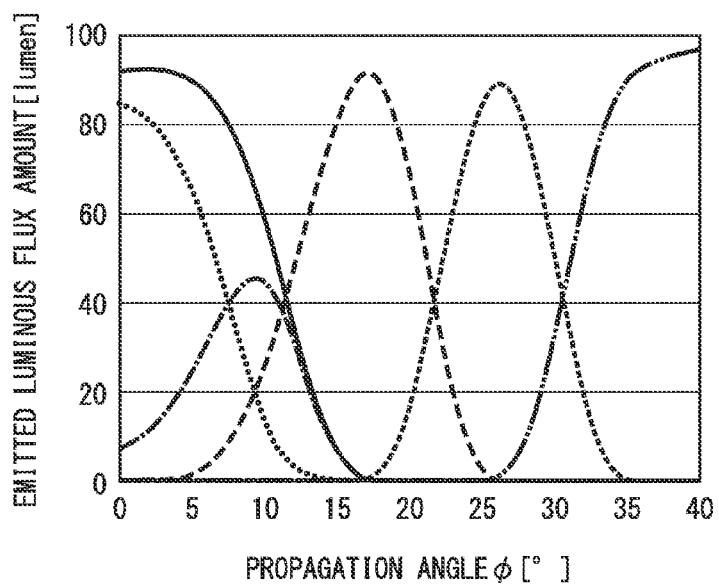
FIG. 12 is a graph illustrating a simulation result to demonstrate effects of the backlight of the embodiment.

A horizontal axis of a graph of FIG. 12 indicates a propagation angle φ [°] of light within the light guide plate, and a vertical axis indicates an emitted luminous flux amount [lumen]. For six graphs, a two-dot chain line indicates an emitted luminous flux amount from the first light extraction region RA, a short-dashed line indicates an emitted luminous flux amount from the second light extraction region RB, a coarse dashed line indicates an emitted luminous flux amount from the third light extraction region RC, a one-dotted dashed line indicates an emitted luminous flux amount from the fourth light extraction region RD, a dotted line indicates an emitted luminous flux amount from the second end surface, and a solid line indicates a sum of the emitted luminous flux amount from the fourth light extraction region RD and the emitted luminous flux amount from the second end surface.

It was assumed that a basic configuration was the same as the backlight of the above embodiment and the LED was fixed to the first end surface of the light guide body by the optical adhesive. Simulation conditions were as follows. A total luminous flux amount emitted from the LED was 100 lumens. Directivity of the light emitted from the LED was 5°, which is a half width. The front end angle ε of the prism formed in the second main surface of the light guide body was 5°. Also, the emitted luminous flux amount directly on each light extraction region when the propagation angle φ of the light within the light guide plate was changed from 0° to 40° was obtained.

As illustrated in FIG. 12, when the propagation angle φ was 35° or more, the light was found to be emitted only from the first light extraction region RA. Further, when the propagation angle φ was 26°, light was found to be emitted only from the second light extraction region RB. Further, when the propagation angle φ was 17°, light was found to be emitted only from the third light extraction region RC. Further, when the propagation angle φ was 4° or less, light was found to be emitted only from the fourth light extraction region RD. According to the configuration of the present embodiment in which the prism structure body is formed in the light guide body, it was demonstrated from this simulation result that it is possible to select any one of four light extraction regions RA, RB, RC, and RD with only three types of low refractive index bodies by changing the incidence angle of the light for each light extraction region.

Further, when the propagation angle φ is less than 15°, the light is also emitted from the second end surface. When a configuration such as a seventh embodiment that will be described below is adopted, the light emitted from the second end surface can also be extracted from the fourth light extraction region RD. In this case, light having a luminous flux amount shown in a graph of a sum of the emitted luminous flux amount from the fourth light extraction region RD and the emitted luminous flux amount from the second end surface can be obtained.

As in the simulation result described above, when the extraction of lights from the respective light extraction regions RA, RB, RC and RD is desired to be reliably isolated, it is desirable for a configuration of each portion to satisfy Expressions (1), (2) and (3) below.

When a thickness of the light guide body 36 is t, a size of the entire prism structure body 38 in an arrangement direction of the prism 39 is d1, a distance from a front end of the prism structure body 38 to a front end of the third light extraction region RC (the third low refractive index body 8c) is d2, a distance from a rear end of the prism structure body 38 to a rear end of the third light extraction region RC (the third low refractive index body 8c) is d3, the front end angle (the inclination angle) of the prism 39 is ε, and the propagation angle of the light is φ as illustrated in FIGS. 11A and 11B, it is desirable to satisfy Expressions (1), (2), and (3) below.

$$(t/\tan \phi) \times 2 \leq d1 \quad (1)$$

$$0 \leq d2 \leq t/\tan(\phi + 2\epsilon) \quad (2)$$

$$t/\tan(\phi + 2\epsilon) \leq d3 \quad (3)$$

This is because when the size d1 of the entire prism structure body 38 is smaller than $(t/\tan \phi) \times 2$, light passing toward the second end surface 36d without being reflected by the prism structure body 38 is generated. Further, this is because when the distance d2 from the front end of the prism structure body 38 to the front end of the third light extraction region RC (the third low refractive index body 8c) is greater than t/tan ($\phi$+2$\epsilon$, the light reflected once by the prism structure body 38 is reflected by the prism structure body 38 again, and accordingly, the propagation angle is changed twice and a desired propagation angle cannot be obtained. Further, this is because when the distance d3 from the rear end of the prism structure body 38 to the rear end of the third light extraction region RC (the third low refractive index body 8c) is smaller than t/tan ($\phi$+2$\epsilon$, light passing through the third light extraction region RC after the propagation angle has been changed by the prism structure body 38 is generated. However, if light is allowed to slightly leak in the light extraction regions other than the desired light extraction region, Expressions (1), (2), and (3) above need not necessarily be satisfied.

Modified Example of Sixth Embodiment

Hereinafter, a variant of the sixth embodiment will be described using FIG. 13.

Figure 13:
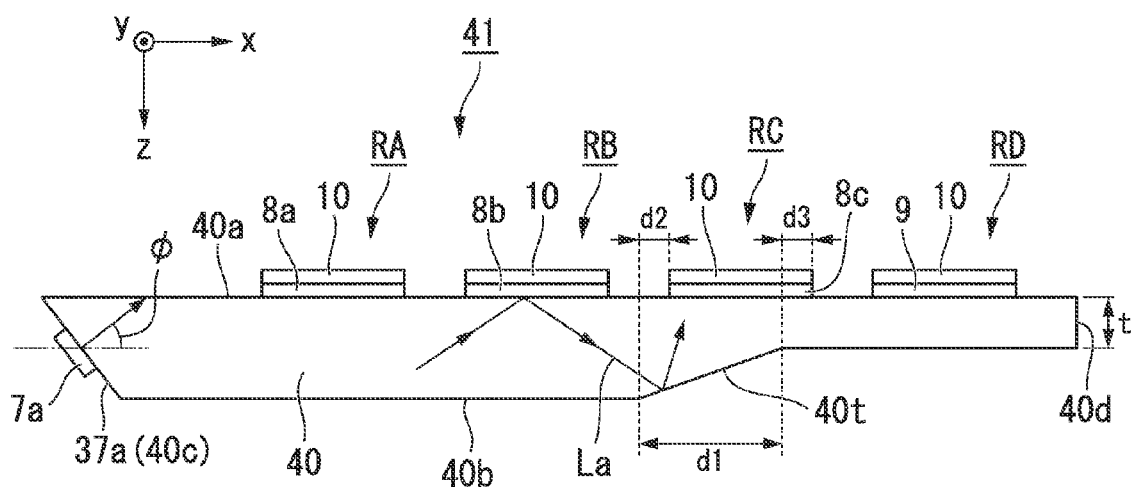
FIG. 13 is a cross-sectional view illustrating a backlight of a variant of the sixth embodiment.

FIG. 13 is a view illustrating a state in which light is emitted from light extraction regions in a backlight of the present modified example.

In FIG. 13, components common to FIG. 11A used in the sixth embodiment are denoted by the same reference numerals, and a detailed description thereof will be omitted.

In the sixth embodiment, the prism structure body 38 in which the plurality of prisms 39 are formed to be adjacent to each other is used as the propagation angle changing unit, as illustrated in FIG. 11A. On the other hand, in a backlight 41 of the present variant, one inclined surface 40t formed in a second main surface 40b of a light guide body 40 is used as the propagation angle changing unit, as illustrated in FIG. 13. This inclined surface 40t has the same function as the prism structure body 38 of the above embodiment. The inclined surface 40t has a slope approaching a first main surface 40a of the light guide body along the propagation direction of the light inside the light guide body. Light La incident on the inclined surface 40t is reflected by the inclined surface 40t, its propagation angle $\phi$ is changed into a greater propagation angle $\phi$ than that before the light is incident on the inclined surface 40t, and the light is directed to a third light extraction region RC.

In the present configuration, when a thickness of the light guide body 40 is t, a size of the entire inclined surface 40t is d1, a distance from a front end of the inclined surface 40t to a front end of the third light extraction region RC (a third low refractive index body 8c) is d2, a distance from a rear end of the inclined surface 40t to a rear end of the third light extraction region RC (the third low refractive index body 8c) is d3, an inclination angle of the inclined surface 40t is $\epsilon$, and the propagation angle of the light is $\phi$, it is desirable to satisfy Expressions (1), (2), and (3) above.

Seventh Embodiment

Hereinafter, a seventh embodiment of the present invention will be described using FIG. 14.

A basic configuration of a backlight of the present embodiment is the same as that of the first embodiment, and the present embodiment is the same as the sixth embodiment in that a light guide body includes a propagation angle changing unit. However, a concrete structure of the propagation angle changing unit differs from that of the sixth embodiment. Accordingly, in the present embodiment, a description of the basic configuration of the backlight will be omitted, and only the above propagation angle changing unit will be described.

Figure 14:
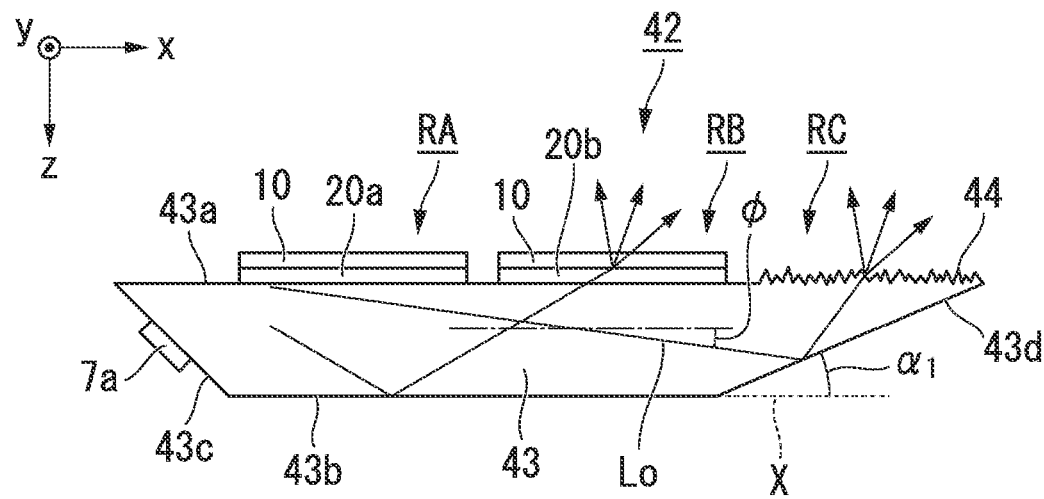
FIG. 14 is a cross-sectional view illustrating a backlight of a seventh embodiment.

FIG. 14 is a view illustrating a state in which light is emitted from light extraction regions in the backlight of the present embodiment.

In FIG. 14, components common to the drawings used in the first embodiment are denoted by the same reference numerals, and a detailed description thereof will be omitted.

The backlight 42 of the present embodiment includes three light extraction regions: a first light extraction region RA, a second light extraction region RB, and a third light extraction region RC, as illustrated in FIG. 14. However, unlike the first to sixth embodiments, low refractive index bodies 20a and 20b are formed on the first light extraction region RA and the second light extraction region RB, and a low refractive index body or a refractive index body is formed on the third light extraction region RC. A refractive index $n_A$ of the first low refractive index body 20a on the first light extraction region RA is 1.3, and a refractive index $n_B$ of the second low refractive index body 20b on the second light extraction region RB is 1.4. Further, as a structure for extracting light to the outside of the light guide body 43, a light scattering body 10 is formed on upper surfaces of the first low refractive index body 20a and the second low refractive index body 20b in the first light extraction region RA and the second light extraction region RB, similar to the third embodiment. In the third light extraction region RC, fine irregularities are formed as a light scattering surface 44 on the first main surface 43a of the light guide body 43.

In the first to sixth embodiments, the second end surface of the light guide body is a surface that forms right angles with the first main surface and the second main surface. On the other hand, in the present embodiment, a second end surface 43d of the light guide body 43 forms an angle other than the right angle with respect to the first main surface 43a and the second main surface 43b, and is an inclined surface (a propagation angle changing unit) that is inclined by an angle $\alpha_1$ with respect to a virtual horizontal plane X. In other words, an end portion opposing the third light extraction region RC in the second main surface 43b of the light guide body 43 is an inclined surface which is inclined in a direction standing up with respect to the propagation direction of the light, and the inclined surface is the second end surface (the propagation angle changing unit) 43d. That is, an end portion opposing the third light extraction region RC in the second main surface 43b of the light guide body 43 is an inclined surface approaching the first main surface 43a along a direction standing up with respect to the light propagation direction, and the inclined surface is the second end surface 43d (the propagation angle changing unit).

In the present embodiment, light Lo that could not be extracted in the first light extraction region RA and the second light extraction region RB is incident on the second inclined end surface 43d. This light is reflected by the second end surface 43d, its propagation angle $\phi$ is changed into a greater propagation angle $\phi$ than that before the light is incident on the second end surface 43d, and the light is directed to the third light extraction region RC and emitted from the third light extraction region RC.

In the present embodiment, it is also possible to obtain the same effects as the first embodiment, i.e., to realize a backlight that has high contrast due to an obtained sufficient light amount, whose structure is simple and thin, and that is inexpensive.

Further, in the case of the present embodiment, the configuration in which the second end surface 43d of the light guide body 43 is the inclined surface to change the propagation angle of the light incident on the second end surface 43d, thereby changing the incidence angle of the light for the third light extraction region RC and extracting the light to the outside, is adopted. Accordingly, three light extraction regions RA, RB and RC can be provided without using three types of low refractive index bodies. In the simulation result of the first embodiment or the sixth embodiment, a graph of the sum of the emitted luminous flux amount from the last light extraction region and the emitted luminous flux amount from the second end surface has been shown. However, when the configuration of the present embodiment is adopted, light having a luminous flux amount corresponding to a sum of the emitted luminous flux amount from the last light extraction region and the emitted luminous flux amount from the second end surface can be extracted from the third light extraction region RC.

Eighth Embodiment

Hereinafter, an eighth embodiment of the present invention will be described using FIG. 15.

A basic configuration of a backlight of the present embodiment is the same as that of the first embodiment and the present embodiment is the same as the seventh embodiment in that a light guide body includes a propagation angle changing unit including an inclined surface. However, a configuration of the inclined surface differs from that of the seventh embodiment. Accordingly, in the present embodiment, a description of the basic configuration of the backlight will be omitted and only the above propagation angle changing unit will be described.

Figure 15:
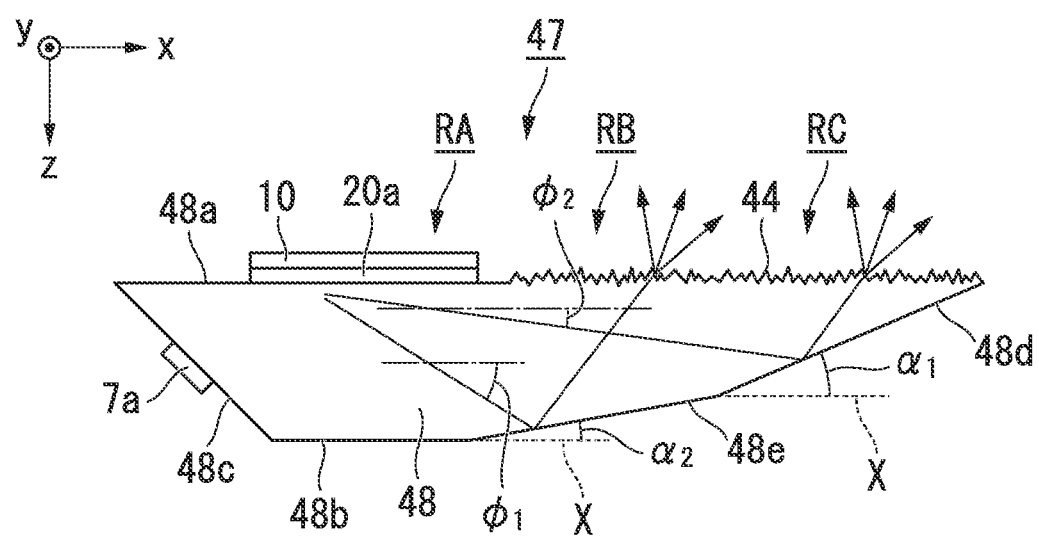
FIG. 15 is a cross-sectional view illustrating a backlight of an eighth embodiment.

FIG. 15 is a view a state in which light is emitted from light extraction regions in the backlight of the present embodiment.

In FIG. 15, components common to the drawings used in the first embodiment are denoted by the same reference numerals, and a detailed description thereof will be omitted.

A backlight 47 of the present embodiment includes three light extraction regions: a first light extraction region RA, a second light extraction region RB, and a third light extraction region RC, as illustrated in FIG. 15. However, a first low refractive index body 20a is formed on the first light extraction region RA, and a low refractive index body is not formed on the second light extraction region RB and the third light extraction region RC, unlike the seventh embodiment. A refractive index $n_A$ of the first low refractive index body 20a on the first light extraction region RA is 1.3. As a structure for extracting the light to the outside of the light guide body 48, a light scattering body 10 is formed on an upper surface of the first low refractive index body 20a in the first light extraction region RA. In the second light extraction region RB and the third light extraction region RC, fine projections are formed as a light scattering surface 44 on a first main surface 48a of the light guide body 48.

In the seventh embodiment, a portion opposing the third light extraction region RC in the second main surface 43b of the light guide body 43 is the inclined surface that is inclined by the angle α1 with respect to the virtual horizontal plane X. On the other hand, in the present embodiment, a portion opposing the third light extraction region RC in a second main surface 48b of the light guide body 48 is an inclined surface 48d (a propagation angle changing portion) that is inclined by an angle $α_1$ with respect to a virtual horizontal plane X and also is an inclined surface 48e (a propagation angle changing portion) that is inclined by an angle $α_2$ with respect to the virtual horizontal plane X. Here, the inclined surface opposing the third light extraction region RC is the first inclined surface 48d. The inclined surface opposing the second light extraction region RB is the second inclined surface 48e. The inclination angle $α_2$ of the second inclined surface 48e is set to be smaller than the inclination angle $α_1$ of the first inclined surface 48d.

In the present embodiment, light that could not be extracted in the first light extraction region RA is incident on the second inclined surface 48e. This light is reflected by the second inclined surface 48e, its propagation angle $φ_1$ is changed into a greater propagation angle than that before the light is incident on the second inclined surface 48e, and the light is directed to the second light extraction region RB and extracted from the second light extraction region RB. Further, the light that could not be extracted in the first light extraction region RA and the second light extraction region RB is incident on the first inclined surface 48d. This light is reflected by the first inclined surface 48d, its propagation angle $φ_2$ is changed into a greater propagation angle than that before the light is incident on the first inclined surface 48d, and the light is directed to the third light extraction region RC and emitted from the third light extraction region RC.

In the present embodiment, it is also possible to obtain the same effects as the first embodiment, i.e., to realize a backlight that has high contrast due to an obtained sufficient light amount, whose structure is simple and thin, and that is inexpensive.

Further, in the case of the present embodiment, the configuration in which two inclined surfaces: the first inclined surface 48d and the second inclined surface 48e, are formed in the light guide body 48 to change the propagation angle of the light incident on the first inclined surface 48d and the second inclined surface 48e, thereby extracting light from the second light extraction region RB and the third light extraction region RC to the outside, is adopted. Accordingly, it is possible to provide three light extraction regions RA, RB and RC using only one type of low refractive index body.

Ninth Embodiment

Hereinafter, a ninth embodiment of the present invention will be described using FIG. 16.

A basic configuration of a backlight of the present embodiment is the same as that of the first embodiment. The present embodiment is the same as the seventh and eighth embodiments in that a light guide body includes a propagation angle changing unit including an inclined surface.

However, the present embodiment differs from the seventh and eighth embodiments in a portion in which the inclined surface is formed. Accordingly, in the present embodiment, a description of the basic configuration of the backlight will be omitted and only the above propagation angle changing unit will be described.

Figure 16:
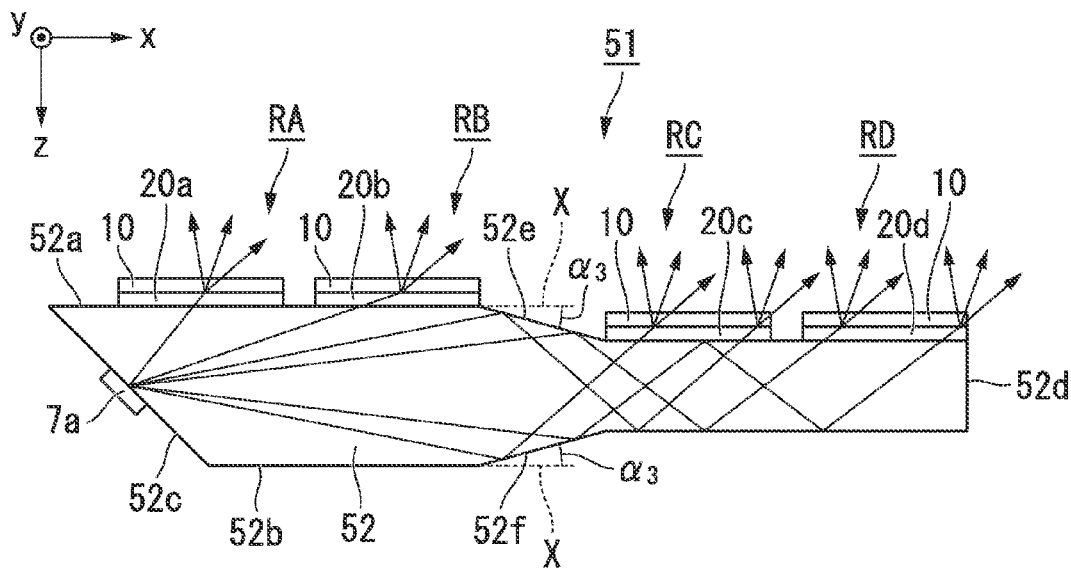
FIG. 16 is a cross-sectional view illustrating a backlight of a ninth embodiment.

FIG. 16 is a view illustrating a state in which light is emitted from light extraction regions in the backlight of the present embodiment.

In FIG. 16, components common to the drawings used in the first embodiment are denoted by the same reference numerals, and a detailed description thereof will be omitted.

A backlight 51 of the present embodiment includes four light extraction regions: a first light extraction region RA, a second light extraction region RB, a third light extraction region RC, and a fourth light extraction region RD, as illustrated in FIG. 16. First to fourth low refractive index bodies 20a, 20b, 20c and 20d are formed on the first to fourth light extraction regions RA, RB, RC, and RD, respectively. A refractive index $n_A$ of the first low refractive index body 20a on the first light extraction region RA is 1.3. A refractive index $n_B$ of the second low refractive index body 20b on the second light extraction region RB is 1.4. A refractive index $n_C$ of the third low refractive index body 20c on the third light extraction region RC is 1.3. A refractive index $n_D$ of the fourth low refractive index body 20d on the fourth light extraction region RD is 1.4. That is, the first low refractive index body 20a and the third low refractive index body 20c are formed of the same material. The second low refractive index body 20b and the fourth low refractive index body 20d are formed of the same material. As a structure for extracting the light to the outside of the light guide body 52, a light scattering body 10 is formed on upper surfaces of the respective low refractive index bodies 20a, 20b, 20c and 20d.

In a first main surface 52a of the light guide body 52, a portion between the second light extraction region RB and the third light extraction region RC is inclined in a direction standing up with respect to the light propagation direction and becomes an inclined surface 52e (a propagation angle changing unit) that is inclined by an inclined angle $\alpha_3$ with respect to a virtual horizontal plane X. In other words, in the first main surface 52a of the light guide body 52, the portion between the second light extraction region RB and the third light extraction region RC is inclined to approach a second main surface 52b along the light propagation direction and becomes the inclined surface 52e (the propagation angle changing unit) that is inclined by the angle $\alpha_3$ with respect to the virtual horizontal plane X. Similarly, in the second main surface 52b of the light guide body 52, a portion between the second light extraction region RB and the third light extraction region RC (a portion opposing the inclined surface 52e of the first main surface 52a) is inclined in a direction standing up with respect to the light propagation direction and becomes an inclined surface 52f (a propagation angle changing unit) inclined by the inclined angle $\alpha_3$ with respect to the virtual horizontal plane X. In other words, in the second main surface 52b of the light guide body 52, the portion between the second light extraction region RB and the third light extraction region RC is inclined to approach the second main surface 52b along the light propagation direction and becomes the inclined surface 52e (the propagation angle changing unit) that is inclined by the angle $\alpha_3$ with respect to the virtual horizontal plane X.

In the present embodiment, the light that could not be extracted in the first light extraction region RA and the second light extraction region RB is incident on the inclined surface 52e or the inclined surface 52f. In this case, a propagation angle of the light reflected by the inclined surface 52e or the inclined surface 52f is changed into a greater propagation angle than that before the light is incident on the inclined surface 52e or the inclined surface 52f, and the light is directed to the third light extraction region RC and emitted from the third light extraction region RC to the outside. That is, in the case of the present embodiment, a critical angle in the third light extraction region RC is equal to a critical angle in the first light extraction region RA, but the incidence angle when light is incident on the third light extraction region RC becomes smaller than that when the light is incident on the first light extraction region RA due to the reflection at the inclined surface 52e or the inclined surface 52f. Accordingly, the light that could not be extracted by the first light extraction region RA can be extracted from the third light extraction region RC.

Further, the light that could not be extracted in the first light extraction region RA to the third light extraction region RC is emitted to the outside from the fourth light extraction region RD. In this case, a critical angle at the fourth light extraction region RD is also equal to the critical angle in the second light extraction region RB, but the incidence angle when the light is incident on the fourth light extraction region RD becomes smaller than that when the light is incident on the second light extraction region RB due to reflection at the inclined surface 52e or the inclined surface 52f. Accordingly, the light that could not be extracted by the second light extraction region RB can be extracted from the fourth light extraction region RD.

In the present embodiment, it is also possible to obtain the same effects as the first embodiment, i.e., to realize a backlight that has high contrast due to an obtained sufficient light amount, whose structure is simple and thin, and that is inexpensive.

Further, in the case of the present embodiment, the configuration in which the inclined surfaces 52e and 52f are formed in the first main surface 52a and the second main surface 52b of the light guide body 52, respectively, to change the propagation angle of the light incident on the inclined surfaces 52e and 52f, thereby extracting the light from the third light extraction region RC and the fourth light extraction region RD to the outside, is adopted. Thus, the four light extraction regions RA, RB, RC, and RD can be provided using only two types of low refractive index bodies.

In the sixth to ninth embodiments, the configuration example in which the propagation angle changing unit is provided inside the light guide body instead of using a simple parallel plate as the light guide body has been described above. Specifically, the configuration example in which the propagation angle changing unit is provided inside the light guide body using a scheme of forming a prism structure in the light guide body, a scheme of forming an inclined surface in the first main surface and the second main surface of the light guide body, or the like has been described.

Thus, it is possible to select a region from which light is extracted even in the light extraction region having the same critical angle by changing the propagation angle of light propagated inside the light guide body midway using the propagation angle changing unit. Accordingly, it is possible to increase the number of light extraction regions without an increase in types of used low refractive index bodies. Further, it is possible to enhance light utilization efficiency since light reaching the second end surface opposing the LED can be extracted from the last light extraction region by providing the propagation angle changing unit at an end portion in a light guide direction.

Tenth Embodiment

Hereinafter, a tenth embodiment of the present invention will be described using FIG. 17.

A basic configuration of a liquid crystal display device of the present embodiment is the same as that of the first embodiment, and the present embodiment differs from the first embodiment in an arrangement of a backlight relative to a liquid crystal panel. Accordingly, in the present embodiment, a description of the basic configuration of the backlight will be omitted.

Figure 17:
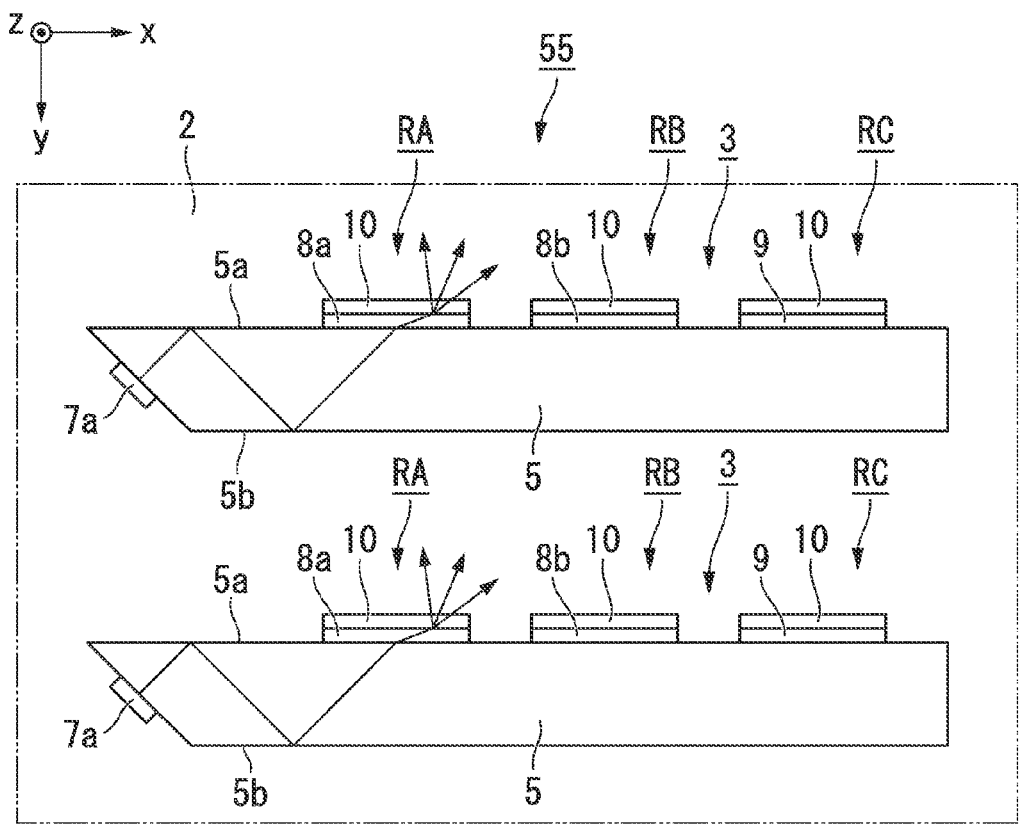
FIG. 17 is a front view illustrating a liquid crystal display device of a tenth embodiment.

FIG. 17 is a plan view illustrating a liquid crystal display device in the present embodiment.

In FIG. 17, components common to the drawings used in the first embodiment are denoted by the same reference numerals, and a detailed description thereof will be omitted.

In the case of the liquid crystal display device 1 of the first embodiment, the liquid crystal panel 2 and the backlight 3 are arranged in an attitude in which a display surface of the liquid crystal panel 2 and the first main surface 5a of the light guide body 5 are parallel, as illustrated in FIG. 1. On the other hand, in the case of a liquid crystal display device 55 of the present embodiment, as illustrated in FIG. 17, a liquid crystal panel 2 and a backlight 3 are arranged in an attitude in which a display surface of the liquid crystal panel 2 and a first main surface 5a and a second main surface 5b of the light guide body 5 are perpendicular to each other, and two backlights 3 are provided for one liquid crystal panel 2. That is, the attitude of the backlights 3 with respect to the liquid crystal panel 2 of the present embodiment is an attitude in which the backlight 3 of the first embodiment illustrated in FIG. 1 is rotated by 90° around the axis x.

Lights emitted from respective light extraction regions RA, RB and RC of the light guide body 5 are scattered not only within a surface (an xy plane) parallel to a paper surface of FIG. 17, but also within a surface (a yz plane) perpendicular to the paper surface by a light scattering body 10. Accordingly, the light emitted in a direction perpendicular to the paper surface of FIG. 17 from the respective light extraction regions RA, RB and RC is caused to be incident on the liquid crystal panel 2, thereby performing display. Further, in the case of the present embodiment, it is desirable to install an optical member such as a light diffusion film between the liquid crystal panel 2 and the backlight 3. By using the optical member such as the light diffusion film, the lights emitted from the respective light extraction regions RA, RB and RC are diffused within the display surface of the liquid crystal panel 2, thereby uniformizing luminance of the light emitted from the liquid crystal panel 2.

In the present embodiment, it is also possible to obtain the same effects as the first embodiment, i.e., to realize a backlight that has high contrast due to an obtained sufficient light amount, whose structure is simple and thin, and that is inexpensive.

Further, in the case of the present embodiment, a rod-shaped light guide body may be used in place of the plate-shaped light guide body 5 as in the first embodiment. With the rod-shaped light guide body, it is possible to increase a degree of freedom of design concerning an arrangement or a density of the light guide body, such as dense arrangement of the light guide body in a comb shape with respect to the display surface of the liquid crystal panel. Further, with the rod-shaped light guide body, a thickness of the entire liquid crystal display device does not increase.

Eleventh Embodiment

Hereinafter, an eleventh embodiment of the present invention will be described using FIGS. 18 and 19.

A basic configuration of a liquid crystal display device of the present embodiment is the same as that of the first embodiment, and the present embodiment differs from the first embodiment in a configuration for causing light having different propagation angles to be incident on a light guide body. Accordingly, in the present embodiment, a description of the basic configuration of the backlight will be omitted.

Figure 18:
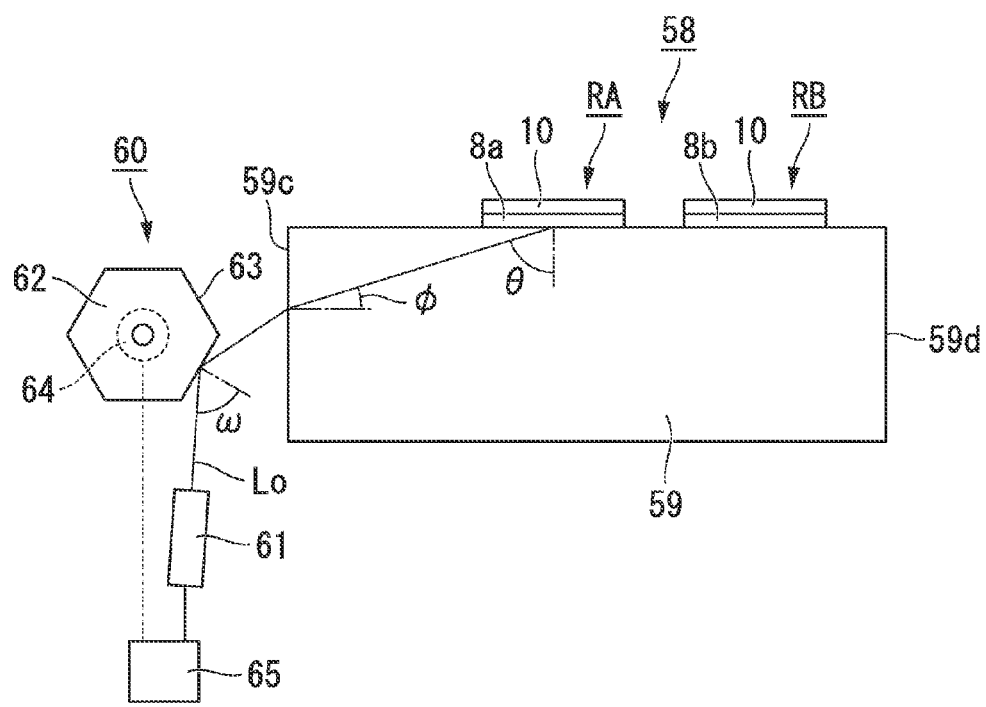
FIG. 18 is a cross-sectional view illustrating a backlight of an eleventh embodiment.

FIG. 18 is a cross-sectional view illustrating a backlight of the present embodiment. FIG. 19 is a timing chart for explaining an operation of each unit of the backlight of the present embodiment.

In FIG. 18, components common to the drawings used in the first embodiment are denoted by the same reference numerals, and a detailed description thereof will be omitted.

A backlight 58 of the present embodiment includes a light guide body 59 having two light extraction regions RA and RB, and an illumination unit 60, as illustrated in FIG. 18. Further, the illumination unit 60 includes an LED (a light source) 61 and a polygon mirror (a propagation angle changing element; reflection element) 62. The polygon mirror 62 includes a rotatable reflecting body 6 in a hexagonal prism shape and has a six-sided mirror 63. The LED 61 and the polygon mirror 62 are arranged together on the side of a first end surface 59c of the light guide body 59, and light L0 emitted from the LED 61 is reflected by each mirror 63 of the polygon mirror 62 and incident on the light guide body 59 from the first end surface 59c. The polygon mirror 62 has a function of changing a travel direction of the reflected light through its revolution. Further, the backlight 58 includes a rotational driving source 64 such as a motor, a control unit 65 that controls the number of revolutions of the polygon mirror 62 or the like, and the like. Further, the control unit 65 not only performs revolution control for the polygon mirror 62, but also performs on/off of the LED 61 and control of a light amount.

The light guide body 59 has two light extraction regions: a first light extraction region RA and a second light extraction region RB. Low refractive index bodies 8a and 8b are formed on the light extraction regions RA and RB, respectively. A refractive index $n_A$ of the first low refractive index body 8a on the first light extraction region RA is 1.3 and a refractive index $n_B$ of the second low refractive index body 8b on the second light extraction region RB is 1.4, which are equal to those of the first light extraction region RA and the second light extraction region RB of the first embodiment. Accordingly, a critical angle in the first light extraction region RA is 60.1° and a critical angle in the second light extraction region RB is 69.0°. A light scattering body 10 is stacked on the low refractive index bodies 8a and 8b.

In the first embodiment, the LEDs 7a, 7b and 7c are installed in three incidence end surfaces 11a, 11b and 11c of the light guide body 5 whose inclination angles are different from each other, respectively. The propagation angle φ of the light inside the light guide body 5 is varied and the angle of incidence on the light extraction regions RA, RB and RC is varied according to which of the lights LEDs 7a, 7b and 7c is turned on. On the other hand, in the present embodiment, a propagation angle φ of the light inside the light guide body 59 is changed in terms of time by rotating the polygon mirror 62 simultaneously with turning the LED 61 on. Accordingly, the light emitted from the LED 61 can be incident on the respective light extraction regions RA and RB at different incidence angles θ. Thus, in the first embodiment, the propagation angle φ has only three discrete values while in the present embodiment, the propagation angle φ has a continuously changing value.

Figure 19:
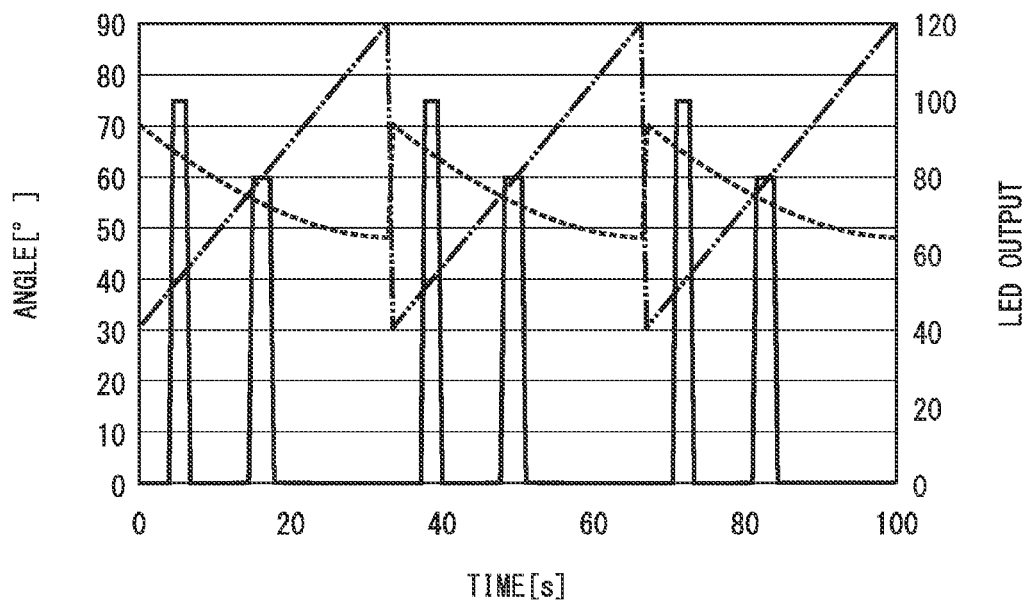
FIG. 19 is a timing chart for explaining an operation of each unit of the backlight of the embodiment.

In FIG. 19, a two-dot chain line indicates an angle (a symbol ω in FIG. 18) of incidence on the mirror 63 of the emitted light from the LED 61, a dotted line indicates an angle (a symbol θ in FIG. 18) of incidence on the light guide body 59 (the light extraction regions RA and RB) of the emitted light from the LED 61, and a solid line indicates an output of the LED 61. A horizontal axis in FIG. 19 indicates time [s], a left vertical axis indicates an angle [°], and a right vertical axis indicates the LED output. Further, the number of revolutions of the polygon mirror 62 is 20 rev/sec. For the angle θ of incidence on the light guide body 59 (the light extraction regions RA and RB), a refractive index of the light guide body 59 is 1.5, a refractive index of air is 1.0, and refraction when light is incident on the first end surface 59c of the light guide body 59 is considered.

As has been described in the first embodiment, if the angle θ of incidence on the respective light extraction regions RA and RB of the light guide body 59 is less than 60.1°, the light can be extracted from the first light extraction region RA. If the angle θ of incidence on the respective light extraction region RA and RB of the light guide body 59 is equal to or more than 60.1° or less than 69.0°, the light can be extracted from the second light extraction region RB. Accordingly, it can be seen from FIG. 19 that the LED 61 may be turned on only for a period of time in which the angle ω of incidence on the mirror 63 is 57° to 61° and 38° to 41°, and may be turned off in other periods in order to cause the light to be incident on the respective light extraction regions RA and RB of the light guide body 59, for example, at the incidence angle θ of 55°±1° and 65°±1°. By doing so, the angle θ of incidence on the respective light extraction regions RA and RB is 55°±1° in a period in which the angle ω of incidence on the mirror 63 is 57° to 61°, and the light can be extracted from the first light extraction region RA. Further, the angle θ of incidence on the respective light extraction regions RA and RB is 65°±1° in a period in which the angle ω of incidence on the mirror 63 is 38° to 41°, and the light can be extracted from the second light extraction region RB.

Further, when amounts of lights (luminance) extracted from both of the light extraction regions RA and RB are desired to be uniform, the output of the LED 61 may be adjusted so that a product of an amount of light emitted from the LED 61 and a turn-on time of the LED 61 is equal on both sides. In the example of FIG. 19, since the period in which the angle ω of incidence on the mirror 63 is 38° to 41° is shorter than the period in which the angle ω of incidence on the mirror 63 is 57° to 61°, the output of the LED 61 in the period in which the incidence angle ω for the mirror 63 is 38° to 41° is greater than the output of the LED 61 in the period in which the incidence angle ω for the mirror 63 is 57° to 61°.

In the present embodiment, it is also possible to obtain the same effects as the first embodiment, i.e., to realize a backlight that has high contrast due to an obtained sufficient light amount, whose structure is simple and thin, and that is inexpensive.

In the case of the present embodiment, since the propagation angle φ of the light is changed by the revolution of the polygon mirror 62, it is not necessary to use many LEDs as in the first embodiment.

Further, in the present embodiment, both of the LED 61 and the polygon mirror 62 are arranged on the side of the first end surface 59c of the light guide body 59. However, unlike this configuration, the LED 61 may be arranged on the side of the first end surface 59c of the light guide body 59, and the polygon mirror 62 may be arranged on the side of a second end surface 59d of the light guide body 59. In this case, the light emitted from the LED 61 is first transmitted through the light guide body 59 from the first end surface 59c to the second end surface 59d and then reflected by the polygon mirror 62 arranged on the side of the second end surface 59d, such that the propagation angle φ is changed when the light is incident from the second end surface 59d again. In this case, since the propagation angle φ of the light is changed on the side of the second end surface 59d far from the LED 61, it is necessary to arrange the low refractive index bodies so that the refractive index sequentially increases from the side far from the LED 61 to the side close to the LED as in light guide body of the fourth embodiment. According to this configuration, since the LED 61 and the polygon mirror 62 are distributed to and arranged on both sides of the light guide body 59, layout of various members incidental to the LED 61 or the polygon mirror 62 is facilitated.

Further, in the above embodiment, while the polygon mirror has been illustrated as the reflection element that reflects the light from the LED and causes the light to be incident on the light guide body, for example, a MEMS (Micro Electro Mechanical Systems) mirror may be used in place of the polygon mirror. A conventionally known MEMS mirror may be used as the MEMS mirror. For example, a type of a MEMS mirror that has a rotation shaft extending in a direction parallel to a reflecting surface of the mirror and rotates around the rotation shaft may be used. Alternatively, a MEMS mirror that has a center shaft extending in a direction perpendicular to a reflecting surface of the mirror and is inclined with respect to the central shaft may be used.

Twelfth Embodiment

Hereinafter, a twelfth embodiment of the present invention will be described using FIG. 20.

A basic configuration of a liquid crystal display device of the present embodiment is the same as that of the first embodiment, and the present embodiment differs from the first embodiment in a configuration for causing light having a different propagation angle to be incident on a light guide body. Accordingly, in the present embodiment, a description of the basic configuration of the backlight will be omitted.

Figure 20:
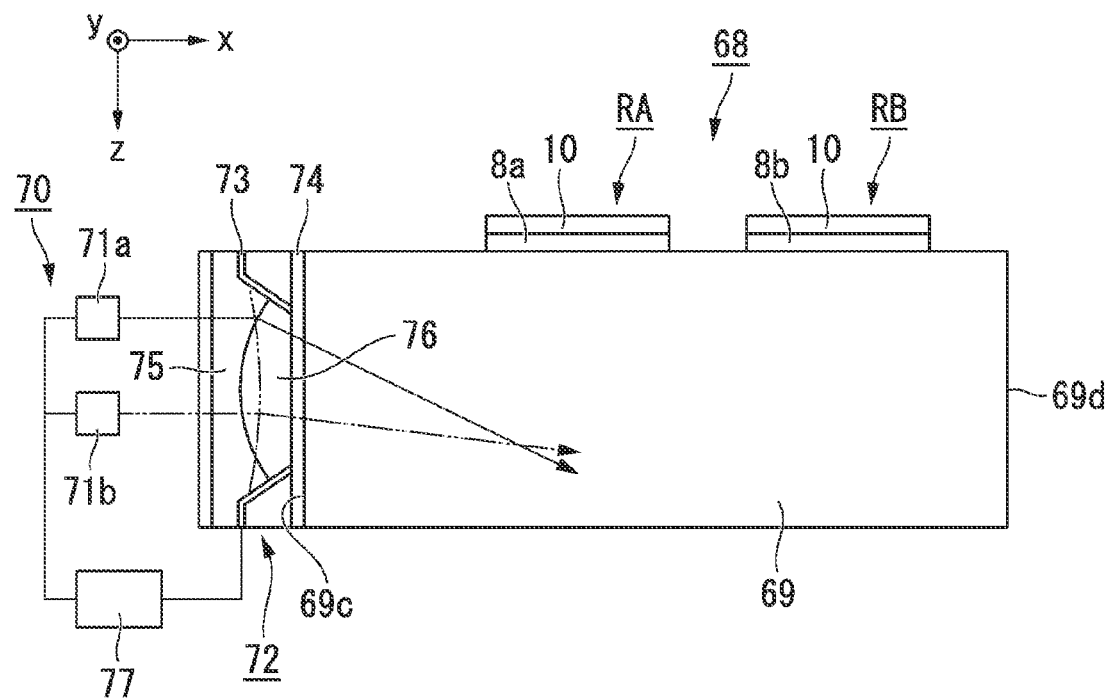
FIG. 20 is a cross-sectional view illustrating a backlight of a twelfth embodiment.

FIG. 20 is a cross-sectional view illustrating a backlight of the present embodiment.

In FIG. 20, components common to the drawings used in the first embodiment are denoted by the same reference numerals, and a detailed description thereof will be omitted.

A backlight 68 of the present embodiment includes a light guide body 69 having two light extraction regions RA and RB and an illumination unit 70, as illustrated in FIG. 20. Further, the illumination unit 70 includes two LEDs 71a and 71b, and a liquid lens 72 (a propagation angle changing element; refraction element). The LEDs 71a and 71b and the liquid lens 72 are arranged together on the side of a first end surface 69c of the light guide body 69, and the liquid lens 72 is fixed to the first end surface 69c of the light guide body 69. Light L0 emitted from the LEDs 71a and 71b is transmitted through the liquid lens 72 and incident on the light guide body 69 from the first end surface 69c. The liquid lens 72 has a configuration in which water 75 and oil 76 are sealed within a cell 74 having an electrode 73 therein. The liquid lens 72 has a function of changing a shape of an interface between the water 75 and the oil 76 according to a voltage applied to the electrode 73 to change a refraction direction of the light and change a travel direction of the transmitted light. Further, the backlight 68 includes a control unit 77 that controls the voltage applied to the liquid lens 72, on/off of the LEDs 71a and 71b, or an amount of the light.

The light guide body 69 includes two light extraction regions: a first light extraction region RA and a second light extraction region RB. Low refractive index bodies 8a and 8b are formed on the light extraction regions RA and RB, respectively. A refractive index $n_A$ of the first low refractive index body 8a on the first light extraction region RA is 1.3. A refractive index $n_B$ of the second low refractive index body 8b on the second light extraction region RB is 1.4. In other words, the light extraction regions are the same as the first light extraction region RA and the second light extraction region RB of the first embodiment. Accordingly, a critical angle in the first light extraction region RA is 60.1° and a critical angle in the second light extraction region RB is 69.0°. A light scattering body 10 is stacked on the low refractive index bodies 8a and 8b.

Also in the present embodiment, if the angle θ of incidence on the respective light extraction regions RA and RB of the light guide body 69 is less than 60.1°, the light can be extracted from the first light extraction region RA, as in the first embodiment. If the angle θ of incidence on the respective light extraction regions RA and RB of the light guide body 69 is equal to or more than 60.1° or less than 69.0°, the light can be extracted from the second light extraction region RB.

Accordingly, when the voltage applied to the electrode 73 of the liquid lens 72 is controlled and it is controlled whether the LED 71a or 71b is to be turned on to thereby appropriately change the propagation direction of the light in the light guide body 69 so that the angle of incidence on the respective light extraction regions RA and RB of the light guide body 69 has the above value, it is possible to extract the light from the respective light extraction regions RA and RB.

In the present embodiment, it is also possible to obtain the same effects as the first embodiment, i.e., to realize a backlight that has high contrast due to an obtained sufficient light amount, whose structure is simple and thin, and that is inexpensive.

Thirteenth Embodiment

Hereinafter, a thirteenth embodiment of the present invention will be described using FIGS. 21A and 21B.

A basic configuration of a liquid crystal display device of the present embodiment is the same as that of the first embodiment, and the present embodiment differs from the first embodiment in a configuration for causing light having a different propagation angle to be incident on the light guide body. Accordingly, in the present embodiment, a description of the basic configuration of the backlight will be omitted.

Figure 21A:
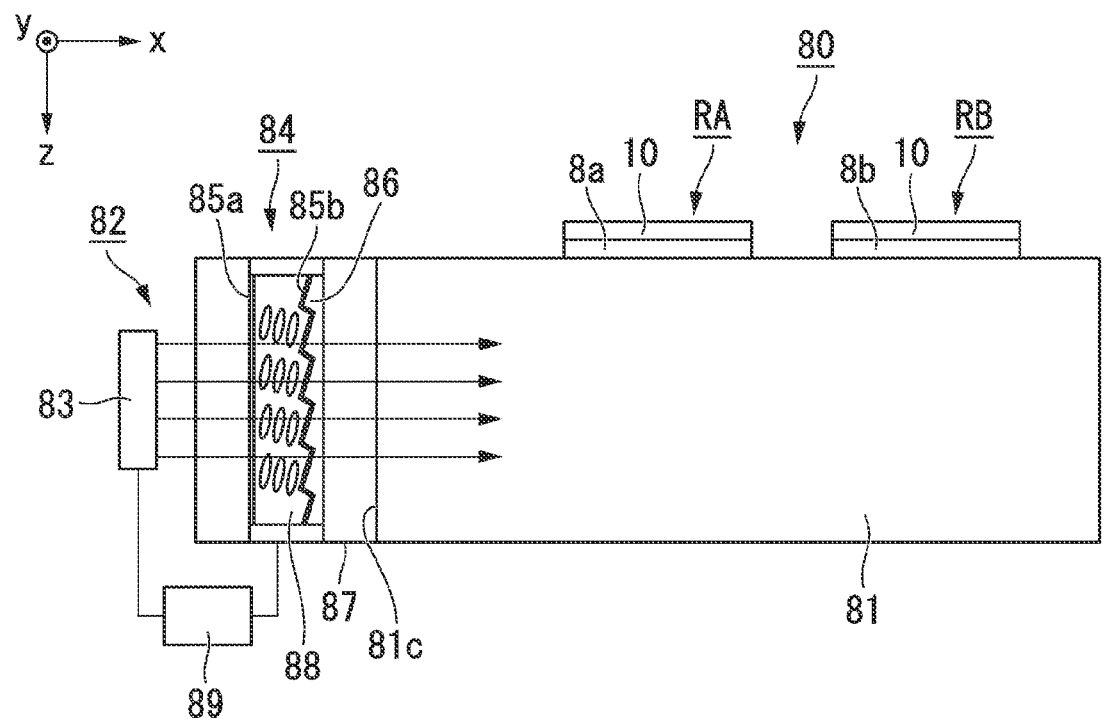
FIG. 21A is a cross-sectional view illustrating a backlight of a thirteenth embodiment.
Figure 21B:
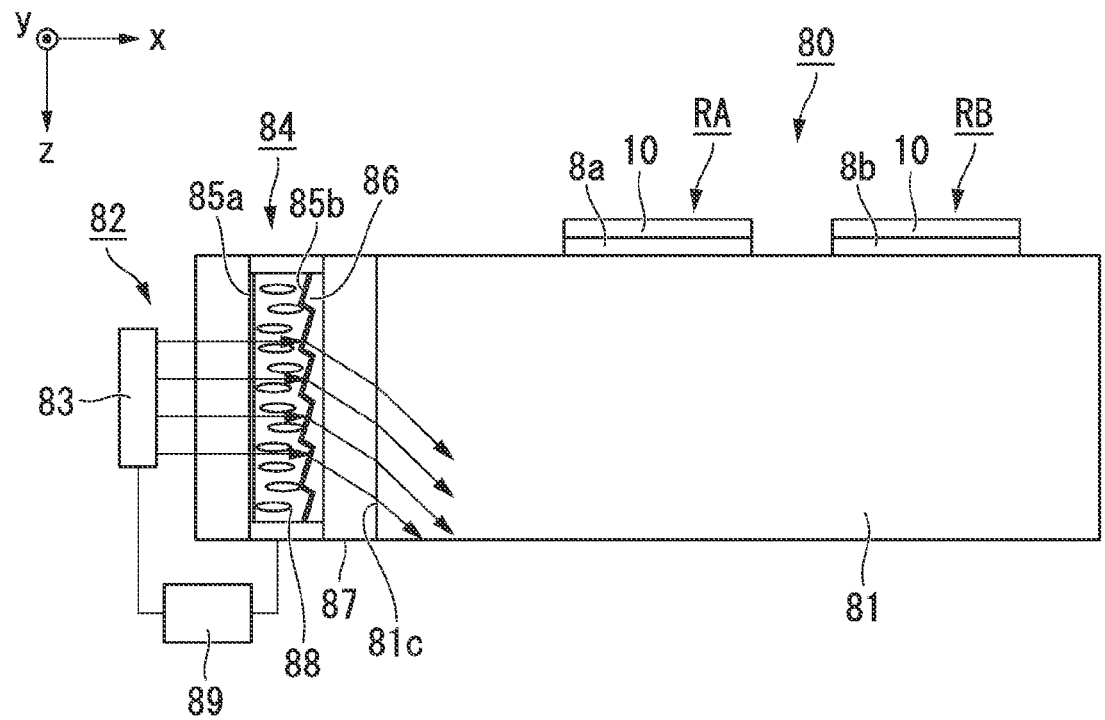
FIG. 21B is a cross-sectional view illustrating the backlight of the thirteenth embodiment.

FIGS. 21A and 21B are cross-sectional views illustrating a backlight of the present embodiment.

In FIGS. 21A and 21B, components common to the drawings used in the first embodiment are denoted by the same reference numerals, and a detailed description thereof will be omitted.

A backlight 80 of the present embodiment includes a light guide body 81 having two light extraction regions, and an illumination unit 82, as illustrated in FIGS. 21A and 21B. Further, the illumination unit 82 includes an LED 83 and a liquid crystal lens (a propagation angle changing element; refraction element) 84. The LED 83 and the liquid crystal lens 84 are both arranged on the side of a first end surface 81c of the light guide body 81. The liquid crystal lens 84 is fixed to the first end surface 81c of the light guide body 81. Light emitted from the LED 83 is transmitted through the liquid crystal lens 84 and incident on the light guide body 81 from the first end surface 81c. The liquid crystal lens 84 has a configuration in which a liquid crystal 88 is sealed in a cell 87 in which a pair of electrodes 85a and 85b and a prism structure body 86 are provided. This liquid crystal lens 84 has a function of changing a refraction direction of the light when the light is transmitted through the prism structure body 86 and changing a travel direction of the light that has been transmitted through the liquid crystal lens 84, by changing an alignment state of the liquid crystal 88 according to the voltage applied to the pair of electrodes 85a and 85b to change the refractive index of the liquid crystal 88. Further, the backlight 80 includes a control unit 89 that controls the voltage applied to the liquid crystal lens 84, on/off of the LED, or an amount of the light.

The light guide body 81 includes two light extraction regions: a first light extraction region RA and a second light extraction region RB. Low refractive index bodies 8a and 8b are formed on the light extraction regions RA and RB, respectively. A refractive index $n_A$ of the first low refractive index body 8a on the first light extraction region RA is 1.3. A refractive index $n_B$ of the second low refractive index body 8b on the second light extraction region RB is 1.4. In other words, the light extraction regions are the same as the first light extraction region RA and the second light extraction region RB of the first embodiment. Accordingly, a critical angle in the first light extraction region RA is 60.1° and a critical angle in the second light extraction region RB is 69.0°. A light scattering body 10 is stacked on the low refractive index bodies 8a and 8b.

In the present embodiment, if the angle θ of incidence on the respective light extraction regions RA to RB of the light guide body 81 is less than 60.1°, light can be extracted from the first light extraction region RA. If the angle θ of incidence on the respective light extraction regions RA and RB of the light guide body 81 is equal to or more than 60.1° and less than 69.0°, light can be extracted from the second light extraction region RB. Thus, when the voltage applied to the pair of electrodes 85a and 85b of the liquid crystal lens 84 is controlled to appropriately change the propagation direction of the light in the light guide body 81 such that the angle θ of incidence on the respective light extraction regions RA to RB of the light guide body 81 has the above value, it is possible to extract the light from the respective light extraction regions RA and RB.

In the present embodiment, it is also possible to obtain the same effects as the first embodiment, i.e., to realize a backlight that has high contrast due to an obtained sufficient light amount, whose structure is simple and thin, and that is inexpensive.

Modified Example of Thirteenth Embodiment

A backlight may be configured using a liquid crystal lens in a form other than that illustrated in FIGS. 21A and 21B.

Figure 22A:
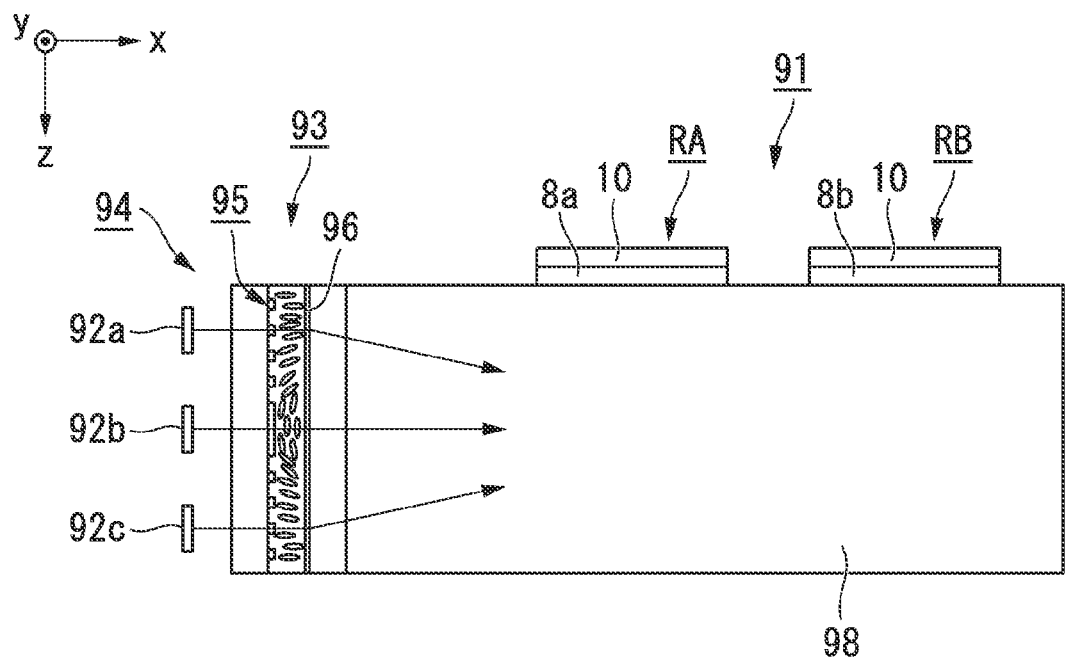
FIG. 22A is a cross-sectional view illustrating a variant of a backlight of the embodiment.
Figure 22B:
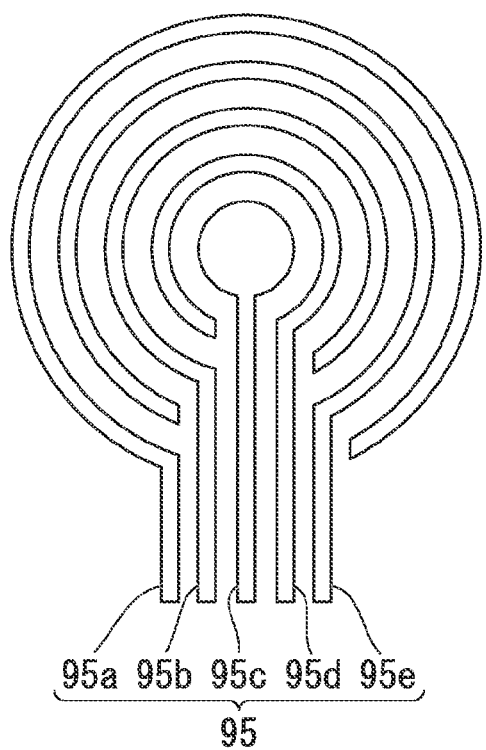
FIG. 22B is a plan view of electrodes illustrating a variant of the backlight of the embodiment.

For example, a backlight 91 illustrated in FIG. 22A includes an illumination unit 94 including three LEDs 92a, 92b, and 92c and a liquid crystal lens 93 (a propagation angle changing element; refraction element). Further, a pair of electrodes 95 and 96 provided in a pair of substrates constituting the liquid crystal lens 93 include an electrode 95 in which a plurality of (five, in this example) annular sub-electrons 95a, 95b, 95c, 95d, and 95e are arranged on concentric circles as illustrated in FIG. 22B, and an electrode 96.

If a constant voltage is applied to the electrode 96 among the pair of electrodes 95 and 96 and a different voltage is applied to each of the sub-electrons 95a, 95b, 95c, 95d, and 95e of the electrode 95, a phase profile along a radial direction of the electrode 95 is created in the liquid crystal 97 and a lens action occurs. Accordingly, a propagation direction of light in the light guide body 98 can be appropriately changed according to which of three LEDs 92a, 92b and 92c arranged in different positions in a diameter direction of the liquid crystal lens 93 is turned on.

Fourteenth Embodiment

Hereinafter, a fourteenth embodiment of the present invention will be described using FIGS. 23A to 27.

A basic configuration of a liquid crystal display device of the present embodiment is the same as that of the first embodiment, and the present embodiment differs from the first embodiment in a configuration of a low refractive index body provided on each light extraction region. Accordingly, in the present embodiment, a description of the basic configuration of the backlight will be omitted.

Figure 23A:
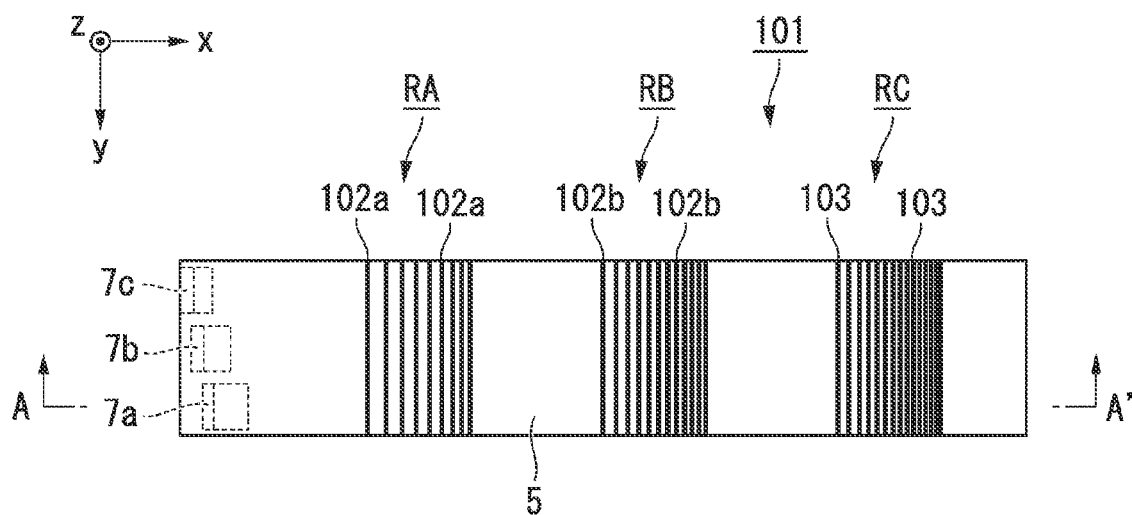
FIG. 23A is a plan view illustrating a backlight of a fourteenth embodiment.
Figure 23B:
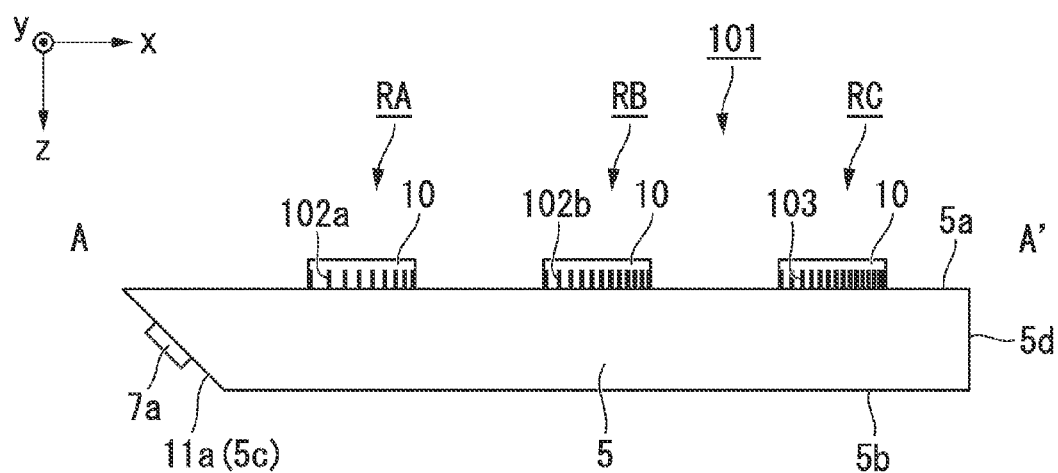
FIG. 23B is a cross-sectional view taken along line A-A' in FIG. 23A illustrating the backlight of the fourteenth embodiment.

FIGS. 23A and 23B are views illustrating the backlight of the present embodiment. FIG. 23A is a plan view, and FIG. 23B is a cross-sectional view taken along line A-A' of FIG. 23A. FIGS. 24 to 27 are diagrams illustrating a simulation result to demonstrate effects of the backlight of the present embodiment.

In FIGS. 23A to 27, components common to the drawings used in the first embodiment are denoted by the same reference numerals, and a detailed description thereof will be omitted.

In the backlight 101 of the present embodiment, as illustrated in FIG. 23A, a light guide body 5 includes three light extraction regions: a first light extraction region RA, a second light extraction region RB, and a third light extraction region RC. In the first embodiment, the low refractive index bodies 8a and 8b and the refractive index body 9 are formed in the entire light extraction regions RA, RB and RC, respectively. On the other hand, in the present embodiment, low refractive index bodies 102a and 102b on the first light extraction region RA and the second light extraction region RB include a plurality of refractive index bodies that are divided within the respective light extraction regions RA and RB. Similarly, a refractive index body 103 on the third light extraction region RC includes a plurality of refractive index bodies that are divided within the third light extraction region RC. That is, the low refractive index bodies 102a and 102b and the refractive index body 103 are formed in a line shape to extend in a direction (a y-axis direction in FIG. 21A) perpendicular to a propagation direction of the light, and arranged in parallel to one another at predetermined intervals. The low refractive index bodies 102a and 102b and the refractive index body 103 are formed by applying and curing a low refractive index material to the respective light extraction regions RA, RB and RC to form a low refractive index body and then patterning the low refractive index body using any method, as in the first embodiment.

Further, as illustrated in FIG. 23B, a light scattering body 10 is stacked on the plurality of low refractive index bodies 102a and 102b and the plurality of refractive index bodies 103 over the entire light extraction regions RA, RB and RC. However, unlike this configuration, the light scattering body 10 may be divided, similar to the plurality of low refractive index bodies 102a and 102b and the plurality of refractive index bodies 103.

A refractive index $n_A$ of the first low refractive index body 102a on the first light extraction region RA is 1.3. A refractive index $n_B$ of the second low refractive index body 102b on the second light extraction region RB is 1.4. A refractive index $n_C$ of the refractive index body 103 on the third light extraction region RC is 1.5. This point is the same as that of the first embodiment. Accordingly, a critical angle in the first light extraction region RA is 60.1°. A critical angle in the second light extraction region RB is 69.0°.

In the respective light extraction regions RA, RB and RC, the plurality of low refractive index bodies 102a and 102b and the plurality of refractive index bodies 103 are arranged at a different density along the propagation direction of the light, instead of being arranged at a uniform density. Focusing on one light extraction region RA, RB or RC, the plurality of low refractive index bodies 102a and 102b and the plurality of refractive index bodies 103 are arranged so that the density of the low refractive index bodies 102a and 102b or the refractive index body 103 is low on the side close to the LEDs 7a, 7b and 7c and sequentially increases with an increasing distance from the LEDs 7a, 7b and 7c. That is, an interval between the adjacent low refractive index bodies 102a, an interval between the adjacent low refractive index bodies 102b, and an interval between the adjacent refractive index bodies 103 sequentially decrease from the side close to the LEDs 7a, 7b and 7c to the side far from the LEDs. Further, focusing on three light extraction regions RA, RB and RC, the plurality of low refractive index bodies 102a and 102b and the plurality of refractive index bodies 103 are arranged so that a density difference of the plurality of low refractive index bodies 102a and 102b and the plurality of refractive index bodies 103 in the respective light extraction regions RA, RB and RC sequentially decreases from the first light extraction region RA to the third light extraction region RC. That is, the plurality of low refractive index bodies 102a and 102b and the plurality of refractive index bodies 103 are arranged so that the difference in interval between the adjacent low refractive index bodies 102a and 102b and the difference in interval between the adjacent refractive index bodies 103 in the respective light extraction regions RA, RB and RC sequentially decrease from the first light extraction region RA to the third light the extraction region RC.

In the present embodiment, it is also possible to obtain the same effects as the first embodiment, i.e., to realize a backlight that has high contrast due to an obtained sufficient light amount, whose structure is simple and thin, and that is inexpensive.

When the low refractive index bodies 8a and 8b and the refractive index body 9 are formed in the entire light extraction regions RA, RB and RC as in the first embodiment, there is tendency for an emitted light amount to be relatively larger in a region close to the LEDs 7a, 7b and 7c (on the side on which the light from the LED is first incident) in one light extraction region RA, RB or RC, and for the emitted light amount to be relatively smaller in a region far from the LEDs 7a, 7b and 7c (on the side on which the light from the LED is incident later). As a result, luminance unevenness may be generated in one light extraction region RA, RB or RC.

On the other hand, as in the present embodiment, the low refractive index bodies 102a and 102b and the refractive index bodies 103 are arranged at a low density in the region close to the LEDs 7a, 7b and 7c in which the emitted light amount tends to be large in the light extraction region RA, RB or RC, and at a high density in the region far from the LEDs in which the emitted light amount tends to be small, thereby suppressing occurrence of the luminance unevenness in one light extraction region RA, RB or RC. Similarly, the density difference of the low refractive index bodies 102a in the first light extraction region RA in which the emitted light amount tends to be large is increased and the density difference of the refractive index bodies 103 in the third light extraction region RC in which the emitted light amount tends to be small is decreased, thereby suppressing the occurrence of luminance unevenness among three light extraction regions RA, RB and RC.

The present inventors performed simulation to compare a distribution of an amount of light emitted from each region between a case in which the low refractive index body was divided as in the present embodiment and a case in which the low refractive index body was not divided as in the first embodiment, in order to demonstrate effects of the backlight of the present embodiment. Hereinafter, this simulation will be described using FIGS. 24 to 27.

Simulation conditions were as follows. A size in the propagation direction of the light in one light extraction region was 20 mm. 100 low refractive index bodies or refractive index bodies in a line shape whose size in the light propagation direction (size in a transverse direction) was 0.1 mm were assumed to be arranged in one light extraction region. In this case, 50% of a total area of one light extraction region was occupied by the low refractive index bodies.

Figure 24:
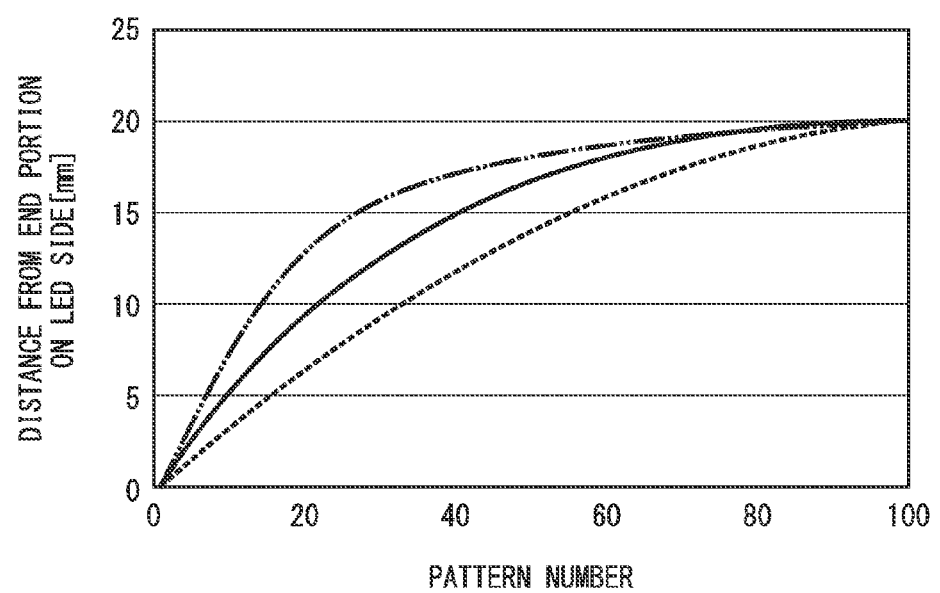
FIG. 24 is a diagram for explaining an arrangement of a low refractive index body in the backlight of the present embodiment.

FIG. 24 is a diagram numerically illustrating an arrangement of the low refractive index bodies or the refractive index bodies in a line shape in the respective light extraction regions RA, RB and RC. A horizontal axis indicates a pattern number when the 100 low refractive index bodies or refractive index bodies were numbered from 1 to 100 from the side close to the LED to the side far from the LED. A vertical axis indicates a distance [mm] of each low refractive index body or each refractive index body from a base point when an end closest to the LED in each light extraction region was assumed to be a base point 0 mm. Among three graphs, a two-dot chain line indicates an arrangement of the first light extraction region RA, a solid line indicates an arrangement of the second light extraction region RB, and a dotted line indicates an arrangement of the third light extraction region RC.

If the low refractive index bodies or the refractive index bodies are uniformly aligned in the light extraction regions RA, RB and RC, the graphs would be shown as straight lines in FIG. 24. However, all of three graphs indicate convex curves in which a density of the low refractive index bodies or the refractive index bodies is low with a decreasing distance from the LED and sequentially increases with an increasing distance from the LED. Further, the graph of the first light extraction region RA deviates most from a straight line, the graph of the second light extraction region RB and the graph of the third light extraction region RC are close to the straight line in this order, and a density difference of the plurality of low refractive index bodies or refractive index bodies in the respective light extraction regions RA, RB and RC sequentially decreases from the first light extraction region to the third light extraction region, as shown.

Figure 25:
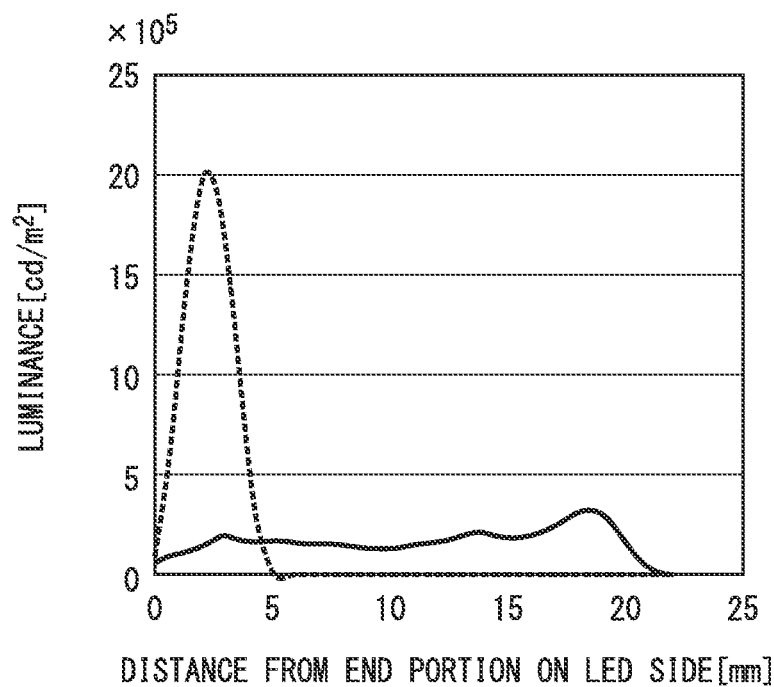
FIG. 25 is a diagram illustrating a luminance distribution of light emitted from a light extraction region RA in the backlight of the embodiment.
Figure 26:
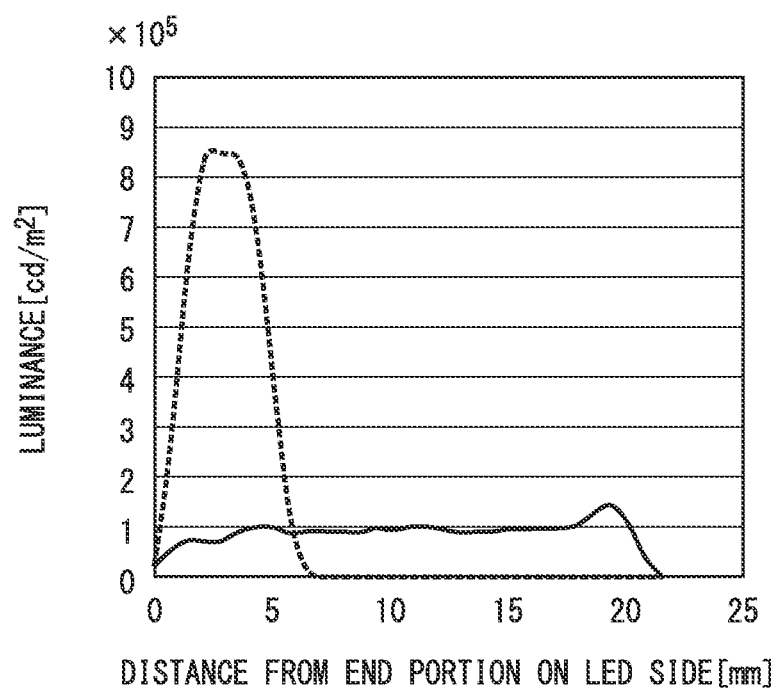
FIG. 26 is a diagram illustrating a luminance distribution of light emitted from a light extraction region RB in the backlight of the embodiment.
Figure 27:
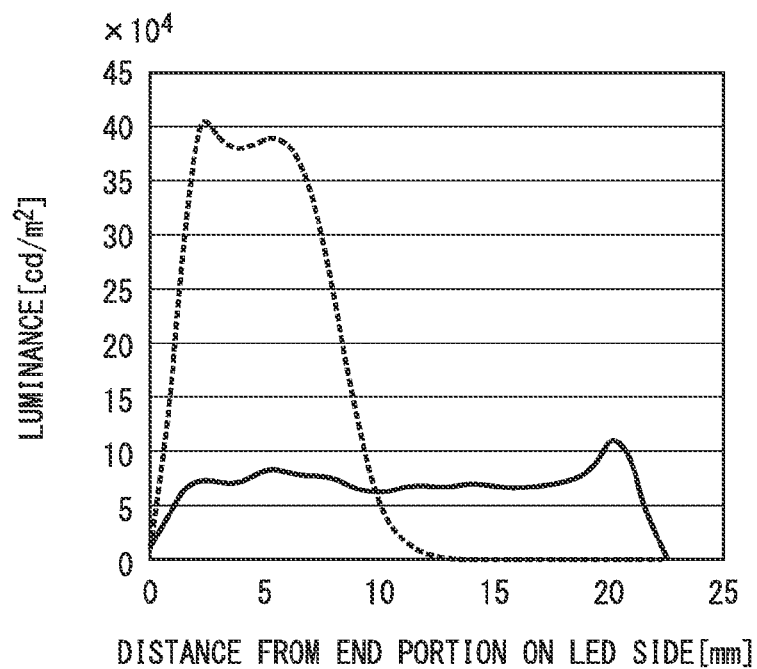
FIG. 27 is a diagram illustrating a luminance distribution of light emitted from a light extraction region RC in the backlight of the embodiment.

FIGS. 25 to 27 illustrate simulation results regarding a relationship between a position in the light extraction region and luminance in the position. FIG. 25 shows a relationship between the position in the first light extraction region RA and the luminance, FIG. 26 shows the relationship between the position in the second light extraction region RB and the luminance, and FIG. 27 shows the relationship between the position in the third light extraction region RC and the luminance.

In FIGS. 25 to 27, a horizontal axis indicates a distance [mm] of each low refractive index body or each refractive index body from a base point when an end closest to the LED in the light extraction regions RA, RB and RC was assumed to be a base point 0 mm. A vertical axis indicates luminance [cd/m²] of the emitted light in each position on the respective light extraction regions RA, RB and RC. Further, in FIGS. 25 to 27, a graph of a solid line shows a case of the present embodiment in which the low refractive index body and the refractive index body were divided and arranged as shown in FIG. 24, and a graph of a dotted line shows a case of a comparative example in which the low refractive index body or the refractive index body was not divided.

As illustrated in FIGS. 25 to 27, in the case of the comparative example in which the low refractive index body or the refractive index body was not divided, a peak of the luminance was observed in a range from an end portion closest to the LED to about 5 mm in the first light extraction region RA, a range from an end portion closest to the LED to about 7 mm in the second light extraction region RB, and a range from an end portion closest to the LED to about 12 mm in the third light extraction region RC, and substantially all lights were emitted in the ranges. Accordingly, it has been found that little light is emitted from the side farther from the LED than the above ranges and luminance unevenness is generated in one light extraction region RA, RB or RC.

On the other hand, in the case of the present embodiment in which the low refractive index body or the refractive index body is divided, in any of the light extraction regions RA, RB and RC, a great luminance peak as in the comparative example is not observed, and the luminance is relatively averaged in range from the end closest to the LED to about 20 mm, as shown. Thus, the low refractive index body or the refractive index body is divided and arranged appropriately as illustrated in FIG. 24, thereby reducing both of luminance unevenness in one light extraction region RA, RB or RC and luminance unevenness in the entire backlight.

First Modified Example of Fourteenth Embodiment

Figure 28:
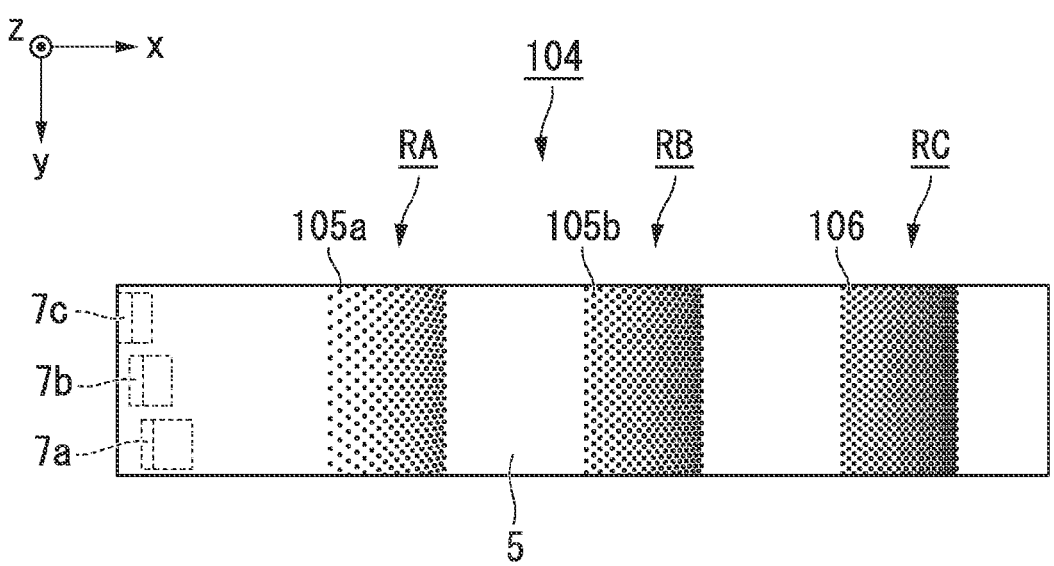
FIG. 28 is a plan view illustrating a first variant of the backlight of the embodiment.

In FIG. 23A, the example in which the low refractive index bodies or the refractive index body is divided into a plurality of low refractive index bodies in a line shape has been shown. On the other hand, unlike this configuration, low refractive index bodies 105a and 105b and a refractive index body 106 may be divided into a plurality of low refractive index bodies in a dot shape, as in a backlight 104 illustrated in FIG. 28.

When this configuration is adopted, the plurality of low refractive index bodies 105a and 105b and the plurality of refractive index bodies 106 are arranged so that a density of the low refractive index bodies 105a and 105b and the refractive index bodies 106 is low on the side close to LEDs 7a, 7b and 7c and sequentially increases toward the side far from the LEDs 7a, 7b and 7c. Further, the plurality of low refractive index bodies 105a and 105b and the plurality of refractive index bodies 106 are arranged so that a density difference of the plurality of low refractive index bodies 105a and 105b and the plurality of refractive index body 106 in the respective light extraction regions RA, RB and RC is sequentially reduced from the first light extraction region RA to the third light extraction region RC. With this arrangement, it is possible to reduce the luminance unevenness in both of one light extraction region and the entire backlight.

Second Modified Example of Fourteenth Embodiment

Figure 29:
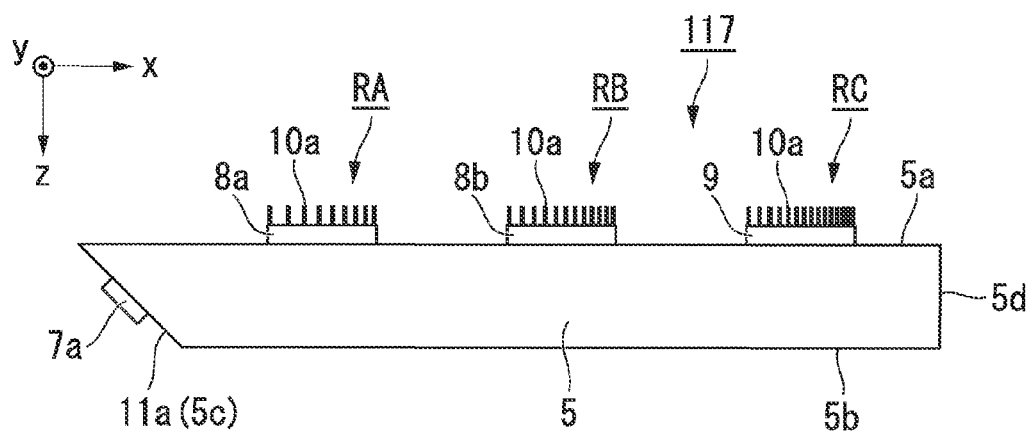
FIG. 29 is a plan view illustrating a second variant of the backlight of the embodiment.

In FIG. 23B, the example in which the low refractive index bodies and the refractive index body are divided into the plurality of low refractive index bodies in a line shape has been illustrated. However, unlike this configuration, low refractive index bodies 8a and 8b and a refractive index body 9 are formed on the entire surfaces of respective light extraction regions RA, RB and RC, as in the first embodiment, and a light scattering body may be divided into a plurality of line-shaped (or dot-shaped) light scattering bodies 10a, as in a backlight 117 illustrated in FIG. 29.

Even when this configuration is adopted, the plurality of light scattering bodies 10a are arranged so that a density of the light scattering bodies 10a is low on the side close to the LEDs 7a, 7b and 7c and sequentially increases with an increasing distance from the LEDs 7a, 7b and 7c. That is, an interval between the adjacent light scattering bodies 10a sequentially decreases from the side close to the LEDs 7a, 7b and 7c to the side far from the LEDs. Further, the plurality of light scattering bodies 10a are arranged so that a density difference of the plurality of light scattering bodies 10a in the respective light extraction regions RA, RB and RC is sequentially reduced from the first light extraction region RA to the third light extraction region RC. That is, the plurality of light scattering bodies 10a are arranged so that the difference in interval between the adjacent light scattering bodies 10a in the respective light extraction regions RA, RB and RC sequentially decreases from the first light extraction region RA to the third light extraction region RC. In this arrangement, it is also possible to reduce the luminance unevenness in both of one light extraction region and the entire backlight. In the present variant, the same effect as the above embodiment can be obtained because light can be extracted only from portions in which the light scattering body 10a exists on the low refractive index bodies 8a and 8b and the refractive index body 9 even when the low refractive index bodies 8a and 8b and the refractive index body 9 are formed on the entire surfaces of the respective light extraction regions RA, RB and RC.

Fifteenth Embodiment

Figure 30:
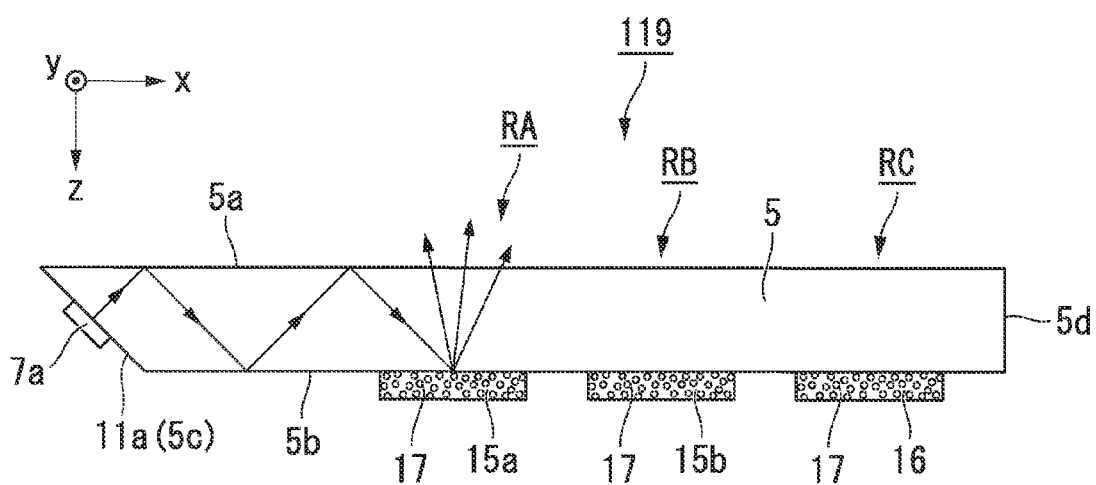
FIG. 30 is a cross-sectional view illustrating another variant of the backlight of the above noted embodiment.

In all of the above embodiments, while the low refractive index body is formed on the first main surface of the light guide body, the low refractive index body may be formed on the second main surface of the light guide body. For example, in a backlight 119 illustrated in FIG. 30, a first low refractive index body 15a, a second low refractive index body 15b, and a refractive index body 16 are formed on a second main surface 5b of a light guide body 5. Further, a light scattering material 17 is mixed inside the first low refractive index body 15a, the second low refractive index body 15b, and the refractive index body 16. In the case of the present configuration example, it is desirable to use the light scattering material 17 with a high backscattering property. The other configurations are the same as those of the first embodiment.

In the case of the backlight 119 of the present configuration, when light propagated inside the light guide body 5 is, for example, incident at an angle smaller than an critical angle on an interface between the first low refractive index body 15a and the light guide body 5 in the first light extraction region RA, the light enters the inside of the first low refractive index body 15a, is backscattered by the light scattering material 17, and is emitted from the first main surface 5a of the light guide body 5.

Sixteenth Embodiment

Hereinafter, a configuration example of the display device will be described using FIGS. 31 to 33B.

Figure 31:
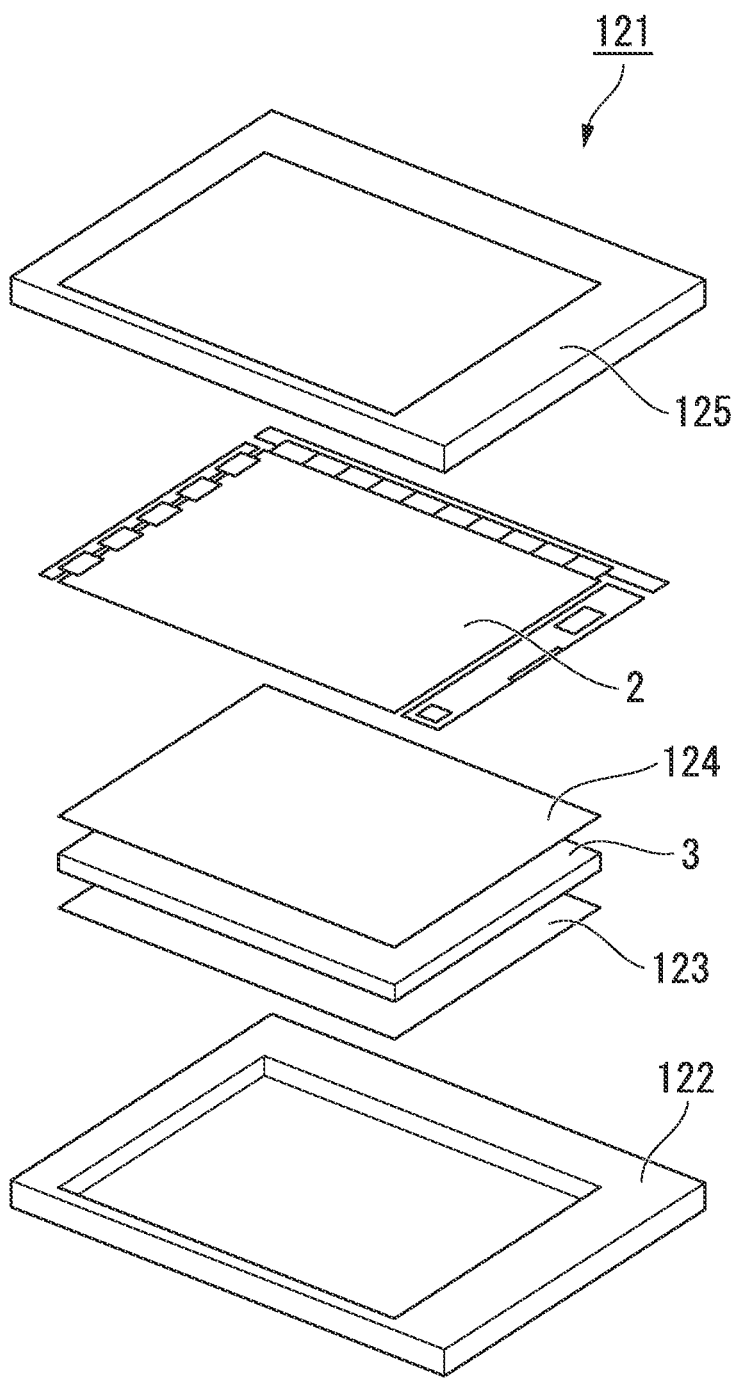
FIG. 31 is a schematic configuration diagram illustrating a configuration example of a liquid crystal display device.

FIG. 31 is an exploded perspective view illustrating a schematic configuration of a liquid crystal display device, which is a configuration example of the display device. FIGS. 32A to 33B are diagrams illustrating an arrangement example of a backlight in the liquid crystal display device.

As illustrated in FIG. 31, a liquid crystal display device 121 of the present configuration example includes a lower case 122, a reflecting plate 123, a backlight 3 (a light-controlling element), a diffusion plate 124, a liquid crystal panel 2 (a display element), and an upper case 125. That is, a stacked body of the reflecting plate 123, the backlight 3, the diffusion plate 124 and the liquid crystal panel 2 is housed inside the lower case 122 and the upper case 125. The reflecting plate 123 is arranged on a side of the backlight 3 opposite to the liquid crystal panel 2 to reflect light that leaks from the backlight 3 to the side opposite to the liquid crystal panel 2, thereby contributing to display. The diffusion plate 124 is arranged between the backlight 3 and the liquid crystal panel 2, thereby reducing the luminance unevenness of the backlight 3. However, the reflecting plate 123 or the diffusion plate 124 need not necessarily be used.

Figure 32A:
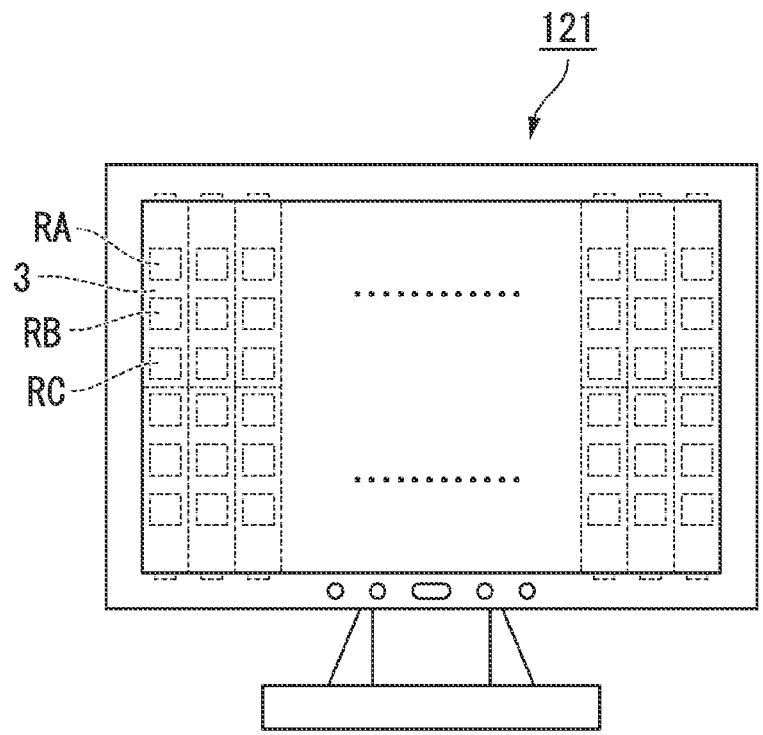
FIG. 32A is a diagram illustrating an arrangement example of the backlight in the liquid crystal display device.
Figure 32B:
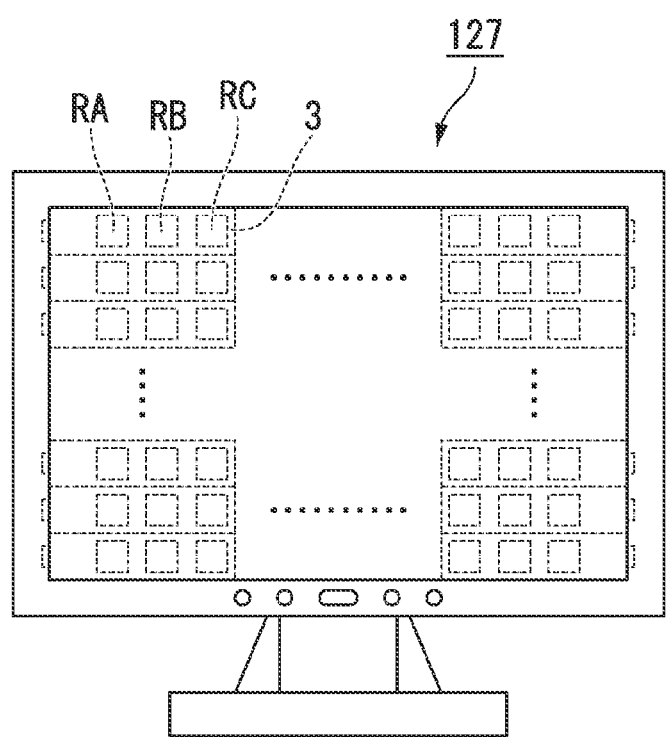
FIG. 32B is a diagram illustrating an arrangement example of the backlight in the liquid crystal display device.

A configuration in which a plurality of backlights 3 are arranged within a screen of the liquid crystal display device 121 so that respective light extraction regions RA, RB and RC are aligned in a vertical direction of the screen as illustrated in FIG. 32A may be adopted. Alternatively, a configuration in which a plurality of backlights 3I are arranged within a screen of a liquid crystal display device 127 so that respective light extraction regions RA, RB and RC are aligned in a horizontal direction of the screen as illustrated in FIG. 32B may be adopted.

Figure 33A:
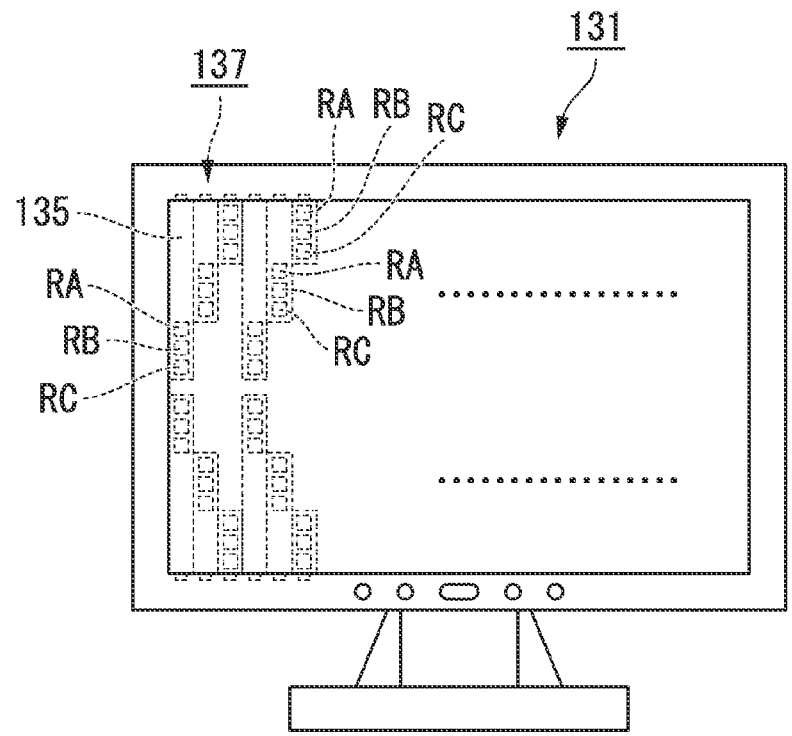
FIG. 33A is a diagram illustrating an arrangement example of the backlight in the liquid crystal display device.
Figure 33B:
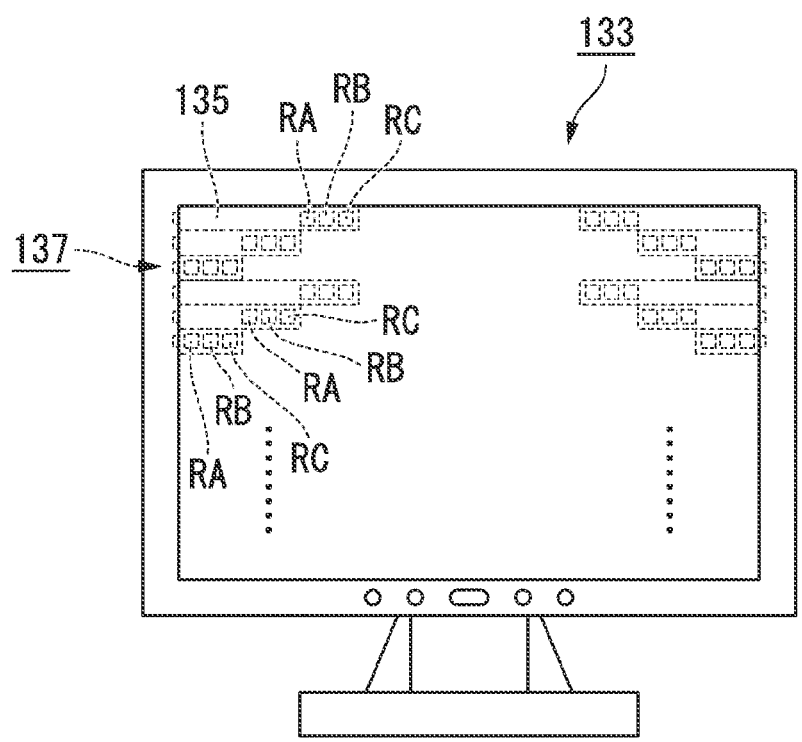
FIG. 33B is a diagram illustrating an arrangement example of the backlight in the liquid crystal display device.

Alternatively, a backlight 137 in which light extraction regions RA, RB and RC are provided only in portions in a longitudinal direction, and a plurality of (three in the present example) rod-shaped elongated light guide bodies 135, which are regions guiding light, are combined in the other portions as illustrated in FIGS. 33A and 33B may be used. In the plurality of light guide bodies 135, the regions having the light extraction regions RA, RB and RC provided therein are shifted in the longitudinal direction. Accordingly, when the plurality of light guide bodies 135 are combined, the light extraction regions RA, RB and RC are aligned in the longitudinal direction of the light guide body 135.

For example, the plurality of backlights 137 may be arranged within the screen of the liquid crystal display device 131 so that the respective light extraction regions RA, RB and RC are aligned in a vertical direction of the screen, as illustrated in FIG. 33A. Alternatively, the plurality of backlights 137 may be arranged within the screen of the liquid crystal display device 133 so that the respective light extraction regions RA, RB and RC are aligned in a horizontal direction of the screen, as illustrated in FIG. 33B.

Seventeenth Embodiment

Hereinafter, two configuration examples of the illumination device will be described using FIGS. 34 to 35B.

Figure 34:
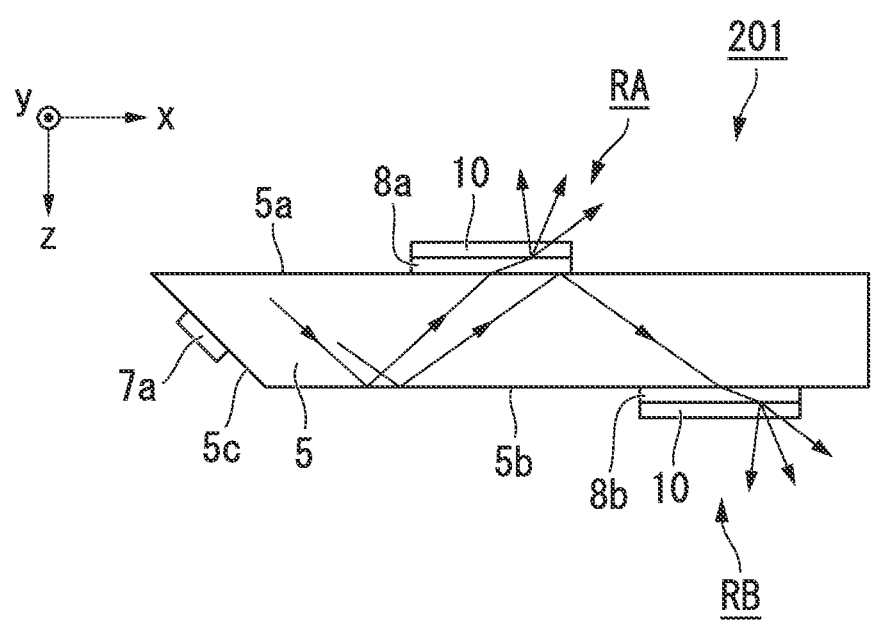
FIG. 34 is a cross-sectional view illustrating an example of an illumination device.
Figure 35A:
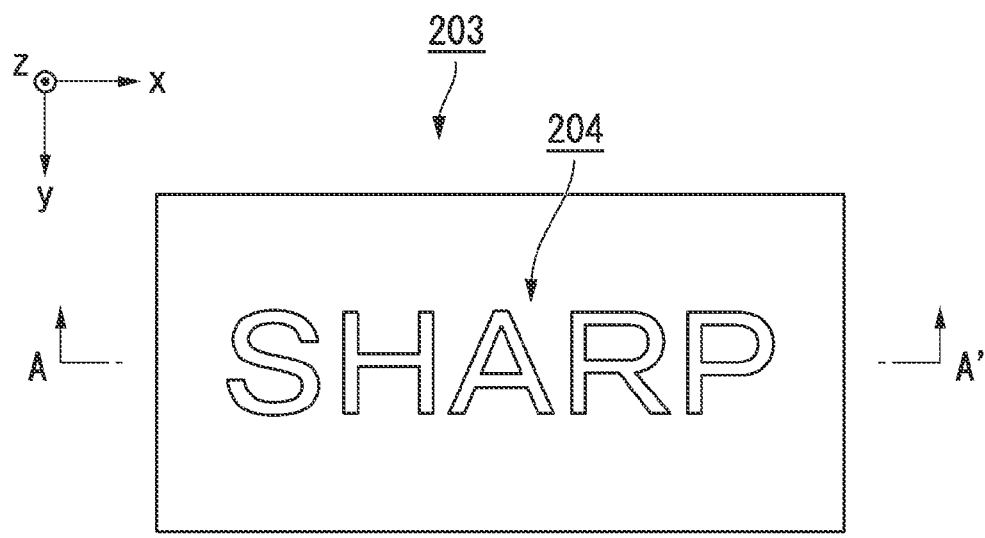
FIG. 35A is a plan view illustrating an example of the illumination device.
Figure 35B:
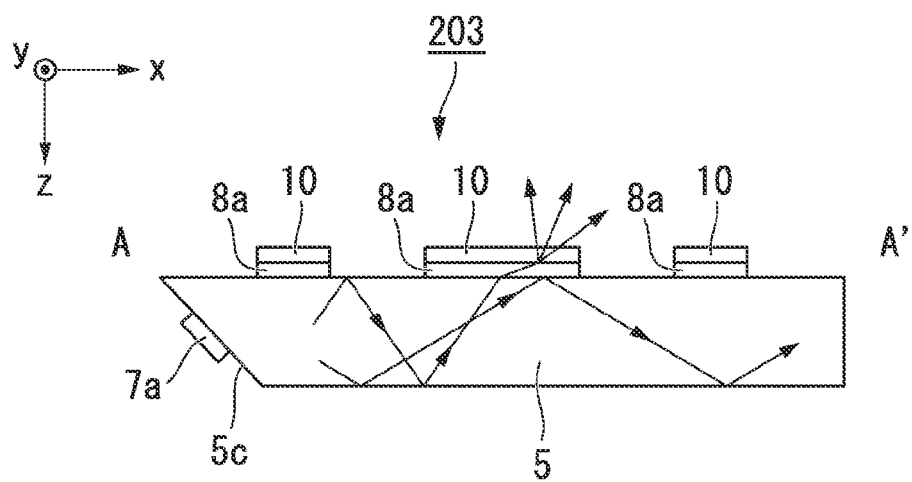
FIG. 35B is a sectional view taken along line A-A' in FIG. 35A illustrating an example of an illumination device.

FIG. 34 is a cross-sectional view of an illumination device, which is a first configuration example. FIGS. 35A and 35B are views illustrating an illumination device, which is a second configuration example. FIG. 35A is a plan view, and FIG. 35B is a cross-sectional view along line A-A' of FIG. 35A.

For example, in the illumination device 201 illustrated in FIG. 34, a first low refractive index body 8a having a refractive index of 1.3 is formed on a first main surface 5a of a light guide body 5, and a second low refractive index body 8b having a refractive index of 1.4 is formed on a second main surface 5a. Further, a light scattering body 10 is stacked on the first low refractive index body 8a and the second low refractive index body 8b. Other configurations are the same as those of the first embodiment. Further, only one first end surface 5c is illustrated in FIG. 34. In fact, the other first end surface having a different angle with respect to the first main surface 5a is formed in a depth direction of a paper surface. For LEDs, only one LED 7a is shown. In fact, the other LED is arranged in the depth direction of the paper surface.

In the illumination device 201, it can be selected whether to emit light from the first main surface 5a or the second main surface 5b according to which of two LEDs provided on the first end surface 5c of the light guide body 5 is turned on. Accordingly, it is possible to realize an illumination device whose light emitting surface can be switched.

Further, in an illumination device 203 illustrated in FIG. 35A, a character portion 204 saying "SHARP" is formed in one surface of a light guide body 5. A first low refractive index body 8a having a refractive index of 1.3 is formed to correspond to the character portion 204 on a first main surface 5a of the light guide body 5, and the first low refractive index body 8a is not formed in portions other than the character portion 204, as illustrated in FIG. 35B. Further, a light scattering body 10 is stacked on the first low refractive index body 8a. That is, the character portion 204 is a light extraction region in the above-described embodiment. Other configurations are the same as those of the first embodiment. Further, while only one first end surface 5c is illustrated in FIG. 35B, in fact, the other first end surface having a different angle with respect to the first main surface 5a is formed in a depth direction of a paper surface. For LEDs, while only one LED 7a is shown, in fact, the other LED is arranged in the depth direction of the paper surface.

In the illumination device 203, it can be selected whether to emit light from the character portion 204 or portions other than the character portion 204 according to which of two LEDs provided on the first end surface 5c of the light guide body 5 is turned on. Accordingly, with the present configuration, it is possible to realize an illumination device available as a digital signage in which, for example, the character portion 204 can blink.

Further, a technical range of the present invention is not limited to the above embodiments, and various changes may be made without departing from the spirit of the present invention. For example, in the first embodiment described above, three LEDs are arranged to be aligned in the transverse direction (the y-axis direction in FIG. 1) of the light guide body. However, unlike this arrangement, a plurality of LEDs may be arranged to be aligned in a thickness direction of the light guide body (the z-axis direction in FIG. 1). In that case, in order for an optical path of the light emitted from each LED to be aligned in the thickness direction of the light guide body, it is desirable that the first end surface of the light guide body to which the LEDs are fixed be a flat surface, and for example, as illustrated in FIG. 14, an inclined surface be formed in the middle of the light guide body and the propagation angle of each emitted light be varied using the inclined surface.

Further, while the example in which the polygon mirror is used as a scheme of varying the propagation angles of the light inside the light guide body in terms of time has been shown, for example, a configuration in which a plate-shaped mirror swings may be used. Further, for example, an LED may be fixed on a rotatable support member and the LED itself may be rotated to vary the propagation angle of the light in terms of time, unlike the configuration using the propagation angle changing element such as the polygon mirror.

Further, in the first embodiment, the first end surface itself of the light guide body is processed to be an inclined surface, and the LEDs are fixed to the inclined surface. Unlike this configuration, the first end surface of the light guide body may be a surface perpendicular to the first main surface, a prism may be separately fixed to the first end surface, and LEDs may be fixed to an inclined surface of the prism. Similarly, unlike the configuration of the fourth embodiment, the second end surface of the light guide body may be a surface perpendicular to the first main surface, a prism may be separately fixed to the second end surface, and an inclined surface of the prism may be used as a reflecting surface.

Further, as an entire configuration of the liquid crystal display device, optical members such as a light diffusion film and a prism sheet may be appropriately arranged between the liquid crystal panel and the backlight. With the optical members, it is possible to further reduce the luminance unevenness and adjust a diffusion angle and a diffusion direction of the light.

Furthermore, a concrete configuration such as a material, a size, a number, and a manufacturing method of each component in the backlight and the liquid crystal display device illustrated in the above-described embodiments may be appropriately changed.

INDUSTRIAL APPLICABILITY

The above embodiments of the present invention are applicable in liquid crystal display devices and various other display devices capable of performing display using a light-controlling element.

REFERENCE SIGNS LIST 1, 55, 121, 127, 131, 133 ... liquid crystal display device (display device), 2 ... liquid crystal panel (display element), 3, 14, 25, 31, 35, 42, 47, 51, 58, 68, 80, 91, 101, 104, 116, 117, 119, 137 ... backlight (light-controlling element), 5, 27, 36, 43, 48, 52, 59, 69, 81, 98, 115, 135 ... light guide body, 6, 60, 70, 82, 94 ... illumination unit, 8a, 8b, 15a, 15b, 20a, 20b, 102a, 102b, 105a, 105b ... low refractive index body, 9, 16, 21, 103, 106 ... refractive index body, 10 ... light scattering body, 17 ... light scattering material, 22, 44 ... light scattering surface, 38 ... prism structure body (propagation angle changing unit), 39 ... prism, 43d, 48d, 48e, 52e, 52f ... inclined surface (propagation angle changing unit), 62 ... polygon mirror (propagation angle changing element, reflection element), 72 ... liquid lens (propagation angle changing element; refraction element), 84, 93 ... liquid crystal lens (propagation angle changing element, refraction element), 201, 203 ... illumination device, RA ... first light extraction region, RB ... second light extraction region, RC ... third light extraction region, RD ... fourth light extraction region.

The invention claimed is:
1. A light-controlling element comprising: an illumination unit capable of controlling an amount of emitted light; and a light guide body on which the light emitted from the illumination unit is incident, wherein the light guide body is configured to propagate the light while totally reflecting the light inside the light guide body, the light guide body is configured to propagate the light emitted from the illumination unit at a plurality of different propagation angles inside the light guide body, the light guide body includes a plurality of light extraction regions configured to extract the light to the outside, and at least two of the plurality of light extraction regions have different incidence angle ranges in which the light is capable of being extracted to the outside; wherein the light guide body includes a propagation angle changing unit that changes a propagation angle of the light so that an angle of incidence of light on one of the plurality of light extraction regions is smaller than an angle of incidence of light on the light extraction region closer to the illumination unit than the one light extraction region; and the propagation angle changing unit includes an inclined surface obtained by inclining at least one of a first surface having the plurality of light extraction regions of the light guide body provided therein and a second surface opposing the first surface, and the inclined surface has a slope to approach the first or second surface along the propagation direction of the light; wherein the light controlling element satisfies expressions (1), (2), and (3):

$$(t/\tan \phi)*2 \leq d1 \quad (1)$$

$$0 \leq d2 \leq (t/\tan(\phi+2\epsilon)) \quad (2)$$

$$t/\tan(\phi+2\epsilon) \leq d3 \quad (3)$$

when a thickness of the light guide body is t, a size of the propagation angle changing unit in the propagation direction of the light is d1, a distance from an end close to the illumination unit of the propagation angle changing unit to an end close to the illumination unit of the light extraction region directly next to the propagation angle changing unit is d2, a distance from an end far from the illumination unit of the propagation angle changing unit to an end far from the illumination unit of the light extraction region directly next to the propagation angle changing unit is d3, an inclination angle of the inclined surface is c, and a propagation angle of the light is φ.

2. The light-controlling element according to claim 1, wherein:
the plurality of light extraction regions are arranged in a propagation direction of the light inside the light guide body,
the plurality of light extraction regions are arranged in order from the light extraction region whose incidence angle range in which light can be extracted to the outside is relatively narrower to the light extraction region whose incidence angle range is relatively wider, and
the light extraction region whose incidence angle range in which light can be extracted to the outside is relatively narrower is arranged to be closer to the illumination unit than the light extraction region whose incidence angle range is relatively wider.

3. The light-controlling element according to claim 1, wherein:
a first low refractive index body having a refractive index lower than a refractive index of the light guide body is provided in at least one of the plurality of light extraction regions.

4. The light-controlling element according to claim 3, wherein:
the first low refractive index body includes a plurality of fourth low refractive index bodies arranged to be spaced from each other in the light extraction region.

5. The light-controlling element according to claim 3, wherein:
a first light scattering body that scatters light emitted from the first low refractive index body is provided on the light emitting side of the first low refractive index body.

6. The light-controlling element according to claim 5, wherein:
the first light scattering body includes a plurality of second light scattering bodies arranged to be spaced from each other in the light extraction region.

7. The light-controlling element according to claim 6, wherein:
at least third and fourth light scattering bodies are provided in at least two of the plurality of light extraction regions, respectively,
the third light scattering body includes a plurality of fifth light scattering bodies arranged to be spaced from each other in the light extraction region,
the fourth light scattering body includes a plurality of sixth light scattering bodies arranged to be spaced from each other in the light extraction region,
an interval between the plurality of fifth light scattering bodies sequentially decreases along the propagation direction of the light incident on the light guide body,
an interval between the plurality of sixth light scattering bodies sequentially decreases along the propagation direction of the light incident on the light guide body,
the third and fourth light scattering bodies are arranged so that the third light scattering body is closer to the illumination unit than the fourth light scattering body, along the propagation direction of the light incident on the light guide body, and
the plurality of fifth and sixth light scattering bodies are arranged so that a difference in interval between the plurality of sixth light scattering bodies is smaller than a difference in interval between the plurality of fifth light scattering bodies.

8. The light-controlling element according to claim 3, wherein:
the low refractive index body includes a light scattering material that scatters the incident light.

9. The light-controlling element according to claim 3, wherein:
a light emitting surface of the low refractive index body includes a light scattering surface.

10. The light-controlling element according to claim 1, wherein:
at least second and third low refractive index bodies are provided in at least two of the plurality of light extraction regions, respectively,
a refractive index of the second low refractive index body is relatively lower than a refractive index of the third low refractive index body, and
the second and third low refractive index bodies are arranged so that the second low refractive index body is closer to the illumination unit than the third low refractive index body, along the propagation direction of the light incident on the light guide body.

11. The light-controlling element according to claim 1, wherein:
at least fifth and sixth low refractive index bodies are provided in at least two of the plurality of light extraction regions, respectively,
the fifth low refractive index body includes a plurality of seventh low refractive index bodies arranged to be spaced from each other in the light extraction region,
the sixth low refractive index body includes a plurality of eighth low refractive index bodies arranged to be spaced from each other in the light extraction region,
an interval between the plurality of seventh low refractive index bodies sequentially decreases along the propagation direction of the light incident on the light guide body,
an interval between the plurality of eighth low refractive index bodies sequentially decreases along the propagation direction of the light incident on the light guide body,
the fifth and sixth low refractive index bodies are arranged so that the fifth low refractive index body is closer to the illumination unit than the sixth low refractive index body, along the propagation direction of the light incident on the light guide body, and
the plurality of seventh and eighth low refractive index bodies are arranged so that a difference in interval between the plurality of eighth low refractive index bodies is smaller than a difference in interval between the plurality of seventh low refractive index bodies.

12. The light-controlling element according to claim 1, wherein:
the propagation angle changing unit includes one inclined surface.

13. The light-controlling element according to claim 1, wherein:
the propagation angle changing unit includes a prism structure body in which a plurality of prisms having the inclined surface are arranged to be adjacent.

14. The light-controlling element according to claim 1, wherein:
the illumination unit includes a plurality of light sources each capable of controlling an amount of emitted light, and
each of the plurality of light sources is arranged in a different direction with respect to the light extraction region so that the emitted light is incident on the light extraction region at a different incidence angle.

15. The light-controlling element according to claim 14, wherein:
an end surface of the light guide plate includes a plurality of inclined surfaces whose angles with respect to the surface having the light extraction region provided therein differ from one another, and the plurality of light sources is fixed to the plurality of inclined surfaces, respectively.

16. The light-controlling element according to claim 1, wherein:
the illumination unit includes a plurality of light sources provided in an end surface of the light guide body and each capable of controlling an amount of emitted light; and a plurality of reflecting surfaces provided in an end surface opposing the end surface of the light guide body having the plurality of light sources provided therein and reflecting lights emitted from the plurality of light sources, respectively, and
the plurality of reflecting surfaces are arranged in different directions with respect to the light extraction region so that lights reflected by the plurality of respective reflecting surfaces are incident on the light extraction region at different incidence angles.

17. The light-controlling element according to claim 16, wherein:
the end surface opposing the end surface of the light guide body having the plurality of light sources provided therein has a plurality of inclined surfaces whose angles with respect to the surface having the light extraction region provided therein differ from each other, and the plurality of reflecting surfaces is formed in the plurality of inclined surfaces, respectively.

18. The light-controlling element according to claim 1, wherein:
the illumination unit includes a light source capable of controlling an amount of emitted light, and a propagation angle changing element configured to change a propagation angle of the light inside the light guide body in terms of time, and
the propagation angle changing element causes the light to be incident on the light extraction region at a different incidence angle by changing the propagation angle of the light in terms of time.

19. The light-controlling element according to claim 18, wherein:
the propagation angle changing element has a function of reflecting light emitted from the light source, and includes a reflection element capable of changing a travel direction of the reflected light.

20. The light-controlling element according to claim 19, wherein:
the reflection element is a polygon mirror.

21. The light-controlling element according to claim 18, wherein:
the propagation angle changing element has a function of refracting light emitted from the light source when transmitting the light, and includes a refraction element capable of changing a travel direction of the transmitted light.

22. The light-controlling element according to claim 21, wherein:
the refraction element is a liquid lens or a liquid crystal lens.

23. A display device comprising: a light-controlling element; and a display element that performs display using light emitted from the light-controlling element, wherein the light-controlling element includes: an illumination unit capable of controlling an amount of emitted light; and a light guide body on which the light emitted from the illumination unit is incident, and wherein the light guide body is configured to propagate the light while totally reflecting the light inside the light guide body, the light guide body is configured to propagate the light emitted from the illumination unit at a plurality of different propagation angles inside the light guide body, the light guide body includes a plurality of light extraction regions configured to extract the light to the outside, and at least two of the plurality of light extraction regions have different incidence angle ranges in which the light is capable of being extracted to the outside; wherein the light guide body includes a propagation angle changing unit that changes a propagation angle of the light so that an angle of incidence of light on one of the plurality of light extraction regions is smaller than an angle of incidence of light on the light extraction region closer to the illumination unit than the one light extraction region; and the propagation angle changing unit includes an inclined surface obtained by inclining at least one of a first surface having the plurality of light extraction regions of the light guide body provided therein and a second surface opposing the first surface, and the inclined surface has a slope to approach the first or second surface along the propagation direction of the light; wherein the light control-controlling element satisfies expressions (1), (2), and (3):

$$(t/\tan\phi)*2 \leq d1 \quad (1)$$

$$0 \leq d2 \leq (t/\tan(\phi+2\epsilon)) \quad (2)$$

$$t/\tan(\phi+2\epsilon) \leq d3 \quad (3)$$

when a thickness of the light guide body is t, a size of the propagation angle changing unit in the propagation direction of the light is d1, a distance from an end close to the illumination unit of the propagation angle changing unit to an end close to the illumination unit of the light extraction region directly next to the propagation angle changing unit is d2, a distance from an end far from the illumination unit of the propagation angle changing unit to an end far from the illumination unit of the light extraction region directly next to the propagation angle changing unit is d3, an inclination angle of the inclined surface is c, and a propagation angle of the light is $\phi$.

24. An illumination device comprising: a light-controlling element, wherein the light-controlling element includes: an illumination unit capable of controlling an amount of emitted light; and a light guide body on which the light emitted from the illumination unit is incident, and wherein the light guide body is configured to propagate the light while totally reflecting the light inside the light guide body, the light guide body is configured to propagate the light emitted from the illumination unit at a plurality of different propagation angles inside the light guide body, the light guide body includes a plurality of light extraction regions configured to extract the light to the outside, and at least two of the plurality of light extraction regions have different incidence angle ranges in which the light is capable of being extracted to the outside; wherein the light guide body includes a propagation angle changing unit that changes a propagation angle of the light so that an angle of incidence of light on one of the plurality of light extraction regions is smaller than an angle of incidence of light on the light extraction region closer to the illumination unit than the one light extraction region; and the propagation angle changing unit includes an inclined surface obtained by inclining at least one of a first surface having the plurality of light extraction regions of the light guide body provided therein and a second surface opposing the first surface, and the inclined surface has a slope to approach the first or second surface along the propagation direction of the light; wherein the light control-controlling element satisfies expressions (1), (2), and (3):

$$(t/\tan \phi)*2 \leq d1 \quad (1)$$

$$0 \leq d2 \leq (t/\tan(\phi+2\epsilon)) \quad (2)$$

$$t/\tan(\phi+2\epsilon) \leq d3 \quad (3)$$

when a thickness of the light guide body is t, a size of the propagation angle changing unit in the propagation direction of the light is d1, a distance from an end close to the illumination unit of the propagation angle changing unit to an end close to the illumination unit of the light extraction region directly next to the propagation angle changing unit is d2, a distance from an end far from the illumination unit of the propagation angle changing unit to an end far from the illumination unit of the light extraction region directly next to the propagation angle changing unit is d3, an inclination angle of the inclined surface is $\epsilon$, and a propagation angle of the light is $\phi$.

* * * * *